(12) United States Patent
Ramstad

(10) Patent No.: US 8,194,119 B2
(45) Date of Patent: Jun. 5, 2012

(54) DISPLAY OF GENERALIZED ANAGLYPHS WITHOUT RETINAL RIVALRY

(75) Inventor: Monte Jerome Ramstad, Cannon Falls, MN (US)

(73) Assignee: Chroma3d Systems, Inc., Cannon Falls, MN (US)

( * ) Notice: Subject to any disclaimer, the term of this patent is extended or adjusted under 35 U.S.C. 154(b) by 1049 days.

(21) Appl. No.: 12/152,044

(22) Filed: May 12, 2008

(65) Prior Publication Data
US 2008/0278574 A1 Nov. 13, 2008

Related U.S. Application Data

(60) Provisional application No. 60/928,520, filed on May 10, 2007, provisional application No. 60/932,354, filed on May 31, 2007, provisional application No. 60/994,001, filed on Sep. 17, 2007, provisional application No. 60/997,931, filed on Oct. 9, 2007, provisional application No. 61/005,920, filed on Dec. 10, 2007.

(51) Int. Cl.
*H04N 7/18* (2006.01)
*G06F 15/16* (2006.01)

(52) U.S. Cl. ........................................ 348/51
(58) Field of Classification Search ............... 348/51–59
See application file for complete search history.

(56) References Cited

U.S. PATENT DOCUMENTS

| | | |
|---|---|---|
| 1,422,527 A | 7/1922 | Berger |
| 2,135,197 A | 11/1938 | Norling |
| 2,136,303 A | 11/1938 | Lumiere |
| 2,568,327 A | 9/1951 | Dudley |
| 2,623,433 A | 12/1952 | Stipek |
| 3,240,138 A | 3/1966 | Goddard |
| 3,256,776 A | 6/1966 | Land et al. |
| 3,507,549 A | 4/1970 | Land |
| 3,776,725 A | 12/1973 | McCann et al. |
| 3,820,874 A | 6/1974 | Scarpetti |
| 4,009,951 A | 3/1977 | Ihms |
| 4,134,644 A | 1/1979 | Marks et al. |
| 4,264,926 A | 4/1981 | Etra |
| 4,620,770 A | 11/1986 | Wexler |
| 4,734,756 A | 3/1988 | Butterfield et al. |
| 4,905,081 A | 2/1990 | Morton |
| 5,398,131 A | 3/1995 | Hall et al. |
| 5,491,646 A | 2/1996 | Erskine |
| 5,661,518 A | 8/1997 | Palm et al. |
| 6,037,971 A | 3/2000 | McLaine et al. |
| 6,335,755 B1 | 1/2002 | McLaine et al. |
| 6,389,236 B1 | 5/2002 | Western |
| 6,624,842 B2 | 9/2003 | McLaine et al. |
| 6,631,205 B1 | 10/2003 | Melen et al. |
| 6,678,323 B2 | 1/2004 | Tam et al. |
| 6,687,003 B1 | 2/2004 | Sorensen et al. |
| 6,748,105 B1 | 6/2004 | Mancuso et al. |
| 6,956,964 B2 | 10/2005 | Lee et al. |

(Continued)

*Primary Examiner* — Zarni Maung

(57) ABSTRACT

General anaglyphs may be rendered using multiple primary colors to display the first and second images of stereoscopic images. Retinal rivalry in the anaglyphs may be avoided by using transformations which balance the brightness contrast in the first and second images. Certain primary colors may be advantageous for rendering anaglyphs in six, five, four, and three primary colors. A white primary color is advantageous for displaying a monochrome second image with a color first image. General anaglyphs may be dynamically created by a display apparatus using certain transformations and communication with external sources. Four-primary-color anaglyphs may be compressed into three channels for transfer to a display apparatus. A user may select the primary colors of the first and second images and the relative brightness of the second image. Several methods to display general anaglyphs are disclosed.

24 Claims, 25 Drawing Sheets

U.S. PATENT DOCUMENTS

| | | |
|---|---|---|
| 7,001,021 B2 | 2/2006 | Jorke |
| 7,130,488 B2 | 10/2006 | Harrington et al. |
| 7,215,792 B2 | 5/2007 | Sharma et al. |
| 7,379,588 B2 | 5/2008 | Loce |
| 2003/0020883 A1* | 1/2003 | Hara .............................. 353/31 |
| 2005/0111693 A1* | 5/2005 | Loce et al. .................... 382/100 |
| 2007/0273848 A1* | 11/2007 | Fan et al. ...................... 353/119 |
| 2009/0231697 A1* | 9/2009 | Marcus et al. ................. 359/465 |
| 2010/0118045 A1* | 5/2010 | Brown Elliott et al. ...... 345/589 |
| 2011/0298894 A1* | 12/2011 | Jarvenpaa ....................... 348/46 |

* cited by examiner

DISPLAY OF GENERALIZED ANAGLYPHS WITHOUT RETINAL RIVALRY

CROSS-REFERENCE TO RELATED APPLICATIONS

This application claims the benefit of Provisional Application Ser. Nos. 60/928,520 filed of date May 10, 2007, 60/932,354 filed of date May 31, 2007, 60/994,001 filed of date Sep. 17, 2007, U.S. 60/997,931 filed of date Oct. 9, 2007, and 61/005,920 filed of date Dec. 10, 2007 all of which are incorporated herein in its entirety by reference thereto.

REFERENCE TO SEQUENCE LISTING, A TABLE, OR A COMPUTER PROGRAM LISTING COMPACT DISC APPENDIX

Not Applicable

BACKGROUND

Stereoscopic images generally consist of two images which are related by a small change in the lateral perspective. When viewed using an enabling apparatus, stereoscopic images may allow the perception of stereoscopic depth. Anaglyphs are stereoscopic images wherein different primary colors are used to render the first and second images of the stereo pair. Usually the spectra of the first and second images do not substantially overlap each other. Then the first and second images may be viewed selectively using two complementary color viewing filters. The first viewing filter $F_1$ may be used to view the first image while the second viewing filter $F_2$ may be used to view the second image. The first filter substantially transmits the primary colors of the first image and blocks the primary colors of the second image. The second filter substantially transmits the primary colors of the second image and blocks the primary colors of the first image.

Anaglyphs are often rendered in three primary colors where the first image is rendered in two primary colors while the second image is rendered in one primary color. In red/cyan anaglyphs, the first image is rendered in green and blue primary colors while the second image is rendered in a red primary color. Other types of anaglyphs may include blue/yellow and green/magenta anaglyphs. Herein these anaglyphs are called three-color anaglyphs.

Three-color anaglyphs are often used to display stereoscopic images due to their relatively low cost and wide compatibility with conventional display apparatus. However, conventional three-color anaglyphs have some well known disadvantages. Firstly, conventional three-color anaglyphs generally exhibit a reduced color gamut when viewed through the colored viewing filters. Secondly, conventional anaglyphs generally exhibit retinal rivalry which may cause user discomfort. The prior art contains many methods to improve the color gamut of anaglyphs. The prior art also contains many methods to reduce the retinal rivalry in anaglyphs. However, these anaglyphs still have reduced color gamuts or exhibit retinal rivalry.

It is well known that viewing a subject through colored filters may reduce the observed color gamut of the subject. In general, a color filter which transmits only a single primary color may not allow any color hue to be fully perceived through the filter. For example, an image rendered in a pure red primary color may appear to be nearly a grayscale image when viewed through the red filter. On the other hand, a filter which transmits two primary colors may allow only the hues associated with the two primary colors to be perceived through the filter. The hue consisting of both primary colors may appear to be nearly a gray color through the filter. For example, a cyan filter (which transmits green and blue light) may allow only blue and green hues or blue and greenish-yellow hues to be perceived through the filter depending on how close the green primary color is to yellow. An image rendered in pure cyan hues may appear to be nearly a grayscale image when viewed through a cyan filter. These phenomena may be confirmed by viewing a digital color spectrum through pure cyan and pure red filters. Software programs for editing digital images often provide a suitable digital color spectrum in their color selection tools.

Since the second image in an anaglyph, may be generally perceived as a grayscale image, the color gamut observed in a stereo view of a conventional anaglyph may be generally similar to the color gamut of the first image rendered in two primary colors. In other words, the first image in an anaglyph generally contributes more to color perception than the second image. From these observations, one might expect that only blue and yellowish-green hues may be perceived in red/cyan anaglyphs. However, additional color hues are often visible in conventional red/cyan anaglyphs due to the effects of retinal rivalry.

One common method of creating red/cyan anaglyphs combines the green and blue primary channels of the first image with the red primary channel of the second image. This type of anaglyph is often called a "true-color" anaglyph. Surprisingly, red and cyan hues may be perceived in some true-color anaglyphs when viewed through red and cyan viewing filters. In other words, while the single filters do not allow red or cyan hues to be perceived, the stereo view through the two filters may allow red and cyan hues to be perceived. However, the red and cyan hues are generally accompanied by large amounts of retinal rivalry. Similar phenomena occur in analogous blue/yellow and green/magenta true-color anaglyphs.

True-color anaglyphs generally contain too much retinal rivalry for comfortable viewing. Therefore many methods have been developed in the prior art to produce anaglyphs with less retinal rivalry than observed in true-color anaglyphs. In order to observe less retinal rivalry, anaglyphs are often constructed from images with modified colors. These color modifications may reduce the retinal rivalry observed in the anaglyph, but may also reduce the spectrum or saturation of hues perceived in the anaglyph. Herein these anaglyphs with modified colors and rendered in three primary colors are called partial-color anaglyphs.

There are various editing operations which may be applied to stereoscopic images prior to constructing an anaglyph which are known to reduce retinal rivalry. These may include de-saturation of hues and hue substitution. Many methods involve local editing of an image so that the editing functions vary throughout an image. These are relatively labor intensive and expensive methods to prepare anaglyphs. A particular method of the prior art may cause an average reduction of retinal rivalry in a stereo view while patches of high retinal rivalry remain scattered throughout the stereo view. However, the prior art does not provide a method to reduce the retinal rivalry to arbitrarily low levels for any distribution of initial color content in a stereoscopic image. The prior art lacks a working theory of how to avoid retinal rivalry when producing partial-color anaglyphs.

The conditions which are required to avoid retinal rivalry in color anaglyphs are not described in the prior art. Generally, the prior art contemplates a compromise between the color gamut and the level of retinal rivalry observed in an anaglyph. It is widely believed that retinal rivalry is necessarily present to some degree in color anaglyphs. In order words, it is widely believed that all color anaglyphs contain more retinal rivalry than grayscale anaglyphs. Most efforts of the prior art have been directed toward improving the color gamut of partial-color anaglyphs while accepting a reduced but substantial amount of retinal rivalry.

Methods exist in the prior art to increase the color gamut of anaglyphs by using leaky viewing filters. It is well known that the range of perceived hues in partial-color anaglyphs may be expanded to some degree by allowing one or both of the viewing filters to partially transmit or leak a small amount of additional primary colors through the filters. For example, a red filter which also transmits a small amount of green light may allow an unsaturated green hue and an unsaturated red hue to be perceived through the red filter. Or a cyan filter which also transmits a small amount of red light may allow an unsaturated red hue and an unsaturated cyan hue to be perceived through the filter. However, transmitting part of the primary colors of the opposite image through the viewing filters may cause the user to see ghost images or double images in the stereo view. The double images may reduce the ability of the user to fuse the stereo pair and may reduce the perceived stereoscopic depth in the stereo view. Therefore, when using leaky filters, the benefit of the extra hues created by the leak must be balanced against the disadvantage of perceiving less stereoscopic depth.

Conventional cyan filters for viewing red/cyan anaglyphs are often designed to leak a small amount of a red primary color through the filter. This allows a weak reddish hue to be perceived through the cyan filter. However the leaked red primary color creates a ghost of the second image in the view of the first image. Furthermore since the second image may be offset from the first image due to stereoscopic parallax, the red light from the second image may not always be at the proper location to contribute correctly to the color of the first image. Similar disadvantages occur when using leaky filters with blue/yellow and green/magenta anaglyphs.

The prior art contains methods to predict the color gamut observed in anaglyphs viewed through leaky filters using conventional color models such as the CIE (International Commission on Illumination) RGB color models. The CIE color models were developed for red, green and blue primary colors. However, it is clear that color perception may be drastically changed by color viewing filters. For example, a red viewing filter may change a red color, which is considered a dark color in conventional color models, into a white color which is a bright, unsaturated color. Therefore, applying conventional color model calculations to predict the color gamut perceivable through color filters has questionable meaning. Furthermore, the color gamut perceivable in an anaglyph depends on the amount and distribution of retinal rivalry. In fact, the effects of retinal rivalry on the perceived color gamut is often greater than the effect of leaking complementary colors through the filters. This is a further reason that color gamut calculations based on conventional color models have limited meaning when applied to conventional anaglyphs.

Grayscale anaglyphs are anaglyphs which are constructed from grayscale versions of stereoscopic images. The grayscale values of the first image are displayed in two primary colors while the grayscale values of the second image are displayed in the remaining primary colors. A grayscale anaglyph may appear grayscale when viewed through the anaglyph viewing filters. Grayscale anaglyphs have the advantage of having nearly no perceivable retinal rivalry, but have the disadvantage of not providing colored stereo views. Herein, an anaglyph may be considered to be a color anaglyph unless otherwise stated.

The prior art contains a method to display stereoscopic image using six primary colors with non-overlapping spectra. The first image may be displayed in red $R_1$, green $G_1$ and blue $B_1$ primary colors. The second image may be displayed in red $R_2$, green $G_2$ and blue $B_2$ primary colors. The spectra of the primary colors do not substantially overlap. A first viewing filter $F_1$ substantially transmits the red $R_1$, green $G_1$ and blue $B_1$ primary colors and blocks the red $R_2$, green $G_2$ and blue $B_2$ primary colors. A second viewing filter $F_2$ substantially transmits the red $R_2$, green $G_2$ and blue $B_2$ primary colors and blocks the red $R_1$, green $G_1$ and blue $B_1$ primary colors. The first viewing filter $F_1$ may be used to selectively view the first image while the second viewing filter $F_2$ may be used to selectively view the second image. The primary color spectra are such that the spectra of the primary color $R_1$ is positioned at shorter wavelengths than the spectra of primary color $R_2$, the spectra of the primary color $G_1$ is positioned at shorter wavelengths than the spectra of primary color $G_2$, and the spectra of the primary color $B_1$ is positioned at shorter wavelengths than the spectra of primary color $B_2$. This method of displaying stereoscopic images has the disadvantage of the viewing filters being relatively expensive to manufacture. Also the methods of displaying stereoscopic image with the six primary colors $\{R_1, R_2, G_1, G_2, B_1, B_2\}$ described in the prior art produces retinal rivalry for some distribution of hues in the stereoscopic image.

A white primary color is often used in digital display apparatus in order to increase the brightness of the display apparatus. The white primary color is often beneficial for displaying white backgrounds such as a white background against black text. The white primary color may also be used to increase the brightness of images. In this case, some loss of saturation of the images usually occurs. A display with a white primary color W usually also has red R, green G and blue B primary colors. Therefore displays with a white primary color often provide a total of four (or more) primary colors $\{R, G, B, W\}$. In the prior art, the spectra of the primary color W overlaps the spectra of the primary colors $\{R, G, B\}$ and their polarization states are usually identical.

Four (or more) primary colors may be provided in a projector by (1) using four (or more) segments in a color filter wheel, or (2) time-multiplexing the light source where the light source may be LED's or laser diodes, or (3) using four micro display devices, or (4) using a four-color pixel format in a micro display device or (5) some other method. Hybrids of these methods can also be used. Four primary colors can be provided in a flat panel display by using a four-color pixel pattern. Flat panel displays may include LCD displays and plasma displays.

BRIEF SUMMARY OF THE INVENTION

The present invention is directed to the use of primary colors, color transformations, and special filters to display and view digital anaglyphs with wide color gamuts without retinal rivalry.

The present invention involves the concept of brightness contrast in the first and second images of a stereoscopic image. If the brightness contrast is balanced in the first and second images, the stereo view of the stereoscopic image may be free of retinal rivalry and full-stereoscopic depth may be perceived. Anaglyph stereoscopic images typically do not provide balanced brightness contrast due to the different primary colors used in the first and second images. The present invention provides methods of display anaglyph images with balanced brightness contrast for any set of primary colors used for the first and second images.

A general class of anaglyphs is defined in which the spectra of the primary colors of the first and second images are not identical. Anaglyphs have the property that the color transformations of the present invention are generally required in order to balance the brightness contrast in the anaglyph. If the brightness contrast is balanced, the color gamut of anaglyphs is often dominated by a first image of the anaglyph having a greater number of primary colors. Anaglyphs displayed with three primary colors of the present invention generally have incomplete color gamuts where about half the hues of a color wheel may be observed. Anaglyphs displayed with four primary colors of the present invention may be full color gamuts. Anaglyphs displayed in five and six primary colors may have full color gamuts.

Since increasing the number of primary colors of an anaglyph may increase the cost of complexity or reduce the performance of a display apparatus, it may be advantageous to use as few primary colors as possible that provide a full color gamut. Furthermore the cost of viewing filters may increase substantially for each additional primary color. The present invention provides special sets of primary colors which allow relatively inexpensive viewing filter for four, five, and six-primary-color anaglyphs. The present invention provides methods of using a white primary color to display the second image of an anaglyph displayed in four primary colors. The white primary color improves the white colors observed in the stereo view of the anaglyphs. A special three-primary-color anaglyph of the present invention uses a cyan primary color for the second image and red and green primary colors for the first image. The cyan primary color provides adequate brightness range to balance the brightness contrast of the first image.

The present invention provides methods to create and display anaglyph images by a display apparatus. This allows stereoscopic images to be distributed and stored in a standard full-color stereoscopic format and displayed in high quality anaglyphs. The present invention provides methods to process full-color stereoscopic images and display then as high quality anaglyph images. The present provides methods to receive stereoscopic images, transform them into anaglyphs and display the anaglyphs at the rate of a non-stereoscopic images. The prior art generally creates anaglyphs before transferring them to a display apparatus. Whereas the anaglyph of the prior art generally create retinal rivalry, the methods of the present invention may be used to avoid creating retinal rivalry. The present invention provides methods to compress a four-color primary anaglyph into three channels. The three channel format may be beneficial for cases when a communication port is limited to three channels.

DETAILED DESCRIPTION OF THE INVENTION

Figure 1A:
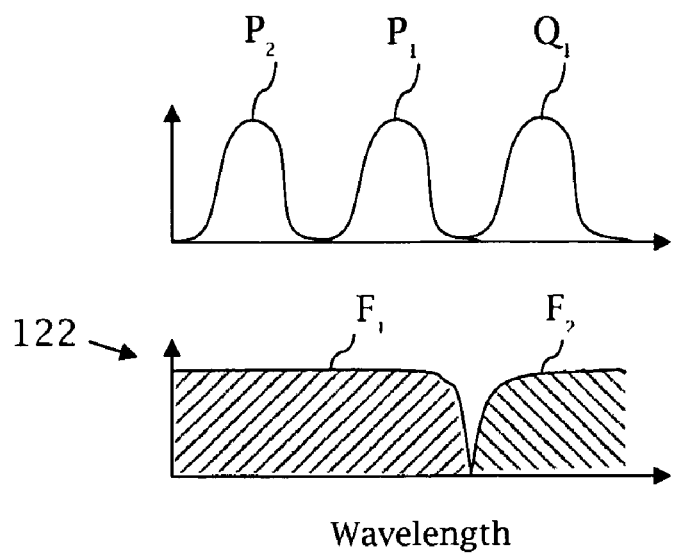
FIG. 1a depicts the spectra of conventional red $Q_1$, green $P_2$, and blue $P_3$ primary colors and the spectra of conventional red and cyan viewing filters.

Additional information can be found in United States patent application serial number 2008/000835 by inventor Monte J. Ramstad which is incorporated in its entirety by reference hereto.

Additional information can be found in United States patent application serial number 2008/000841 by inventor Monte J. Ramstad which is incorporated in its entirety by reference hereto.

Additional information can be found in United States patent application serial number 2008/000855 by inventor Monte J. Ramstad which is incorporated in its entirety by reference hereto.

Additional information can be found in a co-pending United States patent application titled Universal Stereoscopic File Format by inventor Monte J. Ramstad which is incorporated in its entirety by reference hereto.

Generalized Anaglyphs

In general, a display apparatus may display stereoscopic images using a set of primary colors $S_1=\{P_1, \ldots, P_m\}$ to display the first image and a set of primary colors $S_2=\{Q_1, \ldots, Q_n\}$ to display the second image. Herein a primary color is light in a distribution of wavelengths where the intensity of the light may be varied independently. The intensity of each primary color may be varied independently from the intensity of other primary colors. Herein anaglyphs are defined to be stereoscopic images displayed in primary colors $\{P_1, \ldots, P_m\}$ and $\{Q_1, \ldots, Q_n\}$ where at least one primary color (spectra) $P_i$ in the set of primary colors $S_1=\{P_1, \ldots, P_m\}$ of the first image is not present in the set of primary colors $S_2=\{Q_1, \ldots, Q_n\}$ of the second image. Herein, the number of primary colors provided by a display apparatus is assumed to be three or more. Therefore, it is assumed that m+n>2. Anaglyphs of the present invention may have either polarized or non-polarized primary colors. Anaglyphs of the present invention may be viewed with any stereoscopic viewing technology such as colored filter glasses, polarized filter glasses, side-by-side viewers, head mounted displays, or autostereoscopic screens. Stereoscopic images which are displayed using primary colors having identical spectra for the first and second images are not considered to be anaglyphs herein.

Since the primary colors in the first and second images of an anaglyph are not identical, the brightness contrast of like subject matter in the first and second images may be unbalanced. Unbalanced brightness contrast is often associated with retinal rivalry in the stereo view of a stereoscopic image. Therefore retinal rivalry may be observed in anaglyphs unless the methods of the present invention are applied in order to balance the brightness contrast in the first and second images.

Herein the term anaglyph refers to color anaglyphs when the context implies a color anaglyph.

The Stereoscopic Brightness Coordinate

The present invention identifies the color property which may be substantially used by the visual system to process stereoscopic information. Herein this stereoscopic color property is called brightness contrast or brightness. The brightness may be considered a carrier of the brightness contrast in the image. When the brightness contrast is balanced in the first and second images for like subject matter, retinal rivalry may be essentially absent from the stereo view and full stereoscopic depth (true-depth) may be perceived in a stereo view.

In stereoscopic images, retinal rivalry may be associated with unbalanced brightness contrast in the first and second images of the stereo view. For example in red/cyan anaglyphs, a red object, which may appear relatively bright through a red filter and may appear relatively dark through a cyan filter, may cause retinal rivalry in a stereo view. Usually the human visual system does not stereoscopically fuse a dark object observed by one eye with a bright object observed by the other eye. Instead, the user essentially experiences double vision where the left and right eyes "see" independently. Then stereoscopic perception may be much reduced or absent. (Stereoscopic perception requires the cooperation of both eyes.) In this way, the presence of retinal rivalry or unbalanced brightness contrast may be associated with less than full stereoscopic depth perception in a stereoscopic image.

In general, retinal rivalry may be observed in stereoscopic images where an edge in the subject matter may be observed with more brightness contrast in one eye than in the other eye. This suggests that balancing the brightness contrast in all subject matter may eliminate retinal rivalry. Furthermore, stereoscopic fusion depends largely on the edges of objects being observed by both eyes. Herein an edge may be generalized to any type of brightness contrast in an image. In order for all edges to be equally detected by both eyes for all subject matter, it is apparently sufficient to observe balanced brightness contrast at all brightness levels in the image. Herein the definition of balanced brightness contrast in the first and second views is: the relative brightness contrast in the two views which eliminates retinal rivalry in the stereo view at substantially all brightness levels. By balancing the brightness contrast in all subject matter observed by the left and right eyes in a stereo view, full-depth perception may be perceived in the stereo view.

The brightness of a color is generally an integral of the brightness contrast. Therefore, the present invention provides a definition of brightness. Determining a condition of balanced brightness may require comparing the brightness of various colors. The relative brightness of different colors may depend on subjective evaluation by users. The apparent relative brightness of different colors may vary from user to user and may vary over time for the same user. The relative brightness of different color hues may also depend on the size of a patch of a color hue, the surrounding color hues, and on the vision adaptation of the user.

In the prior art, the term brightness is generally used to describe an observed property of light rather than a physical property of light. In the present invention, brightness also describes an observed property of light. However, in the present invention, brightness is defined by the absence of retinal rivalry in a stereo view rather than the property of a single image.

The brightness color property $Y_B$ of the present invention may be similar to the luminance coordinate Y in the CIE xyY color spaces however, the defining measurements are different. Some of the differences in the measurements of the brightness $Y_B$ of the present invention and luminance Y of the CIE color models may include: (1) the brightness $Y_B$ may be determined while viewing through colored filter glasses whereas the luminance Y is determined using unfiltered vision; (2) the number of primary colors contributing to the brightness $Y_B$ and the luminance Y may be different; (3) the color patch size may not necessarily be fixed when determining $Y_B$ whereas a standard patch size is usually used to determine the luminance Y; (4) the brightness $Y_B$ is defined by the observed retinal rivalry being minimized for all edges (or levels of contrast) whereas the luminance Y is defined by judging the "brightness" of a single image; (5) the spectra of primary colors contributing to the brightness $Y_B$ and the luminance Y may be different especially when brightness $Y_B$ takes into account the effects of the viewing filters on the primary colors; (6) the white point of the color space may be shifted in the measurement of the brightness $Y_B$ due to the limited spectra of the viewing filters, (7) the brightness $Y_B$ may include factors such as chromatic brightness and vision adaptation. Herein, chromatic brightness may include the enhanced brightness observed in highly saturated colors, in colors that include a narrow range of wavelengths of light, and in colors of various patch size.

Although the brightness $Y_B$ and luminance Y properties are defined differently, in practice they may describe similar properties of light. Therefore in some embodiments of the present invention, the brightness $Y_B$ and the luminance Y may be used interchangeably. The present invention may utilize any method of calculating the brightness $Y_B$ which may include methods which follow by analogy from methods of calculating the luminance Y which may be described in the prior art or developed in the future. Herein the brightness $Y_B$ coordinate may also be called the luminance coordinate without loss of generality.

Displaying Anaglyphs with Balanced Brightness

One embodiment of the present invention provides a method of displaying stereoscopic images comprising a display apparatus providing primary colors $\{P_1, \ldots, P_m\}$ for displaying a first image and providing primary colors $\{Q_1, \ldots, Q_n\}$ for displaying a second image. The first image may be representable in color coordinates $\{A_1, \ldots, A_r\}$. The second image may be representable in color coordinates $\{B_1, \ldots, B_s\}$. The display apparatus may include a transformation $G_1$ which transforms the coordinates $\{A_1, \ldots, A_r\}$ into the primary colors $\{P_1, \ldots, P_m\}$ and a transformation $G_2$ which transforms the coordinates $\{B_1, \ldots, B_s\}$ into the primary colors $\{Q_1, \ldots, Q_n\}$ whereby the brightness displayed in the first and second images may be balanced for like subject matter in the first and second images. The coordinates $\{A_1, \ldots, A_r\}$ and $\{B_1, \ldots, B_s\}$ may be coordinates of any color space from which the brightness of the first and second images may be obtained.

The transformations $G_1$ and $G_2$ may be summarized as follows:

$$\{A_1, \ldots, A_r\} \xrightarrow{G_1} \{P_1, \ldots, P_m\} \text{ and,}$$

$$\{B_1, \ldots, B_s\} \xrightarrow{G_2} \{Q_1, \ldots, Q_n\}.$$

Typically stereoscopic images may be captured or created with balanced brightness for like subject matter. Herein, the first and second images represented in coordinates $\{A_1, \ldots, A_r\}$ and coordinates $\{B_1, \ldots, B_s\}$ respectively have balanced brightness for like subject matter. The transformation $G_1$ may conserve the brightness contrast of the first image in the primary colors $\{P_1, \ldots, P_m\}$. The transformation $G_2$ may conserve the brightness contrast of the second image in the primary colors $\{Q_1, \ldots, Q_n\}$. Then the primary colors $\{P_1, \ldots, P_m\}$ and $\{Q_1, \ldots, Q_n\}$ may display balanced brightness contrast for like subject matter in the first and second images.

The transformation $G_1$ may be selected so that the brightness $Y_P$ observed in the primary colors $\{P_1, \ldots, P_m\}$ may be balanced with the brightness $Y_A$ represented in the coordinates $\{A_1, \ldots, A_r\}$. For example, if the brightness $Y_P$ may be approximated by $$Y_P = (\beta_1 P_1^\gamma + \beta_2 P_2^\gamma + \beta_3 P_3^\gamma)^{1/\gamma},$$

and the brightness $Y_A$ may be approximated by $$Y_A = (\alpha_1 A_1^\gamma + \alpha_2 A_2^\gamma + \alpha_3 A_3^\gamma)^{1/\gamma},$$

the transformation $G_1$ may be selected so that brightness contrast of $Y_P$ may be balanced with the brightness contrast of $Y_A$, $Y_P \sim Y_A$.

Similarly, the transformation $G_2$ may be selected so that the brightness $Y_Q$ observed in the primary colors $\{Q_1, \ldots, Q_n\}$ may be balanced with the brightness $Y_B$ represented in the coordinates $\{B_1, \ldots, B_s\}$. For example, if $Y_Q$ may be approximated by $$Y_Q = (\delta_1 Q_1^\gamma + \delta_2 Q_2^\gamma + \delta_3 Q_3^\gamma)^{1/\gamma},$$

and $Y_B$ may be approximated by $$Y_B = (\epsilon_1 B_1^\gamma + \epsilon_2 B_2^\gamma + \epsilon_3 B_3^\gamma)^{1/\gamma},$$

the transformation $G_2$ may be selected so that brightness contrast of $Y_P$ may be balanced with the brightness contrast of $Y_A$, $Y_Q \sim Y_B$.

Alternatively, the $G_1$ and $G_2$ transformations may be selected so that the displayed stereoscopic image has balanced brightness in the primary colors $\{P_1, \ldots, P_m\}$ and $\{Q_1, \ldots, Q_n\}$, which may be a less restrictive condition on the transformations $G_1$ and $G_2$ than transforming the brightness represented in the coordinates $\{A_1, \ldots, A_r\}$ and $\{B_1, \ldots, B_s\}$ into the primary colors $\{P_1, \ldots, P_m\}$ and $\{Q_1, \ldots, Q_n\}$ respectively.

Herein the values of the primary colors $\{P_1, \ldots, P_m\}$ and $\{Q_1, \ldots, Q_n\}$ may be considered the color coordinate values of a display apparatus. The display apparatus may transform the coordinate values into the physical primary colors $\{P_1, \ldots, P_m\}$ and $\{Q_1, \ldots, Q_n\}$. Herein the notation does not always distinguish between the color coordinates of the display apparatus and the physical primary colors of a display apparatus although the distinction will be clear from the context to one skilled in the art.

In U.S. patent application serial number 2008/000835 of the present inventor, methods to balance the brightness contrast of the primary colors $\{P_1, \ldots, P_m\}$ and $\{Q_1\}$ are described, and a calibration based on observation is described. In the present invention, the transformations $G_1$ and $G_2$ may be selected to conserve the brightness contrast represented in the coordinates $\{A_1, \ldots, A_r\}$ and $\{B_1, \ldots, B_s\}$, therefore, brightness calibrations based on observations may not be required for the methods described herein. However observations remain the foundation of the balanced brightness condition. The methods of testing for balanced brightness contrast of the displayed images described in U.S. patent application serial number 2008/000835 may be adapted to the present case of multiple primary colors $\{Q_1, \ldots, Q_n\}$ used to display the second image. Therefore, the weaker condition on transformations $G_1$ and $G_2$ which balances the brightness contrast of the displayed images rather than conserving the brightness contrast in the coordinates $\{A_1, \ldots, A_r\}$ and $\{B_1, \ldots, B_s\}$ is within the scope of the present invention.

The transformation $G_1$ of the first image into the primary colors $\{P_1, \ldots, P_m\}$ which conserves the brightness contrast represented in the coordinates $\{A_1, \ldots, A_r\}$ may be obtained as follows:

First, the coordinates $\{A_1, \ldots, A_r\}$ may be transformed into linear brightness coordinates $\{A^L_1, \ldots, A^L_r\}$:

$$A^L_j = H_{Aj}(A_j)$$

using functions $H_{Aj}$. The functions $H^{-1}_{Aj}$ are the non-linearity functions encoded into the coordinates of the first image. Linear brightness coordinates may be defined as color coordinates whose contribution to the brightness of a color may be added together to obtain the total brightness of a color.

In some reference color spaces, the form of the $H_{Aj}$ functions may be approximated by gamma functions. For example in the sRGB color space, the functions $H_{Aj}$ may be approximated by:

$$H_{Aj}(A_j) = A_j^\gamma$$

where $\gamma$ may be about 2.2. Then the linear brightness $Y^L_A$ of the first image may be obtained by adding the contribution of each coordinate to the brightness:

$$Y^L_A = \Sigma_j \alpha_j A^L_j = \Sigma_j \alpha_j H_{Aj}(A_j)$$

where $$1 = \Sigma_j \alpha_j.$$

The parameters $\alpha_j$ may be determined from observations. In a reference color space, the values of $\alpha_j$ may be known. For example in the sRGB color space, $\alpha_1$ may be about 0.2126, $\alpha_2$ may be about 0.7152, and $\alpha_3$ may be about 0.0722.

Second, a transformation M may be selected to transform the coordinates $A^L_j$ into the linear primary color values $P^L_k = H_P(P_k)$ of the display apparatus as follows $$P^L_k = \Sigma_j M_{kj} A^L_j = \Sigma_j M_{kj} H_{Aj}(A_j).$$

Preferably, the elements $M_{kj}$ may be selected to represent the chromaticity of the coordinates $\{A_1, \ldots, A_r\}$ in the primary colors $\{P_1, \ldots, P_m\}$ however, this is not required in order to display a balanced brightness stereoscopic image. In general, the transformation M may be a linear transformation or it may a complex, non-linear function.

The linear brightness of the first image displayed in the $\{P_1, \ldots, P_m\}$ primary colors may be approximated by $$Y^L_P = \Sigma_k \beta_k P^L_k = \Sigma_k \beta_k H_P(P_k)$$

where $$1 = \Sigma_k \beta_k.$$

The parameters $\beta_k$ may be determined from experimental observations of the relative brightness of the primary colors of the display apparatus viewed through a first viewing filter $F_1$.

In order to conserve the brightness contrast in the first image, the elements $M_{kj}$ may satisfy the condition $$\alpha_j = \lambda_1 \Sigma_k \beta_k M_{kj}$$

where $\lambda_1$ is a scaling factor. These conditions may be satisfied by selecting elements $M_{kj}$ which conserve the brightness of each initial color coordinate $A_j$.

Third, the linear primary colors $P^L_k$ may be transformed into the non-linear values used by the display apparatus $$P_k = H^{-1}_{Pk}(P^L_k)$$

where the functions $H^{-1}{}_{Pk}$ may be determined for the display apparatus. A display apparatus may use a gamma function to approximate $H_{Pk}$ as follows:

$$P_k = (P^L{}_k)^{1/\gamma k}$$

where the $\gamma_k$ are properties of the display apparatus.

The transformation $G_1$ may be summarized as $$P_k = H^{-1}{}_{Pk}(\Sigma_j M_{kj} H_{Aj}(A_j))$$

or sometimes as $$P_k = (\Sigma_j M_{kj} A_j^{\gamma_j})^{1/\gamma k}$$

where $\gamma$ and $\gamma_k$ are often near 2.2.

The above procedure may also be applied to the second image of a stereo pair using the second filter $F_2$ to determine the brightness contribution of each primary color in the anaglyph image.

The transformation $G_2$ of the second image into the primary colors $\{Q_1, \ldots, Q_n\}$ which conserves the brightness contrast represented in the coordinates $\{B_1, \ldots, B_s\}$ may be obtained as follows:

First, the coordinates $\{B_1, \ldots, B_s\}$ may be transformed into linear brightness coordinates $\{B^L{}_1, \ldots, B^L{}_s\}$:

$$B^L{}_j = H_{Bj}(B_j)$$

using functions $H_{Bj}$. The functions $H^{-1}{}_{Bj}$ are the non-linearity functions encoded into the coordinates of the second image.

In some reference color spaces, the form of the functions $H_{Bj}$ may be approximated by the gamma functions. For example in the sRGB color space, the functions $H_{Bj}$ may be approximated by:

$$H_{Bj}(B_j) = B_j^{\gamma_j}$$

where $\gamma j$ may be about 2.2. Then the linear brightness $Y^L{}_B$ of the second image may be obtained by adding the contribution of each coordinate to the brightness:

$$Y^L{}_B = \Sigma_j \delta_j B^L{}_j$$

where $$1 = \Sigma_j \delta_j.$$

The parameters $\delta_j$ may be determined from observations. In a reference color space, the values of $\delta_j$ may be known. For example in the sRGB color space, $\delta_1$ may be about 0.2126, $\delta_2$ may be about 0.7152, and $\delta_3$ may be about 0.0722.

Second, a transformation N may be selected to transform the coordinates $B^L{}_j$ into the linear primary color values $Q^L{}_k = H_{Qk}(Q_k)$ of the display apparatus $$Q^L{}_k = \Sigma_j N_{kj} B^L{}_j = \Sigma_j N_{kj} H_{Bj}(B_j).$$

Preferably, the elements $N_{kj}$ may be selected to represent the chromaticity of the coordinates $\{B_1, \ldots, B_s\}$ in the primary colors $\{Q_1, \ldots, Q_n\}$ however, this is not required in order to display a balanced brightness stereoscopic image. In general, transformation N may be a linear transformation or it may a complex, non-linear function.

The linear brightness of the second image displayed in the primary colors $\{Q_1, \ldots, Q_n\}$ may be approximated by $$Y^L{}_Q = \Sigma_k \epsilon_k Q^L{}_k = \Sigma_k \epsilon_k H_{Qk}(Q_k)$$

where $$1 = \Sigma_k \epsilon_k.$$

The parameters $\epsilon_k$ may be determined from experimental observations of the relative brightness of the primary colors of the display apparatus viewed through a second viewing filter $F_2$.

In order to conserve the brightness contrast in the second image, the elements $N_{kj}$ may satisfy the condition $$\delta_j = \lambda_2 \Sigma_k \epsilon_k N_{kj}$$

where $\lambda_2$ is a scaling factor. This condition may be satisfied by selecting elements $N_{kj}$ in order to conserve the brightness of each initial color coordinate $B_j$.

Third, the linear primary colors $Q^L{}_k$ may be transformed into the non-linear values used by the display apparatus $$Q_k = H^{-1}{}_{Qk}(Q^L{}_k)$$

where the functions $H^{-1}{}_{Qk}$ may be determined for the primary colors of a display apparatus. A display apparatus may use a gamma function to approximate the $H_{Qk}$ as follows:

$$Q_k = (Q^L{}_k)^{1/\gamma k}$$

where the $\gamma_k$ are properties of the display apparatus.

The transformation $G_2$ may be summarized as $$Q_k = H^{-1}{}_{Qk}(\Sigma_j N_{kj} H_{Bj}(B_j))$$

or sometimes as $$Q_k = (\Sigma_j N_{kj} B_j^{\gamma_j})^{1/\gamma k}$$

where $\gamma$ and $\gamma_k$ are often near 2.2.

The filters $F_1$ and $F_2$ may be colored filters or polarized filters. In some display methods, viewing filters may not be needed and the $F_1$ and $F_2$ filters may be replaced by the viewing apparatus of the display method. If the spectra of the primary colors $\{P_1, \ldots, P_m\}$ do not substantially overlap the spectra of the primary colors $\{Q_1, \ldots, Q_n\}$, the viewing filters may be color filters where the first viewing filter $F_1$ substantially transmits the primary colors $\{P_1, \ldots, P_m\}$ and blocks the primary colors $\{Q_1, \ldots, Q_n\}$; and the second viewing filter $F_2$ substantially transmits the primary colors $\{Q_1, \ldots, Q_n\}$ and blocks the primary colors $\{P_1, \ldots, P_m\}$.

The two transformations $G_1$ and $G_2$ may be used to transform the initial stereoscopic image coordinates containing any distribution of color into displayed anaglyph images with balanced brightness contrast. These methods apply to anaglyphs displayed using any number of primary colors. Examples of applying these transformations to various numbers of primary colors are given below. Examples are described for two and three primary colors $\{P_1, \ldots, P_m\}$ and one primary color $\{Q_1\}$ corresponding to three-color and four-color anaglyphs. Examples are described for two and three primary colors $\{Q_1, \ldots, Q_n\}$ corresponding to five-color and six-color anaglyphs.

Balanced Brightness Three Primary Color Anaglyphs

An example of applying transformations $G_1$ and $G_2$ to the case of a three primary color anaglyph follows:

For this example, the first image may be stored in red $R_1$, $G_1$ and blue $B_1$ coordinates of the sRGB color space and displayed in primary colors green $G_a$, and blue $B_a$ of a display apparatus. The brightness contributions of the red $R_1$, green $G_1$ and blue $B_1$ coordinates of the sRGB color space may be approximated by $$Y^L{}_A = 0.2126 R^L{}_1 + 0.7152 G^L{}_1 + 0.0722 B^L{}_1$$

where a gamma function may be used to linearize the image coordinates $$R^L_1 = R_1^\gamma,$$

$$G^L_1 = G_1^\gamma, \text{ and}$$

$$B^L_1 = B_1^\gamma$$

where $\gamma$ may be about 2.2.

For a particular cyan color filter $F_1$ and a particular display apparatus, the green primary color $G^L_1$ may contribute about 80 percent to the brightness while the blue primary color $B^L_1$ may contribute about 20 percent to the brightness $$Y^L_P = 0.80 G^L_a + 0.20 B^L_a.$$

The balanced brightness conditions on the transformation $M_{kj}$ may be $$0.21 = 0.80 M_{GR} + 0.20 M_{BR},$$

$$0.72 = 0.80 M_{GG} + 0.20 M_{BG},$$

$$0.07 = 0.80 M_{GB} + 0.20 M_{BB}.$$

The coordinate $G^L_1$ may be mapped 100 percent into the primary color $G^L_a$. The coordinate $B^L_1$ may be mapped 100 percent into the primary color $B^L_a$. The coordinate $R^L_1$ may be mapped 50 percent into the primary color $G^L_a$ and 50 percent into the primary color $B^L_a$. In other words, $M_{BG} = M_{GB} = 0$ and $M_{GR} = M_{BR}$. This choice maps the coordinate $R^L_1$ into a cyan or gray color of the anaglyph. Then $$0.21 = 0.80 M_{GR} + 0.20 M_{BR},$$

$$0.72 = 0.80 M_{GG},$$

$$0.07 = 0.20 M_{BB}.$$

It follows that $M_{GR} = M_{BR} = 0.21$, $M_{GG} = 0.9$, and $M_{GB} = 0.35$. Then $$G^L_a = 0.9 G^L_1 + 0.21 R^L_1,$$

$$B^L_a = 0.35 B^L_1 + 0.21 R^L_1.$$

Since $M_{GG} + M_{GR} = 1.11$, is greater than 1.0, the values of $G^L_a$ may exceed the capabilities of the display apparatus. Therefore, the $M_{kj}$ may be divided by 1.11 to obtain $$G^L_a = 0.81 G^L_1 + 0.19 R^L_1,$$

$$B^L_a = 0.32 B^L_1 + 0.19 R^L_1.$$

The renormalization of the $M_{kj}$ elements will be understood by those skilled in the art to be consistent with balancing the brightness contrast of the displayed images.

The complete transformation $G_1$ may be written as:

$$G_a = (0.81 G_1^\gamma + 0.19 R_1^\gamma)^{1/\gamma},$$

$$B_a = (0.32 B_1^\gamma + 0.19 R_1^\gamma)^{1/\gamma}$$

where in this case $\gamma$ may be taken to be 2.2. Here the coordinate $R_1$ adds equally to the primary colors $G_a$ and $B_a$ which contributes to the "grayscale" level the anaglyph. Other choices of M may be used to shift the contribution of $R_1$ toward either the green or blue channels.

The second image may be stored in red $R_2$, $G_2$ and blue $B_2$ coordinates of the sRGB color space and displayed in a red primary color $R_a$ of a display apparatus. The brightness contributions of the red $R_2$, green $G_2$ and blue $B_2$ coordinates of the sRGB color space may be approximated by $$Y^L_B = 0.2126 R^L_2 + 0.7152 G^L_2 + 0.0722 B^L_2$$

where a gamma function may be used to linearize the image coordinates $$R^L_2 = R_2^\gamma,$$

$$G^L_2 = G_2^\gamma, \text{ and}$$

$$B^L_2 = B_2^\gamma$$

where $\gamma$ may be about 2.2.

For a particular color filter $F_2$, the primary color $R^L_a$ may contribute 100 percent to the brightness of the displayed second image.

$$Y^L_Q = 1.0 R^L_a.$$

The red $R^L_2$, green $G^L_2$ and blue $B^L_2$ coordinates may be mapped 100 percent into the primary color $R^L_a$. The balanced brightness conditions on the transformation $N_{kj}$ may be $$0.21 = N_{RR},$$

$$0.72 = N_{RG},$$

$$0.07 = N_{RB}.$$

Then $$R^L_a = 0.21 R^L_2 + 0.72 G^L_2 + 0.07 B^L_2.$$

The complete transformation $G_2$ may be written as:

$$R_a = (0.21 R_2^\gamma + 0.72 G_2^\gamma + 0.07 B_1^\gamma)^{1/\gamma}$$

where in this case $\gamma$ may be taken to be 2.2.

These transformations $G_1$ and $G_2$ may be used to create balanced brightness anaglyphs with three primary colors from stereoscopic images with any initial color distribution once the calibration parameters are determined accurately. Although this example is applied to a red/cyan anaglyph, the methods of the present invention may also be applied to blue/yellow and green/magenta anaglyphs.

Balanced Brightness Four Primary Color Anaglyphs

An example of applying transformations $G_1$ and $G_2$ to the case of a four primary color anaglyph follows:

For this example, the first image may be stored in red $R_1$, $G_1$ and blue $B_1$ coordinates of the sRGB color space and displayed in primary colors red $R_a$, green $G_a$, and blue $B_a$ of a display apparatus. The brightness contributions of the red $R_1$, green $G_1$ and blue $B_1$ coordinates of the sRGB color space may be approximated by $$Y^L_A = 0.2126 R^L_1 + 0.7152 G^L_1 + 0.0722 B^L_1$$

where a gamma correction may be used to linearize the image coordinates $$R^L_1 = R_1^\gamma,$$

$$G^L_1 = G_1^\gamma, \text{ and}$$

$$B^L_1 = B_1^\gamma$$

where $\gamma$ may be about 2.2.

For a particular color filter $F_1$ and a particular display apparatus, the red primary color $R^L_1$ may contribute about 30 percent to the brightness, the green primary color $G^L_1$ may contribute about 60 percent to the brightness, while the blue primary color $B^L_1$ may contribute about 10 percent to the brightness $$Y^L_P = 0.30 R^L_1 + 0.60 G^L_1 + 0.10 B^L_1.$$

The balanced brightness conditions on the transformation $M_{kj}$ may be $$0.21 = 0.30 M_{RR} + 0.60 M_{GR} + 0.10 M_{BR},$$

$$0.72 = 0.30 M_{RG} + 0.60 M_{GG} + 0.10 M_{BG},$$

$$0.07 = 0.30 M_{RB} + 0.60 M_{GB} + 0.10 M_{BB}.$$

A simple case is to set the off diagonal elements of $M_{kj}$ to zero. Then $$0.21 = 0.30 M_{RR},$$

$$0.72 = 0.60 M_{GG},$$

$$0.07 = 0.10 M_{BB}.$$

It follows that $M_{RR} = 0.7$, $M_{GG} = 1.2$, and $M_{BB} = 0.7$. Then $$R^L_a = 0.7 R^L_1,$$

$$G^L_a = 1.2 G^L_1,$$

$$B^L_a = 0.7 B^L_1.$$

Since $M_{GG} = 1.2$, is greater than 1.0, the values of $G^L_a$ may exceed the capabilities of the display apparatus. Therefore, the $M_{kj}$ may be divided by 1.2 to obtain $$R^L_a = 0.58 R^L_1,$$

$$G^L_a = 1.0 G^L_1,$$

$$B^L_a = 0.58 B^L_1.$$

The renormalization of the elements of $M_{kj}$ will be understood by those skilled in the art to be consistent with balancing the brightness contrast of the displayed images.

The complete transformation $G_1$ may be written as:

$$R^L_a = (0.58 R_1^{2.2})^{1/\gamma},$$

$$G^L_a = G_1^{2.2/\gamma},$$

$$B^L_a = (0.58 B_1^{2.2})^{1/\gamma}$$

where $\gamma_j$ may often be chosen to be 2.2 for each primary color $P_j$, but this may depend on the properties of the primary colors of the display apparatus. If $\gamma = 2.2$, then $$R_a = 0.78 R_1,$$

$$G_a = G_1,$$

$$B_a = 0.78 B_1.$$

In general, a transformation $G_1$ may also be selected to map the chromaticity of the first image in the primary colors $\{P_1, P_2, P_3\}$ to the chromaticity of the first image in the coordinates $\{A_1, \ldots, A_m\}$. In this case, the off-diagonal elements of $M_{kj}$ may not necessarily be zero and the transformation $M_{kj}$ may be more complex.

The second image may be stored in red $R_2$, green $G_2$, and blue $B_2$ coordinates of the sRGB color space and displayed in a fourth primary color $Q_1$ of a display apparatus. The brightness contributions of the red $R_2$, green $G_2$ and blue $B_2$ coordinates of the sRGB color space may be approximated by $$Y^L_B = 0.2126 R^L_2 + 0.7152 G^L_2 + 0.0722 B^L_2$$

where a gamma correction may be used to linearize the image coordinates $$R^L_2 = R_2^\gamma,$$

$$G^L_2 = G_2^\gamma, \text{ and}$$

$$B^L_2 = B_2^\gamma$$

where $\gamma$ may be about 2.2.

For a particular color filter $F_2$, the primary color $Q^L_1$ may contribute 100 percent to the brightness of the displayed second image.

$$Y^L_Q = 1.0 Q^L_1.$$

The red $R^L_2$, green $G^L_2$ and blue $B^L_2$ coordinates may be mapped 100 percent into the primary color $Q^L_1$. The balanced brightness conditions on the transformation $N_{kj}$ may be $$0.21 = N_{RR},$$

$$0.72 = N_{RG},$$

$$0.07 = N_{RB}.$$

Then $$Q^L_1 = 0.21 R^L_2 + 0.72 G^L_2 + 0.07 B^L_2.$$

The complete transformation $G_2$ may be written as:

$$Q_1 = (0.21 R_2^\gamma + 0.72 G_2^\gamma + 0.07 B_2^\gamma)^{1/\gamma}$$

where in this case $\gamma$ may be taken to be 2.2.

These transformations $G_1$ and $G_2$ may be used to create balanced brightness anaglyphs with four primary colors from stereoscopic images with any initial color distribution once the calibration parameters are determined accurately.

Balanced Brightness Five Primary Color Anaglyphs

An example of applying transformations $G_1$ and $G_2$ to the case of five primary color anaglyphs follows:

For this example, the first image may be stored in red $R_1$, green $G_1$, and blue $B_1$ coordinates of the sRGB color space and displayed in primary colors red $R_a$, green $G_a$, and blue $B_a$ of a display apparatus. The brightness contributions of the red $R_1$, green $G_1$ and blue $B_1$ coordinates of the sRGB color space may be approximated by $$Y^L_A = 0.2126 R^L_1 + 0.7152 G^L_1 + 0.0722 B^L_1$$

where a gamma correction may be used to linearize the image coordinates $$R^L_1 = R_1^\gamma,$$

$$G^L_1 = G_1^\gamma, \text{ and}$$

$$B^L_1 = B_1^\gamma$$

where $\gamma$ may be about 2.2.

For a particular color filter $F_1$ and a particular display apparatus, the red primary color $R^L_1$ may contribute about 30 percent to the brightness the green primary color $G^L_1$ may contribute about 60 percent to the brightness while the blue primary color $B^L_1$ may contribute about 10 percent to the brightness $$Y^L_P = 0.30 R^L_1 + 0.60 G^L_1 + 0.10 B^L_1.$$

The balanced brightness conditions on the transformation $M_{kj}$ may be $$0.21 = 0.30 M_{RR} + 0.60 M_{GR} + 0.10 M_{BR},$$

$$0.72 = 0.30 M_{RG} + 0.60 M_{GG} + 0.10 M_{BG},$$

$$0.07 = 0.30 M_{RB} + 0.60 M_{GB} + 0.10 M_{BB}.$$

A simple case is to set the off diagonal elements of $M_{kj}$ to zero. Then $$0.21=0.30M_{RR},$$

$$0.72=0.60M_{GG},$$

$$0.07=0.10M_{BB}.$$

It follows that $M_{RR}=0.7$, $M_{GG}=1.2$, and $M_{BB}=0.7$. Then $$R^L_a=0.7R^L_1,$$

$$G^L_a=1.2G^L_1,$$

$$B^L_a=0.7B^L_1.$$

Since $M_{GG}=1.2$, is greater than 1.0, the values of $G^L_a$ may exceed the capabilities of the display apparatus. Therefore, the $M_{kj}$ may be divided by 1.2 to obtain $$R^L_a=0.58R^L_1,$$

$$G^L_a=1.0G^L_1,$$

$$B^L_a=0.58B^L_1.$$

The renormalization of the elements of $M_{kj}$ will be understood by those skilled in the art to be consistent with balancing the brightness contrast of the displayed images.

The complete transformation $G_1$ may be written as:

$$R^L_a=(0.58R_1^{2.2})^{1/\gamma},$$

$$G^L_a=G_1^{2.2/\gamma},$$

$$B^L_a=(0.58B_1^{2.2})^{1/\gamma}$$

where the $\gamma_j$ may often be chosen to be 2.2 for each primary color $P_j$, but this may depend on the properties of the primary colors of the display apparatus. If $\gamma=2.2$, then $$R_a=0.78R_1,$$

$$G_a=G_1,$$

$$B_a=0.78B_1.$$

In general, a transformation $G_1$ may also be selected to map the chromaticity of the first image in the primary colors $\{P_1, P_2, P_3\}$ to the chromaticity of the first image in the coordinates $\{A_1, \ldots, A_m\}$. In this case, the off-diagonal elements of $M_{kj}$ may not necessarily be zero and the transformation $M_{kj}$ may be more complex.

The second image may be stored in red $R_2$, green $G_2$ and blue $B_2$ coordinates of the sRGB color space and displayed in a fourth and fifth primary colors primary color $\{Q_1, Q_2\}$ of a display apparatus. The brightness contributions of the red $R_2$, green $G_2$ and blue $B_2$ coordinates of the sRGB color space may be approximated by $$Y^L_B=0.2126R^L_2+0.7152G^L_2+0.0722B^L_2$$

where a gamma correction may be used to linearize the image coordinates $$R^L_2=R_2^\gamma,$$

$$G^L_2=G_2^\gamma, \text{ and}$$

$$B^L_2=B_2^\gamma$$

where $\gamma$ may be about 2.2.

For this example, the primary color $Q_1$ may be a red and the primary color $Q_2$ may be a cyan. For a particular color filter $F_2$, the primary color $Q^L_1$ may contribute 50 percent to the brightness while the primary color $Q^L_2$ may contribute 50 percent to the brightness of the displayed second image $$Y^L_Q=0.5Q^L_1+0.5Q^L_2$$

The red coordinate $R^L_2$, may be mapped 100 percent into the primary color $Q^L_1$. The green coordinate $G^L_2$, may be mapped 50 percent into the primary color $Q^L_1$ and 50 percent into the primary color $Q^L_2$. The blue coordinate $B^L_2$, may be mapped 100 percent into the primary color $Q^L_2$. In other words, $N_{2R}=N_{1B}=0$ and $N_{1G}=N_{2G}$.

The balanced brightness conditions on the transformation $N_{kj}$ may be $$0.21=0.50N_{1R},$$

$$0.72=0.50N_{1G}+0.50N_{2G},$$

$$0.07=0.50N_{2B}.$$

It follows that $N_{1R}=0.42$, $N_{1G}=N_{2G}=0.72$, and $M_{2B}=0.14$. Then $$Q^L_1=0.42R^L_2+0.72G^L_2,$$

$$Q^L_2=0.72G^L_2+0.14B^L_2.$$

Since $N_{1R}+N_{1G}=1.14$, is greater than 1.0, the values of $Q^L_1$ may exceed the capabilities of the display apparatus. Therefore, the $N_{kj}$ may be divided by 1.14 to obtain $$Q^L_1=0.37R^L_2+0.63G^L_2,$$

$$Q^L_2=0.63G^L_2+0.12B^L_2.$$

The renormalization of the $N_{kj}$ elements will be understood by those skilled in the art to be consistent with balancing the brightness contrast of the displayed images.

The complete transformation $G_2$ may be written as:

$$Q_1=(0.37R_2^\gamma+0.63G_2^\gamma)^{1/\gamma},$$

$$Q_2=(0.63G_2^\gamma+0.12B_2^\gamma)^{1/\gamma}$$

where in this case $\gamma$ may be taken to be 2.2.

These transformations $G_1$ and $G_2$ may be used to create balanced brightness anaglyphs with five primary colors from stereoscopic images with any initial color distribution once the calibration parameters are determined accurately.

Balanced Brightness Six Primary Color Anaglyphs

An example of applying transformations $G_1$ and $G_2$ to the case of a six primary color anaglyph follows:

For this example, the first image may be stored in red $R_1$, green $G_1$ and blue $B_1$ coordinates of the sRGB color space and displayed in primary colors red $P_1$, green $P_2$, and blue $P_3$ of a display apparatus. The brightness contributions of the red $R_1$, green $G_1$ and blue $B_1$ coordinates of the sRGB color space may be approximated by $$Y^L_A=0.2126R^L_1+0.7152G^L_1+0.0722B^L_1$$

where a gamma correction may be used to linearize the image coordinates $$R^L_1=R_1^\gamma,$$

$$G^L_1=G_1^\gamma, \text{ and}$$

$$B^L_1=B_1^\gamma$$

where $\gamma$ may be about 2.2.

For a particular color filter $F_1$ and a particular display apparatus, the red primary color $R^L_1$ may contribute about 25 percent to the brightness, the green primary color $G^L_1$ may contribute about 70 percent to the brightness, while the blue primary color $B^L_1$ may contribute about 5 percent to the brightness $$Y^L_P = 0.25 P^L_1 + 0.70 P^L_2 + 0.05 P^L_3.$$

The balanced brightness conditions on the transformation $M_{kj}$ may be $$0.21 = 0.25 M_{1R} + 0.70 M_{2R} + 0.05 M_{3R},$$

$$0.72 = 0.25 M_{1G} + 0.70 M_{2G} + 0.05 M_{3G},$$

$$0.07 = 0.25 M_{1B} + 0.70 M_{2B} + 0.05 M_{3B}.$$

A simple case is to set the off diagonal elements of $M_{kj}$ to zero. Then $$0.21 = 0.25 M_{1R},$$

$$0.72 = 0.70 M_{2G},$$

$$0.07 = 0.05 M_{3B}.$$

It follows that $M_{1R}=0.84$, $M_{2G}=1.03$, and $M_{3B}=1.4$. Then $$P^L_1 = 0.84 R^L_1,$$

$$P^L_2 = 1.03 G^L_1,$$

$$P^L_3 = 1.4 B^L_1.$$

Since $M_{3B}=1.4$, is greater than 1.0, the values of $P^L_3$ may exceed the capabilities of the display apparatus. Therefore, the $M_{kj}$ may be divided by 1.4 to obtain $$P^L_1 = 0.60 R^L_1,$$

$$P^L_2 = 0.74 G^L_1,$$

$$P^L_3 = 1.00 B^L_1.$$

The renormalization of the elements of $M_{kj}$ will be understood by those skilled in the art to be consistent with balancing the brightness contrast of the displayed images.

The complete transformation $G_1$ may be written as:

$$P^L_1 = (0.60 R_1^{2.2})^{1/\gamma},$$

$$P^L_2 = (0.74 G_1^{2.2})^{1/\gamma},$$

$$P^L_3 = (1.00 B_1^{2.2})^{1/\gamma}$$

where $\gamma$ may often be chosen to be identical for each primary color $P_j$, but this may depend on the properties of the primary colors of the display apparatus. If $\gamma=2.2$, then $$P_1 = 0.79 R_1,$$

$$P_2 = 0.87 G_1,$$

$$P_2 = 1.00 B_1.$$

In general, a transformation $G_1$ may also be selected to map the chromaticity of the first image in the primary colors $\{P_1, P_2, P_3\}$ to the chromaticity of the first image in the coordinates $\{A_1, \ldots, A_m\}$. In this case, the off-diagonal elements of $M_{kj}$ may not necessarily be zero and the transformation may be more complex.

The second image may be stored in red $R_2$, green $G_2$ and blue $B_2$ coordinates of the sRGB color space and displayed in fourth, fifth and sixth primary colors $\{Q_1, Q_2, Q_3\}$ of a display apparatus. The brightness contributions of the red $R_2$, green $G_2$ and blue $B_2$ coordinates of the sRGB color space may be approximated by $$Y^L_B = 0.2126 R^L_2 + 0.7152 G^L_2 + 0.0722 B^L_2$$

where a gamma correction may be used to linearize the image coordinates $$R^L_2 = R_2^\gamma,$$

$$G^L_2 = G_2^\gamma, \text{ and}$$

$$B^L_2 = B_2^\gamma$$

where $\gamma$ may be about 2.2.

For this example, the primary color $Q_1$ may be red, the primary color $Q_2$ may be a green, and the primary color $Q_2$ may be blue. For a particular color filter $F_2$, the primary color $Q^L_1$ may contribute 15 percent to the brightness, the primary color $Q^L_2$ may contribute 70 percent to the brightness, and the primary color $Q^L_3$ may contribute 15 percent to the brightness of the displayed second image $$Y^L_Q = 0.15 Q^L_1 + 0.70 Q^L_2 + 0.15 Q^L_3$$

The red coordinate $R^L_2$, may be mapped 100 percent into the primary color $Q^L_1$. The green coordinate $G^L_2$, may be mapped 100 percent into the primary color $Q^L_2$. The blue coordinate $B^L_2$, may be mapped 100 percent into the primary color $Q^L_3$. In this case, the off-diagonal elements of $N_{jk}$ may be zero.

The balanced brightness conditions on the transformation $N_{kj}$ may be $$0.21 = 0.15 N_{1R},$$

$$0.72 = 0.70 N_{2G},$$

$$0.07 = 0.15 N_{3B}.$$

It follows that $N_{1R}=1.40$, $N_{2G}=1.03$, and $M_{2B}=0.47$. Then $$Q^L_1 = 1.40 R^L_2,$$

$$Q^L_2 = 1.03 G^L_2,$$

$$Q^L_3 = 0.47 B^L_2.$$

Since $N_{1R}=1.40$, is greater than 1.0, the values of $Q^L_1$ may exceed the capabilities of the display apparatus. Therefore, the $N_{kj}$ may be divided by 1.14 to obtain $$Q^L_1 = 1.00 R^L_2,$$

$$Q^L_2 = 0.73 G^L_2,$$

$$Q^L_3 = 0.34 B^L_2.$$

The renormalization of the $N_{kj}$ elements will be understood by those skilled in the art to be consistent with balancing the brightness contrast of the displayed images.

The complete transformation $G_2$ may be written as:

$$Q_1 = (1.00 R_2^{2.2})^{1/\gamma},$$

$$Q_2 = (0.73 G_2^{2.2})^{1/\gamma},$$

$$Q_3 = (0.34 B_2^{2.2})^{1/\gamma}.$$

where $\gamma_j$ may often be chosen to be identical for each primary color $Q_j$, but this may depend on the properties of the primary colors of the display apparatus. If $\gamma=2.2$, then $$Q_1 = 1.00 R_2,$$

$$Q_2 = 0.87 G_2,$$

$$Q_3 = 0.61 B_2.$$

These transformations $G_1$ and $G_2$ may be used to create balanced brightness anaglyphs with six primary colors from stereoscopic images with any distribution of color once the calibration parameters are determined accurately.

The above examples involved images represented in the sRGB color space. The methods of the present invention also apply to images represented in other color spaces such as the CIE xyY, CIE XYZ and other color spaces.

Primary Colors of Generalized Anaglyphs

Another embodiment of the present invention provides methods to display anaglyphs using only one primary color $\{Q_1\}$ to display the second image and primary colors $\{P_1, \ldots, P_m\}$ to display the first image and with balanced brightness contrast in the first and second images. These anaglyphs may have a color gamut which may be substantially identical to the color gamut of the primary colors $\{P_1, \ldots, P_m\}$ of the first image viewed through the first viewing filter $F_1$. Herein, the color gamut of an image is defined to be the color gamut of the primary colors used to display the image. The color gamut of a set of primary colors is the set of colors which may be displayed by combining the primary colors in various ratios. A color gamut is often defined by the set of points in a CIE xy chromaticity diagram which is bounded by the outer polygon which connects the points in the diagram which represent the primary colors. Anaglyphs displayed using three primary colors and with balanced brightness contrast in the first and second images may have a reduced color gamut substantially defined by just two primary colors $\{P_1, P_2\}$. Anaglyphs displayed using four (or more) primary colors and with balanced brightness contrast in the first and second images may have a full color gamut substantially defined by three primary colors $\{P_1, P_2, P_3\}$. Herein a full-color gamut is a color gamut in which comprises the six hues red, yellow, green, cyan, blue, and magenta. A four-color anaglyph of the present invention with balanced brightness contrast may include a primary color $\{Q_1\}$ that is red, yellow, green, cyan, blue, magenta or white. The case of a white primary color $\{Q_1\}$ is discussed further herein.

Figure 1B:
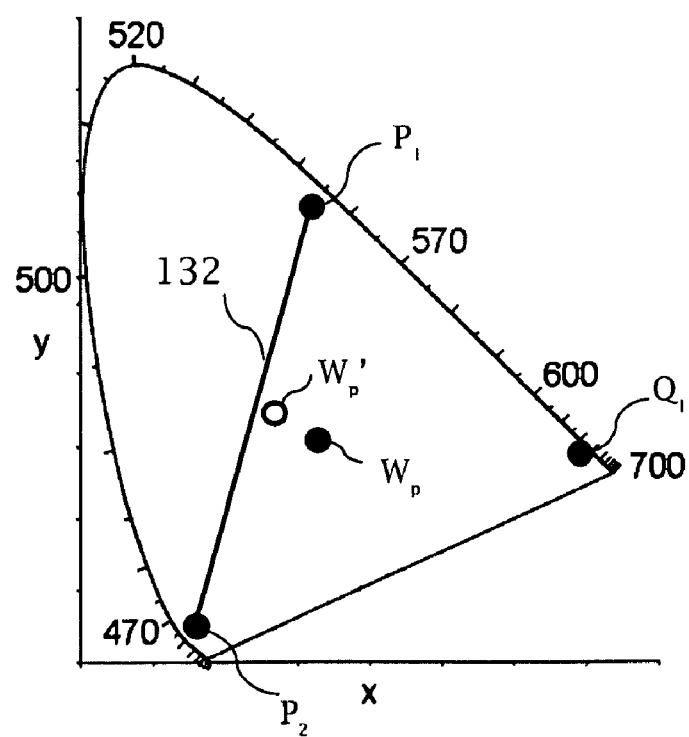
FIG. 1b depicts red $Q_1$, green $P_1$, and blue $P_2$ primary colors on a CIE chromaticity diagram; and the one-dimensional color gamut of the primary colors $\{P_1, P_2\}$.

FIG. 1a depicts the spectra of three primary colors green $P_1$, blue $P_2$, and red $Q_1$ of a three-color anaglyph. FIG. 1a also depicts the spectra 122 of a first viewing filter $F_1$ and a second viewing filter $F_2$ for viewing a red/cyan anaglyph. The first filter $F_1$ substantially transmits the green and blue primary colors and blocks the red primary color. The second filter $F_2$ substantially transmits the red primary color and blocks the green and blue primary colors. FIG. 1b depicts the red $Q_1$, green $P_1$, and blue $P_2$ primary colors in a CIE xy chromaticity diagram. The color gamut of a red/cyan anaglyph displayed with these primary colors and viewed through filters $F_1$ and $F_2$ may be substantially the color gamut of the green $P_1$ and blue $P_2$ primary colors viewed through the first filter $F_1$. The color gamut of the first image or of the red/cyan anaglyph is depicted in FIG. 1b by the line segment 132 connecting the green $P_1$ and blue $P_2$ primary colors. The color gamut may include yellowish-green, unsaturated green, and blue hues. The hues near cyan may become desaturated due to the shift of the white point $W_p'$ toward the cyan hue when viewing through a cyan filter compared with the conventional white point $W_p$. Three-color anaglyphs of the present embodiment have the advantage of being compatible with many display apparatus, may have negligible retinal rivalry, but have the disadvantage of having a reduced color gamut. Similar three-color anaglyphs of the present invention may include blue/yellow anaglyphs and green/magenta anaglyphs with balanced brightness contrast in the first and second images.

Figure 2A:
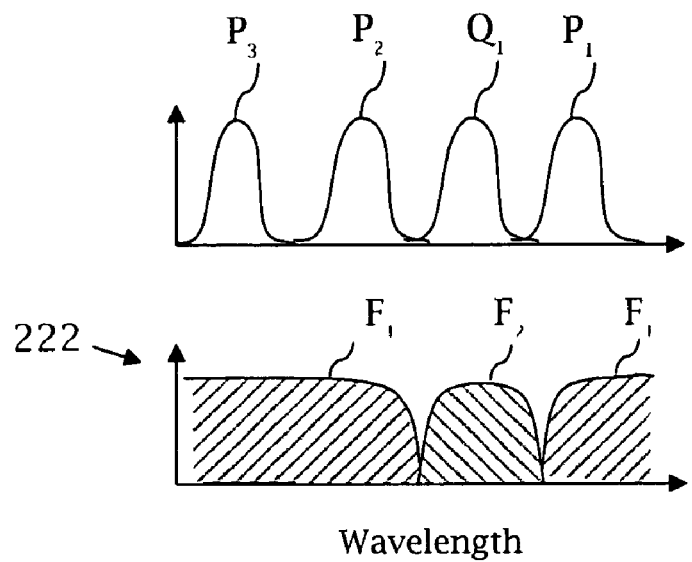
FIG. 2a depicts the spectra of yellow $Q_1$, red $P_1$, green $P_2$, and blue $P_3$ primary colors; and the spectra of viewing filters $F_1$ and $F_2$ which may be used to view anaglyphs displayed in the primary colors $\{P_1, P_2, P_3\}$ and $\{Q_1\}$.
Figure 2B:
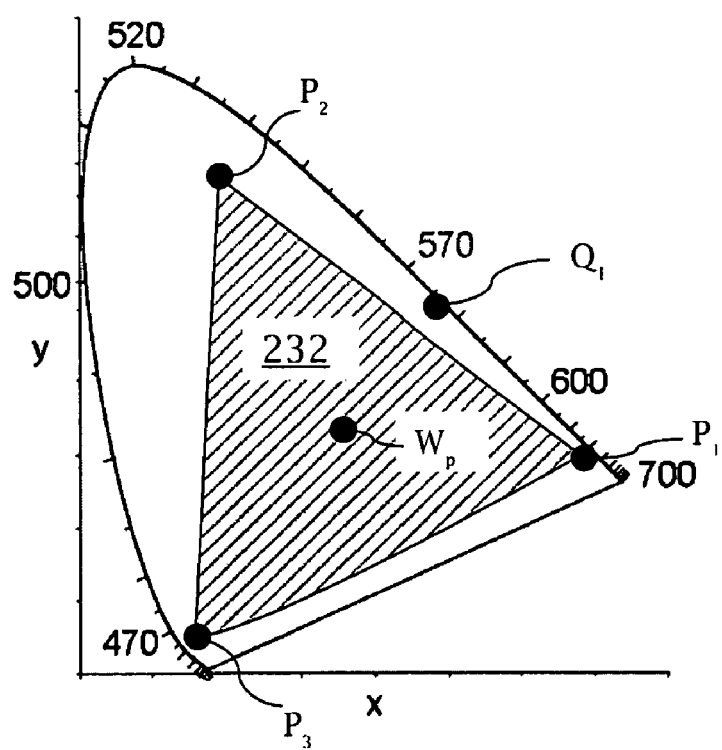
FIG. 2b depicts yellow $Q_1$, red $P_1$, green $P_2$, and blue $P_3$ primary colors on a CIE chromaticity diagram; and the two-dimensional color gamut of the primary colors $\{P_1, P_2, P_3\}$.

FIG. 2a depicts the spectra of four primary colors red $P_1$, green $P_2$, blue $P_3$, and yellow $Q_1$ of a four-color (yellow/RGB) anaglyph. FIG. 2a also depicts the spectra 222 of a first viewing filter $F_1$ and a second viewing filter $F_2$ for viewing a yellow/RGB anaglyph. The first filter $F_1$ substantially transmits the red, green and blue primary colors and blocks the yellow primary color. The second filter $F_2$ substantially transmits the yellow primary color and blocks the red, green and blue primary colors. FIG. 2b depicts the red $P_1$, green $P_2$, blue $P_3$, and yellow $Q_1$ primary colors in a CIE xy chromaticity diagram. The color gamut of a yellow/RGB anaglyph displayed with these primary colors and viewed through filters $F_1$ and $F_2$ may be substantially the color gamut of the red $P_1$, green $P_2$, and blue $P_3$ primary colors viewed through the first filter $F_1$. The color gamut of the first image or of the yellow/RGB anaglyph is depicted in FIG. 2b by the triangle 232 connecting the red $P_1$, green $P_2$, and blue $P_3$ primary colors. The color gamut may be a full color gamut comprising the six hues red, yellow, green, cyan, blue, and magenta. Four-color anaglyphs have the advantage of providing a full color gamut, may have negligible retinal rivalry, while being relatively simple to implement in a display apparatus. Similar four-color anaglyphs of the present invention may include a primary color $Q_1$ which may be red, yellow, green, cyan, blue, magenta and white.

Another embodiment of the present invention provides methods to display anaglyphs using three primary colors $\{P_1, P_2, P_3\}$ to display the first image and three primary colors $\{Q_1, Q_2, Q_3\}$ to display the second image and with balanced brightness contrast in the first and second images. These anaglyphs may have a color gamut which is substantially a combination of the color gamut of the primary colors $\{P_1, P_2, P_3\}$ of the first image viewed through the first viewing filter $F_1$ and the color gamut of the primary colors $\{Q_1, Q_2, Q_3\}$ of the second image viewed through the second viewing filter $F_2$. Since the color gamuts of the first and second images may be full-color gamuts, the combined color gamuts of the anaglyph may also be a full-color gamut.

Figure 3A:
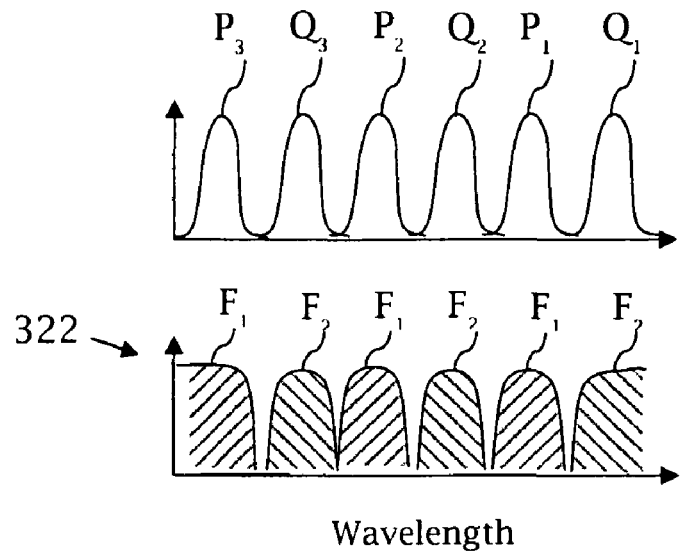
FIG. 3a depicts the spectra of red $P_1$, green $P_2$, and blue $P_3$ primary colors; the spectra of red $Q_1$, green $Q_2$, and blue $Q_3$ primary colors; and the spectra of viewing filters $F_1$ and $F_2$ which may be used to view anaglyphs displayed in the primary colors $\{P_1, P_2, P_3\}$ and $\{Q_1, Q_2, Q_3\}$.
Figure 3B:
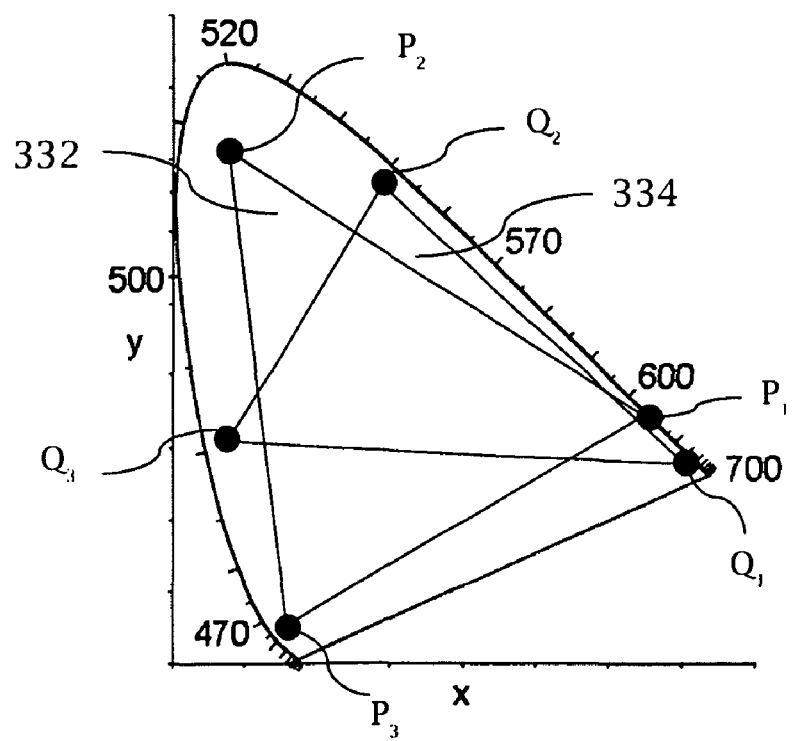
FIG. 3b depicts red $P_1$, green $P_2$, and blue $P_3$ primary colors and red $Q_1$, green $Q_2$, and blue $Q_3$ primary colors on a CIE chromaticity diagram; and the two-dimensional color gamut of the primary colors $\{P_1, P_2, P_3\}$; and the two-dimensional color gamut of the primary colors $\{Q_1, Q_2, Q_3\}$.

FIG. 3a depicts the spectra of six primary colors red $P_1$, green $P_2$, blue $P_3$, red $Q_1$, green $Q_2$, and blue $Q_3$ of a six-color (RGB/RGB) anaglyph. FIG. 3a also depicts the spectra 322 of the first viewing filter $F_1$ and a second viewing filter $F_2$ for viewing a RGB/RGB anaglyph. The first filter $F_1$ substantially transmits the red $P_1$, green $P_2$, and blue $P_3$ primary colors and blocks the red $Q_1$, green $Q_2$, and blue $Q_3$ primary colors. The second filter $F_2$ substantially transmits the red $Q_1$, green $Q_2$, and blue $Q_3$ primary colors and blocks the red $P_1$, green $P_2$, and blue $P_3$ primary colors. FIG. 3b depicts the red $P_1$, green $P_2$, blue $P_3$, red $Q_1$, green $Q_2$, and blue $Q_3$ primary colors in a CIE xy chromaticity diagram. The color gamut of a RGB/RGB anaglyph displayed with these primary colors and viewed through filters $F_1$ and $F_2$ may be substantially a weighted average of the color gamut of the red $P_1$, green $P_2$, and blue $P_3$ primary colors viewed through the first filter $F_1$ and the color gamut of the red $Q_1$, green $Q_2$, and blue $Q_3$ primary colors viewed through the second filter $F_2$. The color gamut of a first image is depicted in FIG. 4c by the triangle 332 connecting the red 1, green 2 and blue 3 primary colors. The color gamut of a second image is depicted in FIG. 3b by the triangle 334 connecting the red 11, green 12 and blue 13 primary colors. The color gamut of the anaglyph may be a full-color gamut comprising the six hues red, yellow, green, cyan, blue, and magenta.

Six-color anaglyphs have the advantage of providing a full color gamut while being relatively simple to implement in a display apparatus. However, six-color primary color anaglyphs of the prior art require filters $F_1$ and $F_2$ with spectra which may be difficult or expensive to manufacture. Also six-color anaglyphs may be substantially less bright than single images displayed with a similar display apparatus (for example a display apparatus with a similar lumens output). Other six-color anaglyphs of the present invention are discussed herein.

Another embodiment of the present invention provides methods to display anaglyphs using three primary colors $\{P_1, P_2, P_3\}$ to display the first image and three primary colors $\{Q_1, Q_2, Q_3\}$ to display the second image where the order of the primary colors in a spectral scale may be $(Q_1, P_1, P_2, Q_2, Q_3, P_3)$ or $(Q_1, P_1, P_2, Q_2, P_3, Q_3)$ or $(P_1, Q_1, P_2, Q_2, Q_3, P_3)$. Herein the notation $(X_1, \ldots, X_j, \ldots, X_m)$ associated with the term spectral scale implies that the wavelengths $\lambda_k$ of the light of the primary color $X_k$ substantially satisfy the relation $\lambda_1 > \lambda_j > \lambda_m$. These anaglyphs may have a color gamut which is substantially a weighted average of the color gamut of the primary colors $\{P_1, P_2, P_3\}$ of the first image viewed through the first viewing filter $F_1$ and the color gamut of the primary colors $\{Q_1, Q_2, Q_3\}$ of the second image viewed through the second viewing filter $F_2$. Since the color gamuts of the first and second images may be full-color gamuts, the combined color gamuts of the anaglyph may also be a full-color gamut. The spectra of the viewing filters $F_1$ and $F_2$ for viewing these anaglyphs may be manufactured more easily or less expensively than the viewing filters for the six-color anaglyphs of the prior art.

Figure 4A:
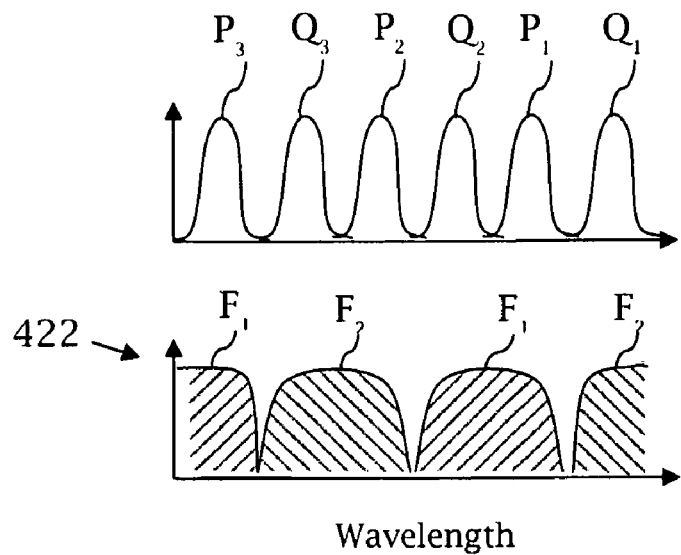
FIG. 4a depicts the spectra of red $P_1$, green $P_2$, and blue $P_3$ primary colors; the spectra of red $Q_1$, green $Q_2$, and blue $Q_3$ primary colors; and the spectra of viewing filters $F_1$ and $F_2$ which may be used to view anaglyphs displayed in the primary colors $\{P_1, P_2, P_3\}$ and $\{Q_1, Q_2, Q_3\}$.
Figure 4B:
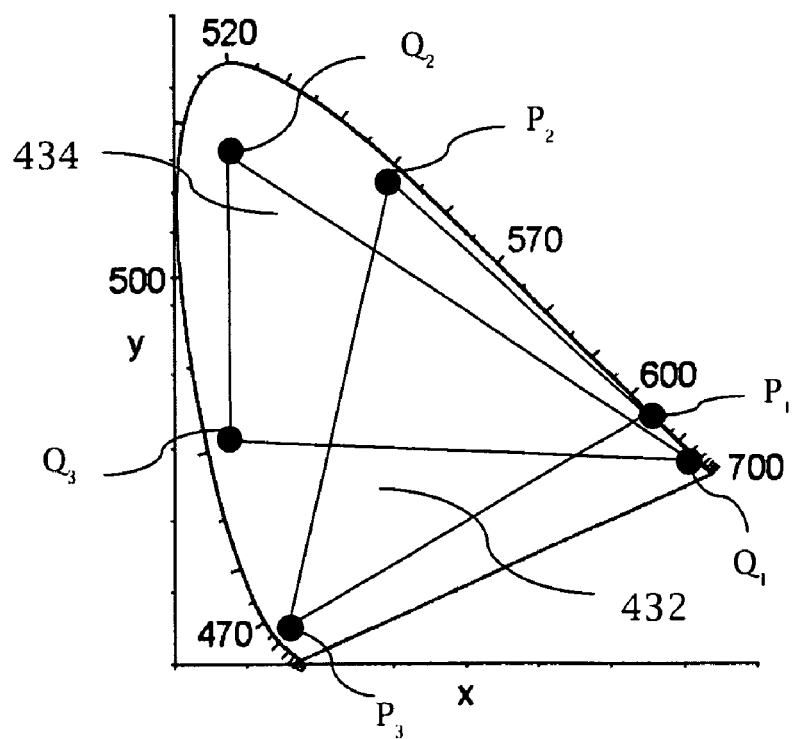
FIG. 4b depicts red $P_1$, green $P_2$, and blue $P_3$ primary colors and red $Q_1$, green $Q_2$, and blue $Q_3$ primary colors on a CIE chromaticity diagram; and the two-dimensional color gamut of the primary colors $\{P_1, P_2, P_3\}$; and the two-dimensional color gamut of the primary colors $\{Q_1, Q_2, Q_3\}$.

FIG. 4a depicts the spectra of six primary colors red $P_1$, green $P_2$, blue $P_3$, red $Q_1$, green $Q_2$, and blue $Q_3$ of a six-color {RGB/RGB} anaglyph with spectral order $(Q_1, P_1, P_2, Q_2, Q_3, P_3)$. FIG. 4a also depicts the spectra 422 of a first viewing filter $F_1$ and a second viewing filter $F_2$ for viewing the RGB/RGB anaglyph. The first filter $F_1$ substantially transmits the red $P_1$, green $P_2$, and blue $P_3$ primary colors and blocks the red $Q_1$, green $Q_2$, and blue $Q_3$ primary colors. The second filter $F_2$ substantially transmits the red $Q_1$, green $Q_2$, and blue $Q_3$ primary colors and blocks the red $P_1$, green $P_2$, and blue $P_3$ primary colors. FIG. 4b depicts the red $P_1$, green $P_2$, blue $P_3$, red $Q_1$, green $Q_2$, and blue $Q_3$ primary colors in a CIE xy chromaticity diagram. The color gamut of a RGB/RGB anaglyph displayed with these primary colors and viewed through filters $F_1$ and $F_2$ may be substantially a weighted average of the color gamut of the red $P_1$, green $P_2$, and blue $P_3$ primary colors viewed through the first filter $F_1$ and the red $Q_1$, green $Q_2$, and blue $Q_3$ primary colors viewed through the second filter $F_2$. The color gamut of a first image is depicted in FIG. 4b by the triangle 432 connecting the red $P_1$, green $P_2$, and blue $P_3$ primary colors. The color gamut of a second image is depicted in FIG. 4b by the triangle 434 connecting the red $Q_1$, green $Q_2$ and blue $Q_3$ primary colors. The color gamut of the anaglyph may be a full-color gamut comprising the six hues red, yellow, green, cyan, blue, and magenta. An advantage of the present embodiment over the six-color anaglyphs of the prior art is that the spectra of the viewing filters $F_1$ and $F_2$ may be simpler and less expensive to manufacture.

A display apparatus that provides six primary colors to display two images is often less than half as bright as a similar display apparatus which displays just one image. On the other hand, a display apparatus with four primary colors may display the first image at nearly the full brightness of the display apparatus using three primary colors while using the fourth primary color to display the second image. The second image may be displayed at about 10-30% of the brightness of the first image while providing a comfortable stereo view to the users. Furthermore in a four-color anaglyph, the primary color $Q_1$ may be composed of light in regions of the visible spectrum which is not fully used in the primary colors $\{P_1, \ldots, P_m\}$ which further increases the brightness of the anaglyph images. However, the color gamut of a four-color anaglyph may be affected by the second monochrome image in regions of a stereoscopic image where the color of the first image is unsaturated. In other words, the white colors of the stereo view may be perceived to have a tint associated with the primary color $Q_1$ of the second image. An anaglyph displayed with five primary colors may improve the white colors of the stereo view compared with the white colors of four-color anaglyphs while requiring viewing filters which may be less expensive to manufacture than the viewing filters for six-color anaglyphs.

Another embodiment of the present invention provides methods to display anaglyphs using primary colors $\{P_1, \ldots, P_m\}$ to display the first image and two primary colors $\{Q_1, Q_2\}$ to display the second image. These anaglyphs may have a color gamut which is a weighted average of the color gamut of the primary colors $\{P_1, \ldots, P_m\}$ of the first image viewed through the first viewing filter $F_1$ and the color gamut of the primary colors $\{Q_1, Q_2\}$ of the second image viewed through the second viewing filter $F_2$. If the first image is displayed in three primary colors $\{P_1, P_2, P_3\}$, the color gamut of the first image may be full color. The color gamut of the second image may be a reduced color gamut including up to three color hues in the set {red, yellow, green, cyan, blue, and magenta}. The primary colors $\{Q_1, Q_2\}$ may be chosen so that the most important hues may be included in the color gamut of the second image. The color gamut of the anaglyph may include the hues which may be included in either color gamuts of the first and second images. However the hues which may be included in the color gamuts of only one of the first and second images may appear in the color gamut of the anaglyph at reduced saturation or with a shift in perceived hue. The colors of the second image may be rendered in hues which most closely correspond to the hue in the first image or rendered as a desaturated hue. If the second image is displayed with less brightness than the first image, the color gamut of the anaglyph may be closer to the color gamut of the first image than the color gamut of the second image.

Figure 5A:
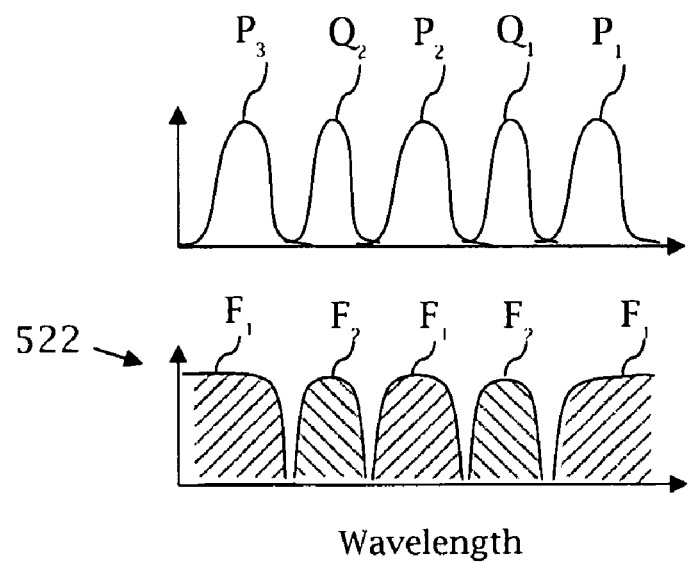
FIG. 5a depicts the spectra of red $P_1$, green $P_2$, and blue $P_3$ primary colors; the spectra of yellow $Q_1$, and blue $Q_2$ primary colors; and the spectra of viewing filters $F_1$ and $F_2$ which may be used to view anaglyphs displayed in the primary colors $\{P_1, P_2, P_3\}$ and $\{Q_1, Q_2\}$.
Figure 5B:
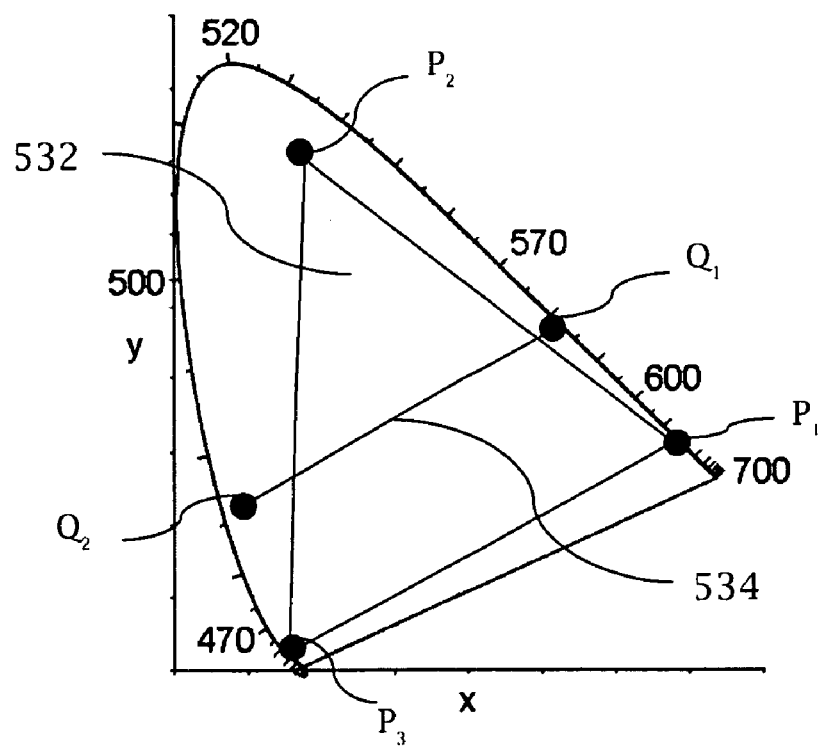
FIG. 5b depicts red $P_1$, green $P_2$, and blue $P_3$ primary colors and yellow $Q_1$, and blue $Q_2$ primary colors on a CIE chromaticity diagram; and the two-dimensional color gamut of the primary colors $\{P_1, P_2, P_3\}$; and the one-dimensional color gamut of the primary colors $\{Q_1, Q_2\}$.

FIG. 5a depicts the spectra of five primary colors red $P_1$, green $P_2$, blue $P_3$, yellow $Q_1$, and blue $Q_2$ of a five-color (YB/RGB) anaglyph having a spectral order $(P_1, Q_1, P_2, Q_2, P_3)$. FIG. 5a also depicts the spectra 522 of the first viewing filter $F_1$ and a second viewing filter $F_2$ for viewing a YB/RGB anaglyph. The first filter $F_1$ substantially transmits the red $P_1$, green $P_2$, and blue $P_3$ primary colors and blocks the yellow $Q_1$ and blue $Q_2$ primary colors. The second filter $F_2$ substantially transmits the yellow $Q_1$ and blue $Q_2$ primary colors and blocks the red $P_1$, green $P_2$, and blue $P_3$ primary colors. FIG. 5b depicts the red $P_1$, green $P_2$, blue $P_3$, yellow $Q_1$, and blue $Q_2$ primary colors in a CIE xy chromaticity diagram. The color gamut of a YB/RGB anaglyph displayed with these primary colors and viewed through filters $F_1$ and $F_2$ may be substantially a weighted average of the color gamut of the red $P_1$, green $P_2$, and blue $P_3$ primary colors viewed through the first filter $F_1$ and the color gamut of the yellow $Q_1$ and blue $Q_2$ primary colors viewed through the second filter $F_2$. The color gamut of a first image is depicted in FIG. 5b by the triangle 532 connecting the red $P_1$, green $P_2$ and blue $P_3$ primary colors. The color gamut of a second image is depicted in FIG. 5b by the line segment 534 connecting the yellow $Q_1$ and blue $Q_2$ primary colors. The color gamut of the anaglyph may be a full color gamut comprising the six hues red, yellow, green, cyan, blue, and magenta. The green hues of the second image may be rendered as either yellow, yellowish green, nearly white or blue. This may produce yellowish-green or desaturated green hues in the color gamut of the anaglyph. Red hues of the second image may be rendered as either yellow or unsaturated yellow or nearly white. This may produce reddish-orange or desaturated green hues in the color gamut of the anaglyph. Blue hues of the second image may be rendered as either blue or nearly white. This may produce blue hues in the color gamut of the anaglyph. Yellow and cyan hues of the second image may be rendered as yellow and blue hues producing yellow and cyan hues in the color gamut of the anaglyph. Magenta hues of the second image may be rendered as nearly white hues producing desaturated magenta hues in the color gamut of the anaglyph.

Figure 6A:
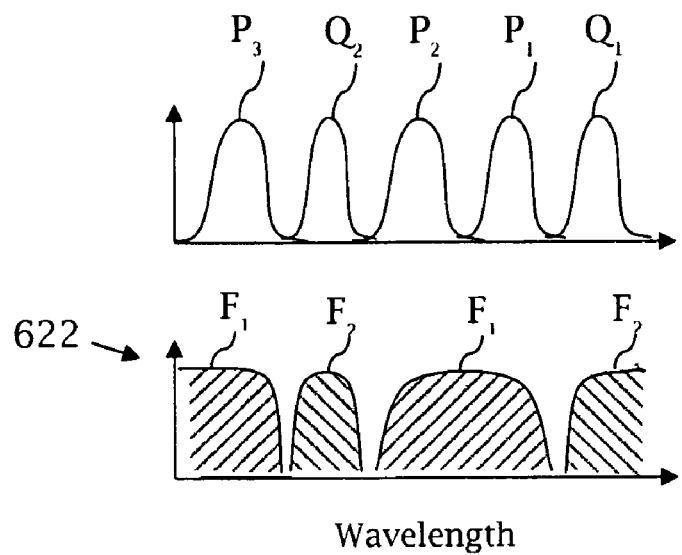
FIG. 6a depicts the spectra of red $P_1$, green $P_2$, and blue $P_3$ primary colors; the spectra of red $Q_1$, and cyan $Q_2$ primary colors; and the spectra of viewing filters $F_1$ and $F_2$ which may be used to view anaglyphs displayed in the primary colors $\{P_1, P_2, P_3\}$ and $\{Q_1, Q_2\}$.
Figure 6B:
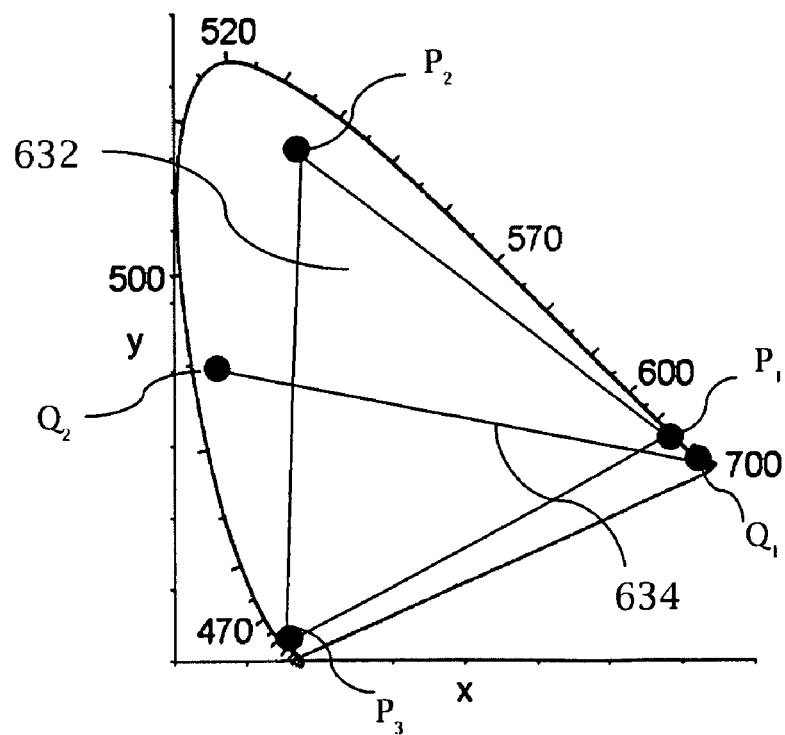
FIG. 6b depicts red $P_1$, green $P_2$, and blue $P_3$ primary colors and red $Q_1$, and cyan $Q_2$ primary colors on a CIE chromaticity diagram; and the two-dimensional color gamut of the primary colors $\{P_1, P_2, P_3\}$; and the one-dimensional color gamut of the primary colors $\{Q_1, Q_2\}$.

FIG. 6a depicts the spectra of five primary colors red $P_1$, green $P_2$, blue $P_3$, far-red $Q_1$, and cyan $Q_2$ of a five-color (RC/RGB) anaglyph having a spectral order ($Q_1$, $P_1$, $P_2$, $Q_2$, $P_3$). FIG. 6a also depicts the spectra 622 of a first viewing filter $F_1$ and a second viewing filter $F_2$ for viewing a RC/RGB anaglyph. The first filter $F_1$ substantially transmits the red $P_1$, green $P_2$, and blue $P_3$ primary colors and blocks the far-red $Q_1$ and cyan $Q_2$ primary colors. The second filter $F_2$ substantially transmits the far-red $Q_1$ and cyan $Q_2$ primary colors and blocks the red $P_1$, green $P_2$, and blue $P_3$ primary colors. FIG. 6b depicts the red $P_1$, green $P_2$, blue $P_3$, far-red $Q_1$, and cyan $Q_2$ primary colors in a CIE xy chromaticity diagram. The color gamut of a RC/RGB anaglyph displayed with these primary colors and viewed through filters $F_1$ and $F_2$ may be substantially a weighted average of the color gamut of the red $P_1$, green $P_2$, and blue $P_3$ primary colors viewed through the first filter $F_1$ and the color gamut of the far-red $Q_1$ and cyan $Q_2$ primary colors viewed through the second filter $F_2$. The color gamut of a first image is depicted in FIG. 6b by the triangle 632 connecting the red $P_1$, green $P_2$ and blue $P_3$ primary colors. The color gamut of a second image is depicted in FIG. 6b by the line segment 634 connecting the far-red $Q_1$ and cyan $Q_2$ primary colors. The color gamut of the anaglyph may be a full-color gamut comprising the six hues red, yellow, green, cyan, blue, and magenta. The green hues of the second image may be rendered as either nearly white or cyan. This may produce bluish-green or desaturated green hues in the color gamut of the anaglyph. Red hues of the second image may be rendered as far-red. This may produce red hues in the color gamut of the anaglyph. Blue hues of the second image may be rendered as either cyan or nearly white. This may produce greenish-blue or blue hues in the color gamut of the anaglyph. Yellow and magenta hues of the second image may be rendered as nearly white or red hues producing yellow and magenta hues in the color gamut of the anaglyph. Cyan hues may be rendered as cyan hues producing cyan hues in the color gamut of the anaglyph.

Figure 7A:
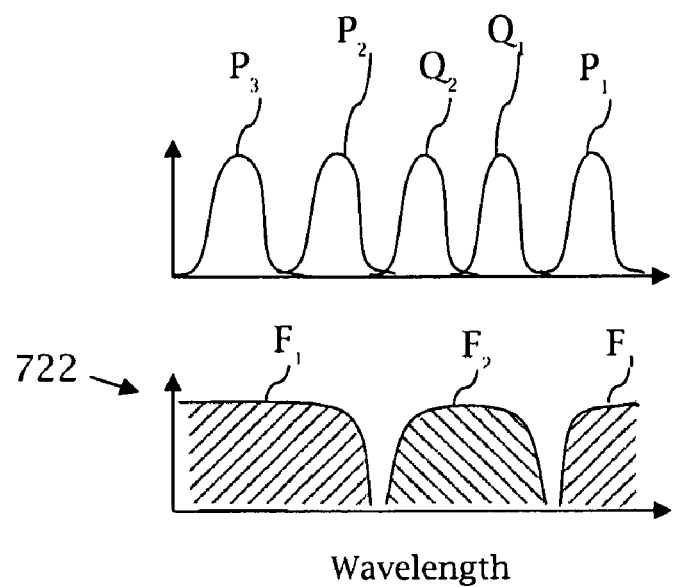
FIG. 7a depicts the spectra of red $P_1$, green $P_2$, and blue $P_3$ primary colors; the spectra of red $Q_1$, and green $Q_2$ primary colors; and the spectra of viewing filters $F_1$ and $F_2$ which may be used to view anaglyphs displayed in the primary colors $\{P_1, P_2, P_3\}$ and $\{Q_1, Q_2\}$.
Figure 7B:
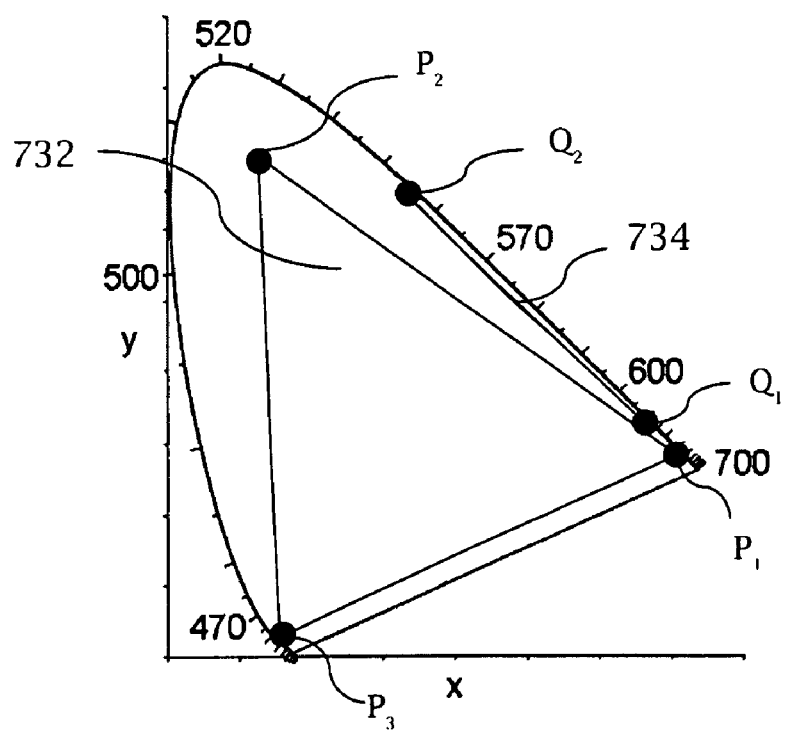
FIG. 7b depicts red $P_1$, green $P_2$, and blue $P_3$ primary colors and red $Q_1$, and green $Q_2$ primary colors on a CIE chromaticity diagram; and the two-dimensional color gamut of the primary colors $\{P_1, P_2, P_3\}$; and the one-dimensional color gamut of the primary colors $\{Q_1, Q_2\}$.

FIG. 7a depicts the spectra of five primary colors red $P_1$, green $P_2$, blue $P_3$, orange $Q_1$, and green $Q_2$ of a five color (OG/RGB) anaglyph having a spectral order ($P_1$, $Q_1$, $Q_2$, $P_2$, $P_3$). FIG. 7a also depicts the spectra 722 of a first viewing filter $F_1$ and a second viewing filter $F_2$ for viewing a OG/RGB anaglyph. The first filter $F_1$ substantially transmits the red $P_1$, green $P_2$, and blue $P_3$ primary colors and blocks the orange $Q_1$ and green $Q_2$ primary colors. The second filter $F_2$ substantially transmits the orange $Q_1$ and green $Q_2$ primary colors and blocks the red $P_1$, green $P_2$, and blue $P_3$ primary colors. FIG. 7b depicts the red $P_1$, green $P_2$, blue $P_3$, orange $Q_1$, and green $Q_2$ primary colors in a CIE xy chromaticity diagram. The color gamut of a OG/RGB anaglyph displayed with these primary colors and viewed through filters $F_1$ and $F_2$ may be substantially a weighted average of the color gamut of the red $P_1$, green $P_2$, and blue $P_3$ primary colors viewed through the first filter $F_1$ and the color gamut of the orange $Q_1$ and green $Q_2$ primary colors viewed through the second filter $F_2$. The color gamut of a first image is depicted in FIG. 7b by the triangle 732 connecting the red $P_1$, green $P_2$ and blue $P_3$ primary colors. The color gamut of a second image is depicted in FIG. 7b by the line segment 734 connecting the orange $Q_1$ and green $Q_2$ primary colors. The color gamut of the anaglyph may be a full-color gamut comprising the six hues red, yellow, green, cyan, blue, and magenta. The green hues of the second image may be rendered as green. This may produce green hues in the color gamut of the anaglyph. Red hues of the second image may be rendered as orange. This may produce red hues in the color gamut of the anaglyph. Blue hues of the second image may be rendered as yellow. The yellow hues of the second image may appear desaturated due to the shift of the white point toward yellow when viewing through the filter $F_2$. These hues may produce bluish-gray or blue hues in the color gamut of the anaglyph. Yellow hues of the second image may be rendered as yellow hues producing yellow hues in the color gamut of the anaglyph. Cyan hues may be rendered as green hues producing greenish-cyan hues in the color gamut of the anaglyph. Magenta hues may be rendered as orange or nearly white hues producing reddish-magenta or desaturated magenta hues in the color gamut of the anaglyph.

An advantage of five-color anaglyphs over six-color anaglyphs is that the viewing filters may be less expensive and that comparable display apparatus may provide brighter five-color anaglyphs than six-color anaglyphs. The viewing filters for four-color anaglyphs may be even less expensive than the viewing filters for five-color anaglyphs. Additional four-color anaglyphs of the present invention are discussed below.

Another embodiment of the present invention provides methods to display anaglyphs using two primary colors {$P_1$, $P_2$} to display the first image and two primary colors {$Q_1$,$Q_2$} to display the second image. The spectral order of the primary colors may include ($P_1$, $Q_1$, $P_2$, $Q_2$) and ($P_1$, $Q_1$, $Q_2$, $P_2$) and ($P_1$, $P_2$, $Q_1$, $Q_2$). These anaglyphs may comprise a color gamut which is a weighted average of the color gamut of the primary colors {$P_1$,$P_2$} of the first image viewed through the first viewing filter $F_1$ and the color gamut of the primary colors {$Q_1$,$Q_2$} of the second image viewed through the second viewing filter $F_2$. The color gamut of the first image may be a reduced color gamut including up to three color hues in the set {red, yellow, green, cyan, blue, and magenta}. The color gamut of the second image may be a reduced color gamut including up to three color hues in the set {red, yellow, green, cyan, blue, and magenta}. The color gamut of the anaglyph may include the hues which may be included in either color gamuts of the first and second images. However the hues which may be included in the color gamuts of only one of the first and second images may appear in the color gamut of the anaglyph at reduced saturation or with a shift in perceived hue. The colors of the each image may be rendered in hues which most closely correspond to the hue in the other image or rendered as a desaturated hue.

Figure 8A:
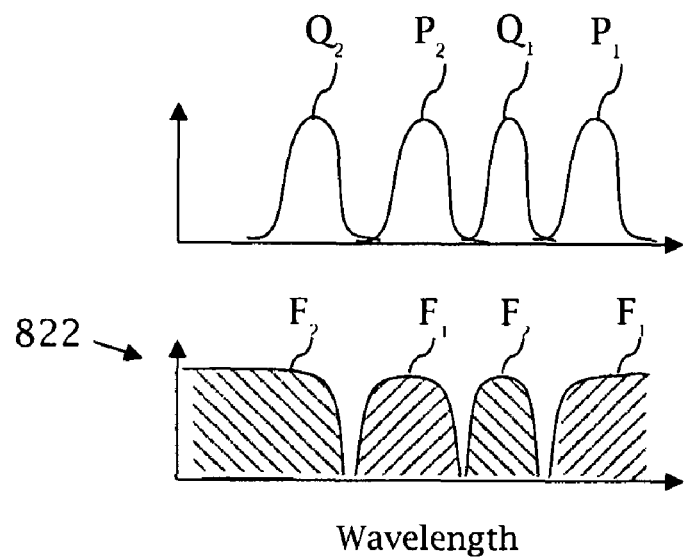
FIG. 8a depicts the spectra of red $P_1$, and green $P_2$ primary colors; the spectra of yellow $Q_1$, and blue $Q_2$ primary colors; and the spectra of viewing filters $F_1$ and $F_2$ which may be used to view anaglyphs displayed in the primary colors $\{P_1, P_2\}$ and $\{Q_1, Q_2\}$.
Figure 8B:
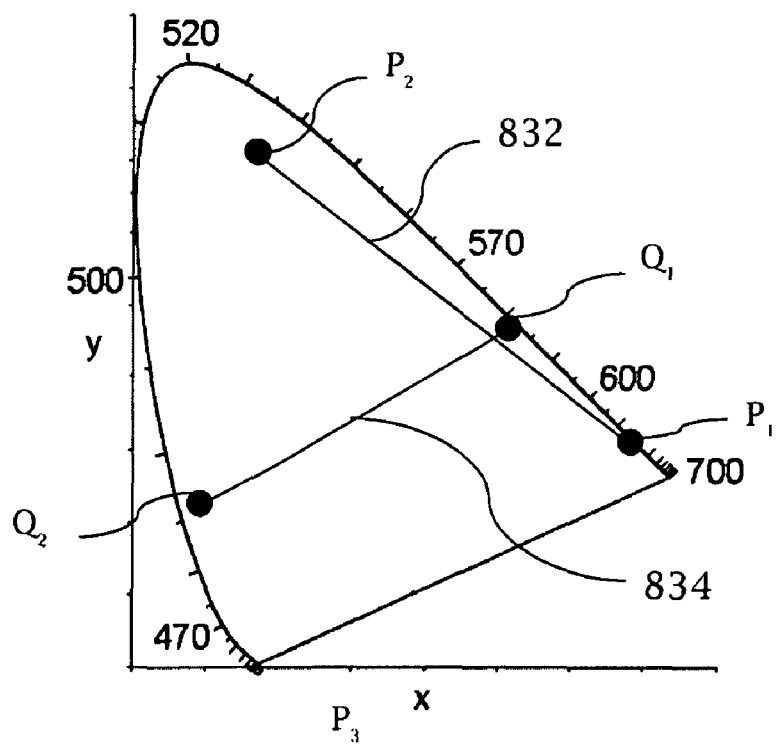
FIG. 8b depicts red $P_1$, and green $P_2$ primary colors and yellow $Q_1$, and blue $Q_2$ primary colors on a CIE chromaticity diagram; and the one-dimensional color gamut of the primary colors $\{P_1, P_2\}$; and the one-dimensional color gamut of the primary colors $\{Q_1, Q_2\}$.

FIG. 8a depicts the spectra of four primary colors red $P_1$, green $P_2$, yellow $Q_1$, and blue $Q_2$ of a four-color (YB/RG) anaglyph having a spectral order ($P_1$, $Q_1$, $P_2$, $Q_2$). FIG. 8a also depicts the spectra 822 of the first viewing filter $F_1$ and a second viewing filter $F_2$ for viewing a YB/RG anaglyph. The first filter $F_1$ substantially transmits the red $P_1$, and green $P_2$ primary colors and blocks the yellow $Q_1$ and blue $Q_2$ primary colors. The second filter $F_2$ substantially transmits the yellow $Q_1$ and blue $Q_2$ primary colors and blocks the red $P_1$, and green $P_2$ primary colors. FIG. 8b depicts the red $P_1$, green $P_2$, yellow $Q_1$, and blue $Q_2$ primary colors in a CIE xy chromaticity diagram. The color gamut of a YB/RG anaglyph displayed with these primary colors and viewed through filters $F_1$ and $F_2$ may be substantially a weighted average of the color gamut of the red $P_1$, and green $P_2$ primary colors viewed through the first filter $F_1$ and the color gamut of the yellow $Q_1$ and blue $Q_2$ primary colors viewed through the second filter $F_2$. The color gamut of a first image is depicted in FIG. 8b by the line segment 832 connecting the red $P_1$, and green $P_2$ primary colors. The color gamut of a second image is depicted in FIG. 8b by the line segment 834 connecting the yellow $Q_1$ and blue $Q_2$ primary colors. The color gamut of the anaglyph may be a full color gamut comprising the six hues red, yellow, green, cyan, blue, and magenta. The green hues of the second image may be rendered as either yellow, yellowish green, nearly white or blue. This may produce yellowish-green or desaturated green hues in the color gamut of the anaglyph. Red hues of the second image may be rendered as either yellow or unsaturated yellow or nearly white. This may produce reddish-orange or desaturated green hues in the color gamut of the anaglyph. Blue hues of the first image may be rendered as either yellow or nearly white. This may produce blue hues in the color gamut of the anaglyph. Yellow and cyan hues of the first image may be rendered as yellow hues producing yellow and cyan hues in the color gamut of the anaglyph. Magenta hues may be rendered as red of nearly white hues for the first image and blue or nearly white hues for the second image producing desaturated magenta hues in the color gamut of the anaglyph.

Figure 9A:
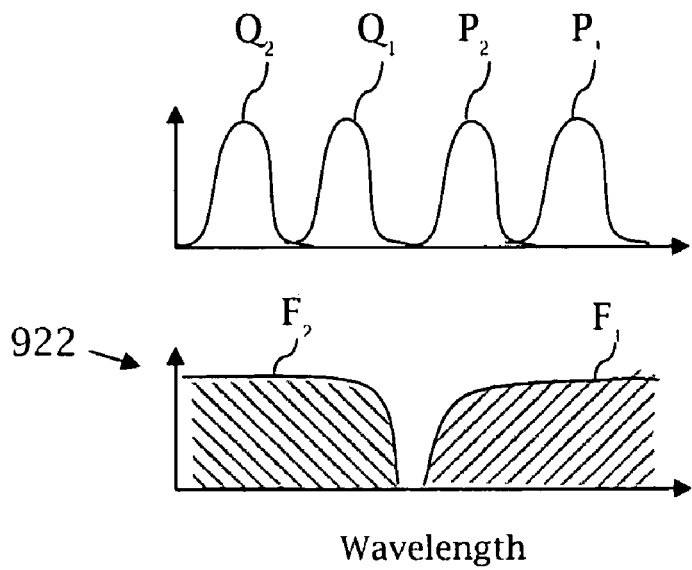
FIG. 9a depicts the spectra of red $P_1$, and green $P_2$ primary colors; the spectra of green $Q_1$, and blue $Q_2$ primary colors; and the spectra of viewing filters $F_1$ and $F_2$ which may be used to view anaglyphs displayed in the primary colors $\{P_1, P_2\}$ and $\{Q_1, Q_2\}$.
Figure 9B:
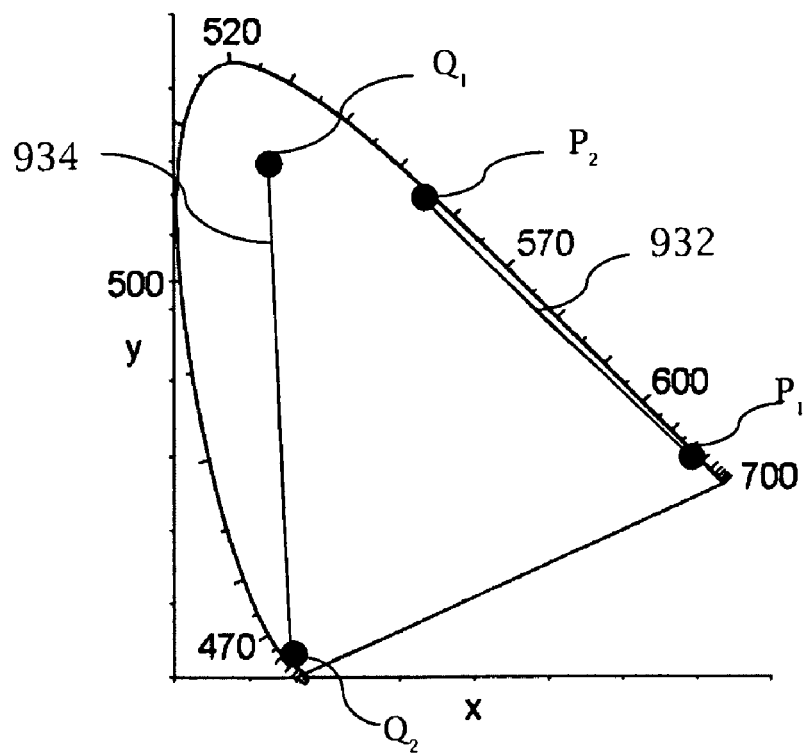
FIG. 9b depicts red $P_1$, and green $P_2$ primary colors and green $Q_1$, and blue $Q_2$ primary colors on a CIE chromaticity diagram; and the one-dimensional color gamut of the primary colors {P₁,P₂}; and the one-dimensional color gamut of the primary colors {Q₁,Q₂}.

FIG. 9a depicts the spectra of four primary colors red $P_1$, green $P_2$, green $Q_1$, and blue $Q_2$ of a four-color (GB/RG) anaglyph having a spectral order $(P_1, P_2, Q_1, Q_2)$. FIG. 9a also depicts the spectra 922 of the first viewing filter $F_1$ and a second viewing filter $F_2$ for viewing a GB/RG anaglyph. The first filter $F_1$ substantially transmits the red $P_1$, and green $P_2$ primary colors and blocks the green $Q_1$ and blue $Q_2$ primary colors. The second filter $F_2$ substantially transmits the green $Q_1$ and blue $Q_2$ primary colors and blocks the red $P_1$, and green $P_2$ primary colors. FIG. 9b depicts the red $P_1$, green $P_2$, green $Q_1$, and blue $Q_2$ primary colors in a CIE xy chromaticity diagram. The color gamut of a GB/RG anaglyph displayed with these primary colors and viewed through filters $F_1$ and $F_2$ may be substantially a weighted average of the color gamut of the red $P_1$, and green $P_2$ primary colors viewed through the first filter $F_1$ and the color gamut of the green $Q_1$ and blue $Q_2$ primary colors viewed through the second filter $F_2$. The color gamut of a first image is depicted in FIG. 9b by the line segment 932 connecting the red $P_1$, and green $P_2$ primary colors. The color gamut of a second image is depicted in FIG. 9b by the line segment 934 connecting the green $Q_1$ and blue $Q_2$ primary colors. These primary colors may provide anaglyphs with color gamuts which lack the hues yellow and cyan. However, the viewing filters have spectra which may be relatively simple and inexpensive.

Three-color anaglyphs may be compatible with conventional display apparatus which provide three primary color including red, green, and blue. Red/cyan anaglyphs are the common three-color anaglyphs. Red/cyan anaglyphs of the present invention with balanced brightness contrast may provide yellowish-green, green and blue hues in the anaglyph. On the other hand, blue/yellow anaglyphs of the present invention with balanced brightness contrast may provide green, yellowish and red hues. These hues of a blue/yellow anaglyph may be considered more important for many purposes such as displaying people. Therefore, blue/yellow anaglyphs might be expected to be preferred over red/cyan anaglyphs. However, a blue primary color usually contains little brightness weight which provides little dynamic range to carry the brightness contrast of an image. Therefore, blue/yellow anaglyphs of the prior art may not be very satisfactory.

Another embodiment of the present invention provides methods to display anaglyphs using two primary colors red $P_1$ and green $P_2$ to display the first image and one primary color cyan $Q_1$ to display the second image. These primary colors may provide red, yellowish, and green hues while also providing enough dynamic range of brightness in primary color $Q_1$ to balance the brightness contrast of the second image. In order to provide enough dynamic range, the $Q_1$ primary color may have a y chromaticity coordinate greater than about 0.3 or an effective wavelength longer about 490 nm in a CIE xy chromaticity diagram.

Figure 10A:
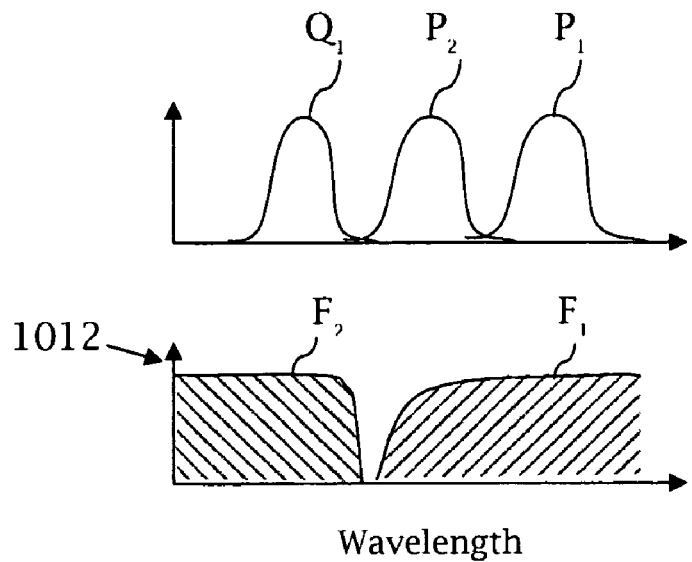
FIG. 10a depicts the spectra of red P₁, and green P₂ primary colors; the spectra of a cyan Q₁ primary color; and the spectra of viewing filters F₁ and F₂ which may be used to view anaglyphs displayed in the primary colors {P₁,P₂} and {Q₁}.
Figure 10B:
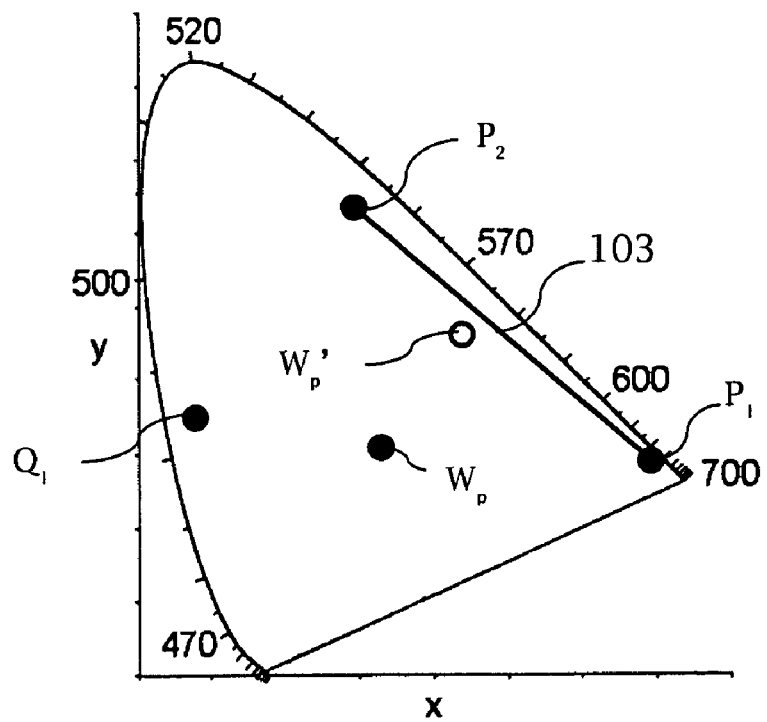
FIG. 10b depicts red P₁, and green P₂ primary colors and cyan Q₁ primary color on a CIE chromaticity diagram; and the one-dimensional color gamut of the primary colors {P₁,P₂}.

FIG. 10a depicts the spectra of three primary colors red $P_1$, green $P_2$, and cyan $Q_1$, of a three-color (C/RG) anaglyph. FIG. 10a also depicts the spectra 1022 of the first viewing filter $F_1$ and a second viewing filter $F_2$ for viewing a C/RG anaglyph. The first filter $F_1$ substantially transmits the red $P_1$, and green $P_2$ primary colors and blocks the cyan $Q_1$ primary color. The second filter $F_2$ substantially transmits the cyan $Q_1$ primary color and blocks the red $P_1$, and green $P_2$ primary colors. FIG. 10b depicts the red $P_1$, green $P_2$, and cyan $Q_1$ primary colors in a CIE xy chromaticity diagram. The color gamut of a C/RG anaglyph displayed with these primary colors and viewed through filters $F_1$ and $F_2$ may be substantially the color gamut of the red $P_1$, and green $P_2$ primary colors viewed through the first filter $F_1$. The color gamut of a first image is depicted in FIG. 10b by the line segment 1032 connecting the red $P_1$, and green $P_2$ primary colors. FIG. 10b depicts the white point $W_p'$ viewed through the first filter $F_1$ shifted toward yellow compared with a conventional white point $W_p$. These primary colors may provide anaglyphs with color gamuts with red, yellowish and green hues, may have negligible retinal rivalry, and may be viewed with viewing filters which may be relatively inexpensive.

White Primary Colors

The anaglyphs of the present invention rendered in primary colors $\{P_1, \ldots, P_m, Q_1\}$ may have a color gamut which is substantially identical to the color gamut of the first image viewed using the first filter $F_1$. However, the white or nearly white colors may appear tinted with the hue of the primary color $Q_1$ in the stereo view of the anaglyph. In order to reduce the tint of the white colors, the primary color $Q_1$ may be a desaturated primary color. Herein a desaturated primary color is a primary color with two or more spectral components which generate a hue which may be white or nearly white. By using a desaturated primary color $Q_1$ for the second image, the white subject matter may appear white to both eyes and appear white in the stereo view. Herein, a desaturated primary color is sometimes called a white primary color without loss of generality.

A desaturated primary color $Q_1$ may cause a small desaturation of the perceived color in a stereo view of an anaglyph. The amount of desaturation depends on the relative luminance of the first and second images. As the luminance of the second image decreases, the amount of desaturation of the perceived colors may decrease. The desaturation of the perceived hues may be compensated for by increasing the saturation of the first image.

Another embodiment of the present invention provides methods to display the second image of a stereo pair using a white primary color $Q_1$. The white primary color $Q_1$ of the present invention may have a spectrum which does not substantially overlap the spectra of the primary colors $\{P_1, \ldots, P_m\}$ of the first image. The polarization state $p_2$ of the white primary color $Q_1$ may be orthogonal of the polarization state $p_1$ of the primary colors $\{P_1, \ldots, P_m\}$. The present embodiment provides several methods of providing a white primary color $Q_1$ with a spectra which does not substantially overlap the spectra of the red, green and blue primary colors $\{P_1, P_2, P_3\}$ of a display apparatus. A white primary color may be created by merging two primary colors or two spectral regions into a single primary color. The primary colors $\{Q_1,$ $Q_2$} may be merged into a single primary color Q by a relationship between primary colors $Q_1$ and $Q_2$. For example, $$Q_2 = \sigma_1 Q_1$$

where $\sigma_1$ is a constant. The spectra $S_Q$ of the primary color Q may be given by the relationship $$S_Q = \omega_1 S_{Q1} + \omega_2 S_{Q2}$$

where $\omega_1$ and $\omega_2$ are constants and $S_{Q1}$ is the spectra of the primary color $Q_1$ and $S_{Q2}$ is the spectra of the primary color $Q_2$. The primary color Q may be considered a single white primary color $Q_1$ or a combination of primary colors {$Q_1$, $Q_2$}. Herein the primary color Q is sometimes considered to be a single primary color $Q_1$ in order to simplify the discussion without loss of generality. In general, a desaturated primary color Q may be created from a set of primary colors {$Q_1, \ldots, Q_n$} with a set of relationships $Q_j = \sigma_j Q_1$ where the $\sigma_j$ are constants. In general, the spectra $S_Q$ of desaturated primary color Q may include two or more spectral components {$Q_1, \ldots, Q_n$} with spectra {$S_1, \ldots, S_n$} respectively where $S_Q = \Sigma \omega j S_j$ where the $\omega_j$ are constants.

A first method of creating a white primary color Q is to combine a far-red spectra of light and a cyan spectra of light. If the primary color $P_1$ is red, the primary color $P_2$ is green, and the primary color $P_3$ is blue; the spectra of the primary color $P_1$ may substantially not overlap the spectra of the far-red component of primary color Q and the spectra of the primary colors $P_2$ and $P_3$ may substantially not overlap the spectra of the cyan component of Q. The spectrum of cyan light may be chosen to produce a near white or yellowish-white primary color Q when combined with the red spectral component of Q. For example, cyan light with a spectrum centered around about 495 nm may be combined with far-red light with wavelengths longer than about 630 nm to produce a nearly white primary color $Q_1$.

FIG. 6a depicts the spectra of representative red $Q_1$ and cyan $Q_2$ components which may be combined to produce a white primary color Q. FIG. 6a also depicts spectra of viewing filters $F_1$ and $F_2$ which may be used to view the anaglyphs produce by this method. FIG. 6b depicts the primary colors $P_1$, $P_2$, $P_3$, $Q_1$, and $Q_2$ in a CIE chromaticity diagram. The primary colors Q which may be produced from primary colors $Q_1$ and $Q_2$ is depicted by the line segment 634 connecting the primary colors $Q_1$ and $Q_2$.

A second method of creating a white primary color Q is to combine a yellow or near-red spectra of light and a blue spectra of light. If the primary color $P_1$ is red, the primary color $P_2$ is green, and the primary color $P_3$ is blue; the spectra of the primary colors $P_1$ and $P_2$ may substantially not overlap the spectra of the yellow component of Q and the spectra of the primary colors $P_2$ and $P_3$ may substantially not overlap the spectra of the blue component of Q. The spectrum of blue wavelengths may be chosen to produce a near white or yellowish-white primary color Q when combined with the red spectral component of Q. For example, blue light with a spectrum centered around about 480 nm may be combined with yellow light with a spectrum centered around 580 nm to produce a nearly white primary color Q.

FIG. 5a depicts representative yellow $Q_1$ and blue $Q_2$ components which may be combined to produce a white primary color Q. FIG. 5b also depicts spectra of viewing filters $F_1$ and $F_2$ which may be used to view the anaglyphs produce by this method. FIG. 5b depicts the primary colors $P_1$, $P_2$, $P_3$, $Q_1$, and $Q_2$ in a CIE chromaticity diagram. The primary colors Q which may be produced from primary colors $Q_1$ and $Q_2$ is depicted by the line segment 534 connecting the primary colors $Q_1$ and $Q_2$.

A third method of creating a white primary color Q is to combine red $R_2$, green $G_2$, and blue $B_2$ components of light where the red $P_1$, green $P_2$, and blue $P_3$ primary colors may substantially not overlap the spectra of the components $R_2$, $G_2$, and $B_2$ of the primary color Q.

FIG. 3a depicts representative red $R_2$, green $G_2$, and blue $B_2$ components which may be combined to produce the primary color Q. FIG. 3b also depicts spectra of viewing filters $F_1$ and $F_2$ which may be used to view the anaglyphs produce by this method.

A fourth method of creating a white primary color Q is to combine yellow, cyan and magenta components of light where the spectra of the red $P_1$, green $P_2$ and blue $P_3$ primary colors may substantially not overlap the spectra of the yellow, cyan and magenta components of Q.

In creating a white primary color Q from a particular light source, it may be convenient to use the light which is not typically used in the primary colors used for displaying non-stereoscopic images. In the case of a metal halide lamp light source, it may be convenient to combine the extra yellow light in the lamp spectrum with cyan or blue light in the metal halide lamp spectrum to produce a white or nearly white primary color $Q_1$. In the case of a xenon lamp light source, it may be convenient to combine the extra red light in the xenon lamp spectrum with cyan light in the xenon lamp spectrum to produce a white or nearly white primary color $Q_1$. In the case of LED light sources, it may be convenient to combine red or orange light with cyan light to produce a white or nearly white primary color $Q_1$ or to combine yellow light with cyan light to produce a white or nearly white primary color $Q_1$.

A desaturated primary color {Q} of the present invention may be used in a four-color anaglyph with red, green, blue, and Q primary colors to provide full-color stereoscopic views. A desaturated primary color {Q} of the present invention may also be used with three-color anaglyphs to improve the white colors in the stereoscopic view. In one embodiment, a red $P_1$, and green $P_2$ primary color may be used to render the first image while a desaturated primary color Q may be used to render the second image. The primary color Q may be desaturated from blue by moving the primary color Q toward cyan. This will desaturate the primary color due to the lowing tinting strength of cyan hues compared to blue hues. Cyan also provides more brightness to carry the brightness contrast as discussed previously. The primary color Q may be desaturated further by adding far-red wavelengths of the light above about 640 nm or by adding yellow wavelengths near about 580 nm. The viewing filters for a red,green/cyan,far-red anaglyph may be providing by dye filters, or dichroic filters.

Display of Generalized Anaglyphs

Some embodiments of the present invention provide methods of processing stereoscopic images which may be different than the methods of processing non-stereoscopic images.

Another embodiment of the present invention provides a mode (2D mode) for displaying non-stereoscopic images and a mode (3D mode) for displaying stereoscopic images comprising a display apparatus providing t primary colors {$T_1, \ldots, T_t$}. In a 2D mode of the display apparatus, the primary colors {$T_1, \ldots, T_t$} may be used to display a non-stereoscopic images. A transformation $G_5$ may be used to transform the coordinates {$A_1, \ldots, A_r$} of a non-stereoscopic image into the primary colors {$T_1, \ldots, T_t$} where the number r of coordinates may be different from the number t of primary colors. In a 3D mode of the display apparatus, the primary colors {$T_1, \ldots, T_t$} may be used to display a stereoscopic images as anaglyphs. A transformation $G_1$ may be used to transform the coordinates {$A_1, \ldots, A_r$} of a first image into the primary color coordinates {$P_1, \ldots, P_m$} and a transformation $G_2$ may be used to transform the coordinates $\{B_1, \ldots, B_s\}$ of a second image into the primary color coordinates $\{Q_1, \ldots, Q_n\}$. Then the coordinates $\{P_1, \ldots, P_m\}$ and $\{Q_1, \ldots, Q_n\}$ may be transformed into the display primary colors $\{T_1, \ldots, T_t\}$ by a transformation $G_4$ where the set of primary colors $\{T_1, \ldots, T_t\}$ may be the union of the set of primary colors $\{P_1, \ldots, P_m\}$ and the set of primary colors $\{Q_1, \ldots, Q_n\}$. The sets of primary colors $\{P_1, \ldots, P_m\}$ and $\{Q_1, \ldots, Q_n\}$ may be selectable by the user. The transformations $G_1$ and $G_2$ may be selected to balance the brightness contrast of like subject matter of the first and second images of stereoscopic pairs. The display apparatus may be switched from the 2D display mode to 3D display modes either as a result of the display apparatus detecting stereoscopic content or as a result of an action of the user.

The 2D display mode and 3D display mode of the display apparatus may be summarized as follows:

$$\{A_1, \ldots, A_r\} \xrightarrow{G_5} \{T_1, \ldots, T_t\} \text{ 2D display mode}$$

$$\{A_1, \ldots, A_r\}\{B_1, \ldots, B_s\} \rightarrow$$

$$\xrightarrow{G_1, G_2} \{P_1, \ldots, P_m\} \{Q_1, \ldots, Q_n\} \text{ 3D display mode}$$

$$\{P_1, \ldots, P_m\} \{Q_1, \ldots, Q_n\} \xrightarrow{G_4} \{T_1, \ldots, T_t\}, \text{ 3D display mode}.$$

In general, the transformation $G_4$ used for stereoscopic images may be different from the transformation $G_5$ used for displaying non-stereoscopic images. For example, a display apparatus may include red $T_1$, green $T_2$, blue $T_3$ and white $T_4$ primary colors. If the display apparatus receives a single image in red $A_1$, green $A_2$ and blue $A_3$ coordinates, the display apparatus may use the transformation $G_5$ to transform the three image coordinates $\{A_1, A_2, A_3\}$ into four display primary colors $\{T_1, T_2, T_3, T_4\}$. The transformation $G_5$ may distribute part of the brightness of the image into the white primary color $T_4$ and part of the brightness of the image into the primary colors $\{T_1, T_2, T_3\}$. Examples of transformations $G_5$ are provided in the prior art and are well known to those skilled in the art. If the display apparatus receives or generates an anaglyph in four coordinates $\{P_1, P_2, P_3, Q_1\}$, the display apparatus may use the transformation $G_4$ to transform the coordinate $Q_1$ into the white primary color $T_4$ and transform the coordinates $\{P_1, P_2, P_3\}$ into the primary colors $\{T_1, T_2, T_3\}$. The transformation $G_4$ may compensate for various properties of the display apparatus such as the properties of the primary colors $\{T_1, \ldots, T_t\}$ and color shifts in an anaglyph due to fusing two images with different color gamuts.

The anaglyphs of the present invention may be created either outside a display apparatus or created by a display apparatus. If the anaglyphs are created by the display apparatus using transformations $G_1$ and $G_2$, the display apparatus may (1) receive the stereoscopic image coordinates through a connection or connections to a storage apparatus; (2) convert the stereoscopic image coordinates to anaglyph primary color coordinates, and (3) load the anaglyph coordinates into the primary colors of the display apparatus using the transformation $G_4$. If the anaglyphs are created outside the display apparatus, the display apparatus may (1) receive the anaglyph primary color coordinates through a connection or connections to a storage apparatus; (2) load the anaglyph coordinates into the primary colors of the display apparatus using the transformation $G_4$. The display apparatus and storage apparatus may be components of a composite apparatus such as a digital television apparatus which may include additional methods to receive and decompress stereoscopic content transmitted in certain formats.

Another embodiment of the present invention comprises a switch $SW_1$ by which a user may switch a display apparatus between a 2D display mode and the 3D display mode of the present invention. The switch $SW_1$ may also provide a method for a user to adjust the average brightness of the second image relative to the average brightness of the first image. The switch $SW_1$ may allow a display apparatus to be switched between a plurality of states. One state of the display apparatus may correspond to the 2D mode of the display apparatus while a plurality of states may correspond to the 3D mode of the display apparatus with a plurality of brightness levels of the second image. Then the switch $SW_1$ may provide a simple intuitive method for a user to adjust the display apparatus for 2D and 3D content and a means to adjust the ratio of the average brightness of the second image to the average brightness of the first image to the preferred average brightness level of the second image. A low average brightness level of the second image may facilitate viewing anaglyph content simultaneously in 2D without using viewing filters and in 3D using viewing filters by multiple users. The switch $SW_1$ may be composed of hardware or may be provided in software or firmware or a combination thereof.

Transfer of Generalized Anaglyphs

In the prior art, a display apparatus which is capable of displaying stereoscopic images often display first and second images time sequentially. This often reduces the display frequency or refresh rate of the display apparatus by a factor of two. If the display apparatus is also capable of displaying non-stereoscopic images with a refresh rate $f_2$, the display apparatus often may display a stereoscopic images with a refresh rate of $f_1 = f_2/2$ which is half the refresh rate for non-stereoscopic display.

The methods of displaying stereoscopic images as two full color images of the prior art may be summarized as follows:

$$\{A_1, \ldots, A_r\} \rightarrow \{W_1, \ldots, W_w\} \rightarrow \{T_1, \ldots, T_t\} \text{ at frequency } f_2/2 \text{ and}$$

$$\{B_1, \ldots, B_s\} \rightarrow \{W_1, \ldots, W_w\} \rightarrow \{T_1, \ldots, T_t\} \text{ at frequency } f_2/2$$

where W is a buffer with w channels $\{W_1, \ldots, W_w\}$ for storing the color coordinates of the display primary colors $\{T_1, \ldots, T_t\}$ before the primary colors are updated. Herein a buffer has enough channels to store the coordinates stored in them unless otherwise stated.

Methods of displaying traditional anaglyphs often differ from methods of displaying stereoscopic images composed of two full color images in that anaglyphs may often be treated like a single image by a display apparatus whereas stereoscopic full-color image pairs may be treated as two images during display. If the refresh rate of a display apparatus for displaying non-stereoscopic images is $f_2$, the refresh rate for displaying anaglyphs images may also be $f_2$.

The methods of displaying anaglyphs of the prior art may be summarized as follows:

$$\{P_1, P_2, Q_1\} \rightarrow \{W_1, \ldots, W_w\} \rightarrow \{T_1, \ldots, T_t\} \text{ at frequency } f_2$$

where W is a buffer with w channels $\{W_1, \ldots, W_w\}$ for storing the color coordinates of the display primary colors $\{T_1, \ldots, T_t\}$ before the primary colors are updated.

The present invention provides methods for displaying general anaglyphs at a refresh rate $f_3$ equal to the refresh rate $f_2$ of displaying non-stereoscopic images $f_3 = f_2$. However, the methods of the present invention may receive the first and second images at the combined frequency $f_4$ which may be twice the frequency of the displaying non-stereoscopic images $f_4=2f_2$. In contrast, traditional stereoscopic displays which display two full-color images receive the first and second images at a frequency $f_4$ equal to the frequency of displaying non-stereoscopic images $f_4=f_2$. For this reason, display apparatus of the present invention may receive images at twice the frequency of conventional display apparatus. The display apparatus of the present invention may comprise hardware, firmware and software to process the stereoscopic images which may be received at twice the frequency of traditional display apparatus.

Another embodiment of the present invention provides a method for displaying stereoscopic images comprising a display apparatus providing primary colors $\{T_1, \ldots, T_t\}$ which may be refreshed at a rate $f_2$. The display apparatus may receive a first image in coordinates $\{A_1, \ldots, A_r\}$ at a frequency of $f_2$, and receive a second image in color coordinates $\{B_1, \ldots, B_s\}$ at the frequency $f_2$ where the combined frequency $f_4$ of receiving first and second images is given by $f_4=2f_2$. The display apparatus may include a transformation $G_1$ which transforms the coordinates $\{A_1, \ldots, A_r\}$ into the primary coordinates $\{P_1, \ldots, P_m\}$ and a transformation $G_2$ which transforms the coordinates $\{B_1, \ldots, B_s\}$ into the primary coordinates $\{Q_1, \ldots, Q_n\}$. The coordinates $\{P_1, \ldots, P_m\}$ and $\{Q_1, \ldots, Q_n\}$ may be stored in a buffer W with w channels $\{W_1, \ldots, W_w\}$ where w is equal to or greater than t. The display apparatus may transform the display coordinates $\{P_1, \ldots, P_m\}$ and $\{Q_1, \ldots, Q_n\}$ into physical primary colors $\{T_1, \ldots, T_t\}$ at the frequency $f_2$. In other words, the display apparatus of the present invention may receive images at a rate $f_4$ which is twice the refresh rate $f_2$ of the primary colors $\{T_1, \ldots, T_t\}$.

The method of the present embodiment may be summarized as follows:

$$\{A_1, \ldots, A_r\} \xrightarrow{G_1} \{P_1, \ldots, P_m\} \to \{W_1, \ldots, W_w\} \text{ at frequency } f_2;$$

$$\{B_1, \ldots, B_s\} \xrightarrow{G_2} \{Q_1, \ldots, Q_n\} \to \{W_1, \ldots, W_w\} \text{ at frequency } f_2; \text{ and}$$

$$\{W_1, \ldots, W_w\} \to \{T_1, \ldots, T_t\} \text{ at frequency } f_2.$$

Another embodiment of the present invention provides methods to transfer stereoscopic images to a display apparatus for displaying as anaglyphs. The first image coordinates $\{A_1, \ldots, A_r\}$ may be received by the display apparatus through a first communication port C with e channels $\{C_1, \ldots, C_e\}$ at a frequency $f_2$. Herein a communication port has enough channels to carry the coordinates transferred unless otherwise stated. The second image coordinates $\{B_1, \ldots, B_s\}$ may be received by the display apparatus through a second communication D with e channels $\{D_1, \ldots, D_e\}$ at frequency $f_2$. The combined frequency of receiving first and second images may be $f_4=2f_2$. The first image coordinates received by the display apparatus may be stored in a first memory buffer $\{U\}$ with b channels $\{U_1, \ldots, U_b\}$. The second image coordinates received by the display apparatus may be stored in a second memory buffer $\{V\}$ with c channels $\{V_1, \ldots, V_c\}$. The coordinates in buffers U and V may be transformed into anaglyph primary coordinates $\{P_1, \ldots, P_m\}$ and $\{Q_1, \ldots, Q_n\}$ using transformations $G_1$ and $G_2$ respectively. The coordinates $\{P_1, \ldots, P_m\}$ and $\{Q_1, \ldots, Q_n\}$ may be stored in a buffer $\{W\}$ with w channels $\{W_1, \ldots, W_w\}$ where w is equal to or greater than t. Then the coordinates $\{P_1, \ldots, P_m\}$ and $\{Q_1, \ldots, Q_n\}$ may be transformed into the primary colors $\{T_1, \ldots, T_t\}$ at a frequency $f_2$.

$$\{A_1, \ldots, A_r\} \xrightarrow{C} \{U_1, \ldots, U_b\} \xrightarrow{G_1} \{P_1, \ldots, P_m\} \text{ at frequency } f_2; \text{ and}$$

$$\{B_1, \ldots, B_s\} \xrightarrow{D} \{V_1, \ldots, V_c\} \xrightarrow{G_2} \{Q_1, \ldots, Q_n\} \text{ at frequency } f_2; \text{ and}$$

$$\{W_1, \ldots, W_w\} \to \{T_1, \ldots, T_t\} \text{ at frequency } f_2.$$

Figure 11A:
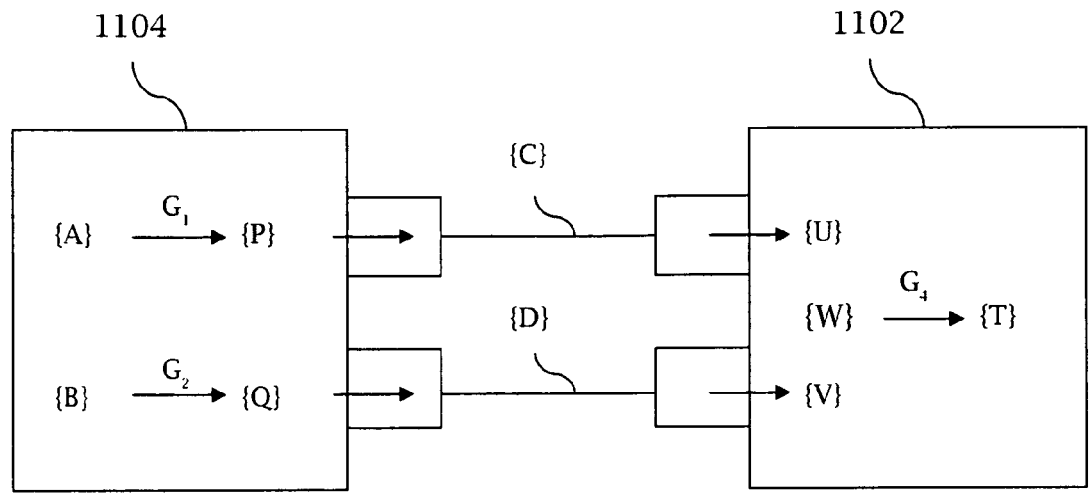
FIG. 11a depicts a display apparatus receiving stereoscopic images in display coordinates {P}, and {Q} into first and second buffers {U} and {V} from an external source through two communication ports {C} and {D}.

FIG. 11a depicts a method for receiving anaglyph images by a display apparatus 1102 from an external source 1104 by receiving a first image in primary coordinates $\{P\}$ through communication port $\{C\}$ and by receiving a second image in primary coordinates $\{Q\}$ through communication port $\{D\}$. The first image may be received into a buffer $\{U\}$ of the display apparatus. The second image may be received into a buffer $\{V\}$ of the display apparatus. The display apparatus may include a transformation $G_4$ which maps the primary coordinates $\{P\}$ stored in buffer $\{U\}$ and primary coordinates $\{Q\}$ stored in buffer $\{V\}$ into the primary colors $\{T\}$ of the display apparatus. The external source may include a transformation $G_1$ for transforming a first image in color coordinates $\{A\}$ into primary coordinates $\{P\}$. The external source may include a transformation $G_2$ for transforming a second image in color coordinates $\{B\}$ into color coordinates $\{Q\}$.

Figure 11B:
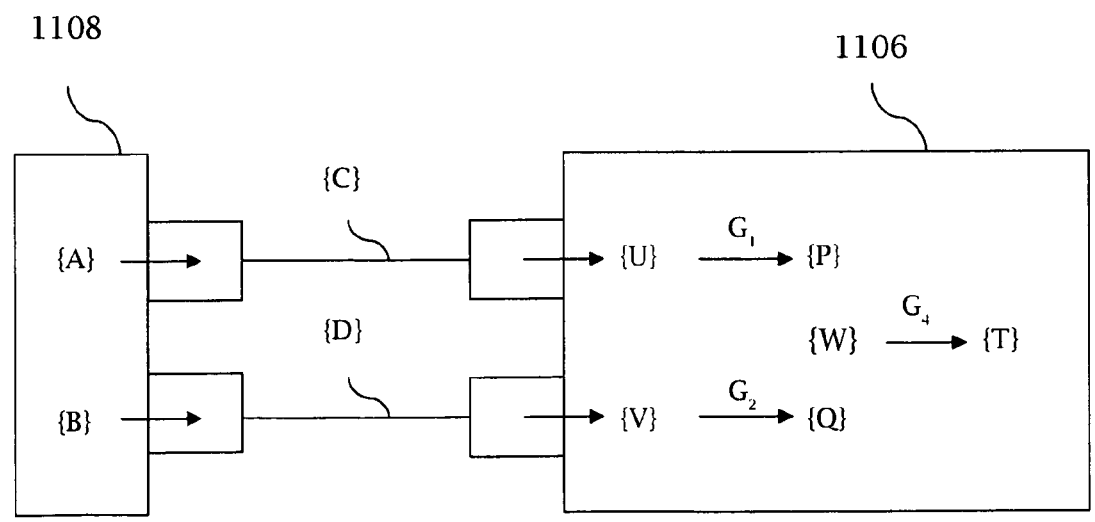
FIG. 11b depicts a display apparatus receiving stereoscopic images in coordinates {A}, and {B} into first and second buffers {U} and {V} from an external source through two communication ports.

FIG. 11b depicts a method for receiving stereoscopic images by a display apparatus 1106 from an external source 1108 by receiving a first image in color coordinates $\{A\}$ through communication port $\{C\}$ and by receiving a second image in color coordinates $\{B\}$ through communication port $\{D\}$. The first image may be received into a buffer $\{U\}$ of the display apparatus. The second image may be received into a buffer $\{V\}$ of the display apparatus. The display apparatus may include a transformation $G_1$ for transforming the first image in color coordinates $\{A\}$ stored in buffer $\{U\}$ into primary coordinates $\{P\}$. The display apparatus may include a transformation $G_2$ for transforming a second image in color coordinates $\{B\}$ stored in buffer $\{V\}$ into primary coordinates $\{Q\}$. The display apparatus may include a transformation $G_4$ which maps the primary coordinates $\{P\}$ and primary coordinates $\{Q\}$ into the primary colors $\{T\}$ of the display apparatus.

Another embodiment of the present invention provides methods to transfer stereoscopic images to a display apparatus time sequentially for display as anaglyphs. The first image coordinates $\{A_1, \ldots, A_r\}$ may be received by the display apparatus through a first communication port $\{C\}$ with e channels $\{C_1, \ldots, C_e\}$ in a first interval of time $t_1$. The second image coordinates $\{B_1, \ldots, B_s\}$ may be received by the display apparatus through communication port $\{C\}$ in a second interval of time $t_2$. The first image coordinates received by the display apparatus may be stored in a first memory buffer $\{U\}$ with b coordinates $\{U_1, \ldots, U_b\}$. The second image coordinates received by the display apparatus may be stored in a second memory buffer $\{V\}$ with c coordinates $\{V_1, \ldots, V_c\}$. The coordinates in buffers $\{U\}$ and $\{V\}$ may be transformed into anaglyph primary coordinates $\{P_1, \ldots, P_m\}$ and $\{Q_1, \ldots, Q_n\}$ using transformations $G_1$ and $G_2$ respectively. The coordinates $\{P_1, \ldots, P_m\}$ and $\{Q_1, \ldots, Q_n\}$ may be stored in a buffer W with w channels $\{W_1, \ldots, W_w\}$ where w is equal to or greater than t. Then the coordinates $\{P_1, \ldots, P_m\}$ and $\{Q_1, \ldots, Q_n\}$ may be transferred into the display primary colors $\{T_1, \ldots, T_t\}$ in a third interval of time $t_3$ $$\{A_1, \ldots, A_r\} \xrightarrow{C} \{U_1, \ldots, U_b\} \xrightarrow{G_1} \{P_1, \ldots, P_m\} \text{ in time interval } t_1$$

$$\{B_1, \ldots, B_s\} \xrightarrow{C} \{V_1, \ldots, V_c\} \xrightarrow{G_2} \{Q_1, \ldots, Q_n\} \text{ in time interval } t_2$$

$$\{W_1, \ldots, W_w\} \to \{T_1, \ldots, T_t\} \text{ in time interval } t_3.$$

Either the first or second image may be transferred to the display apparatus first. The transformations $G_1$ and $G_2$ may be applied in time intervals which overlap the time intervals $t_1$ or $t_2$. For example if the second image is transferred to the buffer $\{V\}$ first, the coordinates $\{B_1, \ldots, B_s\}$ may be transformed into the coordinates $\{Q_1, \ldots, Q_n\}$ using transformation $G_2$ before or during the transfer of the coordinates $\{A_1, \ldots, A_r\}$ to the buffer $\{U\}$.

Figure 12A:
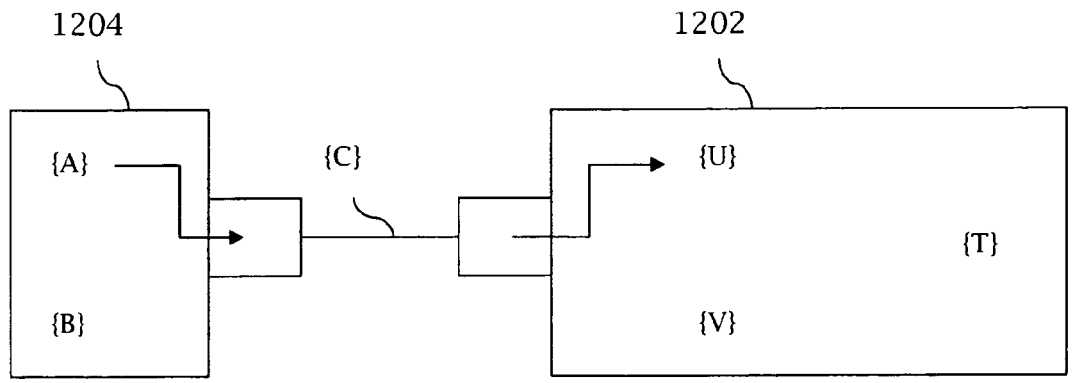
FIG. 12a depicts a display apparatus receiving a first image in coordinates {A} into a first buffer {U} from an external source through one communication port {C}.
Figure 12B:
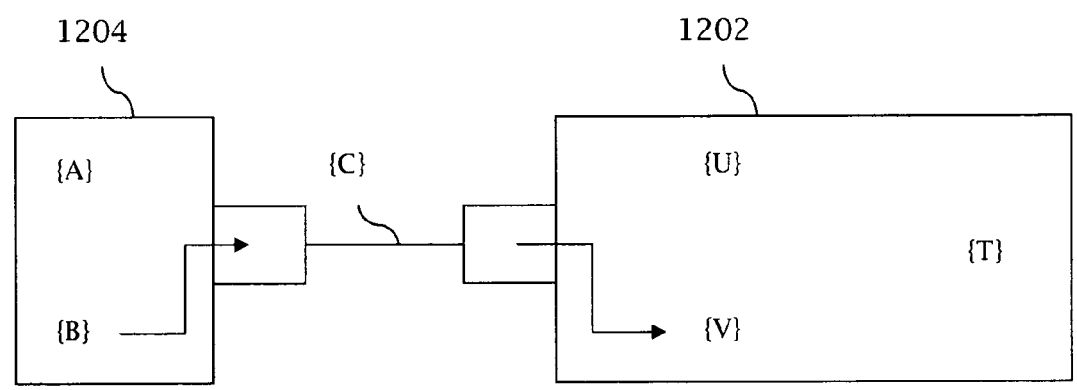
FIG. 12b depicts a display apparatus receiving a second image in coordinates {B} into a second buffer {V} from an external source through one communication port {C}.
Figure 12C:
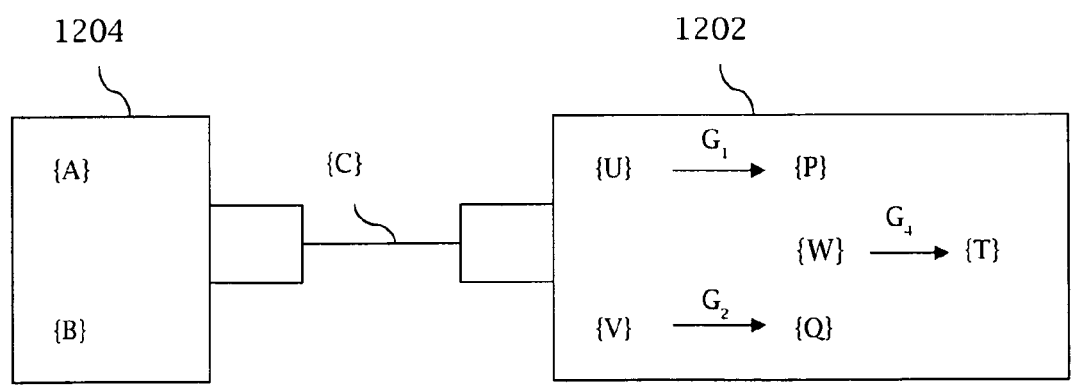
FIG. 12c depicts a display apparatus loading the coordinates {P} and {Q} of an anaglyph into the primary colors {T} of the display apparatus.

FIG. 12a-c depicts a method for transferring stereoscopic images time sequentially to the display apparatus. The display apparatus 1202 may be connected to a storage apparatus 1204 by a communication port $\{C\}$. The initial full-color stereoscopic image or an anaglyph image may be received by the display apparatus through the connector $\{C\}$. FIG. 12a depicts the first image in coordinates $\{A\}$ being transferred to the buffer $\{U\}$ of the display apparatus from the storage apparatus during a first duration of time $t_1$. FIG. 12b depicts the second image in coordinates $\{B\}$ being transferred to the buffer $\{V\}$ of the display apparatus during a second duration of time $t_2$. FIG. 12c depicts the anaglyph coordinates $\{P\}$ and $\{Q\}$ being transformed into the display primary colors £ $\{T_1, \ldots, T_s\}$ in a third duration of time $t_3$. The display apparatus may include a transformation $G_1$ for transforming the color coordinates $\{A\}$ in the buffer $\{U\}$ into the primary coordinates $\{P\}$. The display apparatus may include a transformation $G_2$ for transforming the color coordinates $\{B\}$ in the buffer $\{V\}$ into the primary coordinates $\{Q\}$.

Another embodiment of the present invention provides methods to transfer stereoscopic images to a display apparatus time sequentially for display as anaglyphs. The display apparatus may provide primary colors $\{T_1, \ldots, T_s\}$. The first image coordinates $\{A_1, \ldots, A_r\}$ may be transferred to the display apparatus through a first communication port C with e channels $\{C_1, \ldots, C_e\}$ in a first interval of time $t_1$. The first image coordinates received by the display apparatus may be stored in a memory buffer $\{U\}$ with b coordinates $\{U_1, \ldots, U_b\}$. The coordinates of the first image stored in buffer $\{U\}$ may be transformed into anaglyph primary coordinates $\{P_1, \ldots, P_m\}$ using a transformation $G_1$. The coordinates $\{P_1, \ldots, P_m\}$ may be stored in a buffer W with w channels $\{W_1, \ldots, W_w\}$ where w is equal to or greater than t. The second image coordinates $\{B_1, \ldots, B_s\}$ may be transferred to the display apparatus through communication port C in a second interval of time $t_2$. The second image coordinates received by the display apparatus may be stored in the memory buffer U. The coordinates of the second image in buffer $\{U\}$ may be transformed into anaglyph coordinates $\{Q_1, \ldots, Q_n\}$ using the transformation $G_2$. The coordinates $\{Q_1, \ldots, Q_n\}$ may be stored in the buffer W. The coordinates $\{P_1, \ldots, P_m\}$ and $\{Q_1, \ldots, Q_n\}$ may be transferred from the buffer W into the display primary colors $\{T_1, \ldots, T_t\}$ in a third interval of time $t_3$:

$$\{A_1, \ldots, A_r\} \xrightarrow{C} \{U_1, \ldots, U_b\} \xrightarrow{G_1} \{P_1, \ldots, P_m\} \text{ in time interval } t_1$$

$$\{B_1, \ldots, B_s\} \xrightarrow{C} \{U_1, \ldots, U_c\} \xrightarrow{G_2} \{Q_1, \ldots, Q_n\} \text{ in time interval } t_2$$

$$\{W_1, \ldots, W_w\} \to \{T_1, \ldots, T_t\} \text{ in time interval } t_3.$$

Either the first or second images may be transferred to the display apparatus first. The transformation $G_1$ may be applied in a time interval which overlaps the time interval $t_2$. The transformation $G_2$ may be applied in time interval which overlaps the time interval $t_1$. For example if the second image is transferred to the buffer $\{V\}$ first, the display apparatus may transform the coordinates $\{B_1, \ldots, B_s\}$ into the coordinates $\{Q_1, \ldots, Q_n\}$ using the transformation $G_2$ before or during the transfer of the coordinates $\{A_1, \ldots, A_r\}$ to the buffer $\{U\}$. Then the coordinates in buffer $\{U\}$ may be transformed into the coordinates $\{P_1, \ldots, P_m\}$ using the transformation $G_1$.

Figure 13A:
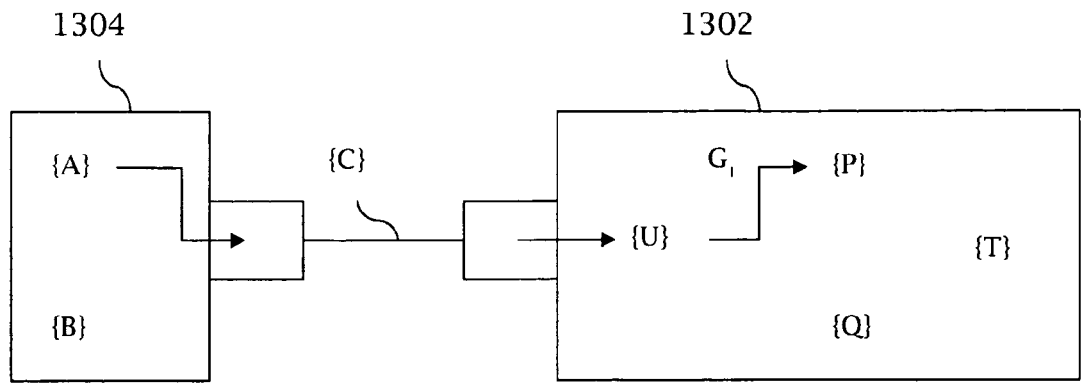
FIG. 13a depicts a display apparatus receiving a first image in coordinates {A} into a buffer {U} from an external source through one communication port {C} and transforming the coordinates {A} into display coordinates {P}.
Figure 13B:
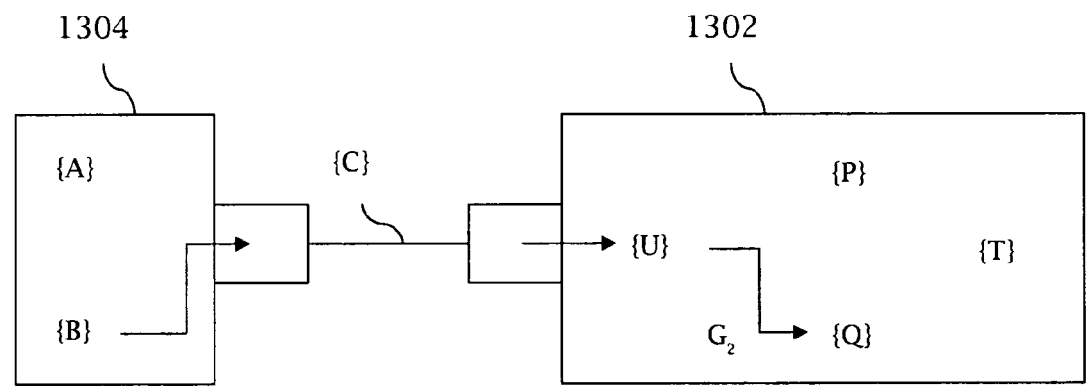
FIG. 13b depicts a display apparatus receiving a second image in coordinates {B} into a buffer {U} from an external source through one communication port {C} and transforming the coordinates {B} into display coordinates {Q}.
Figure 13C:
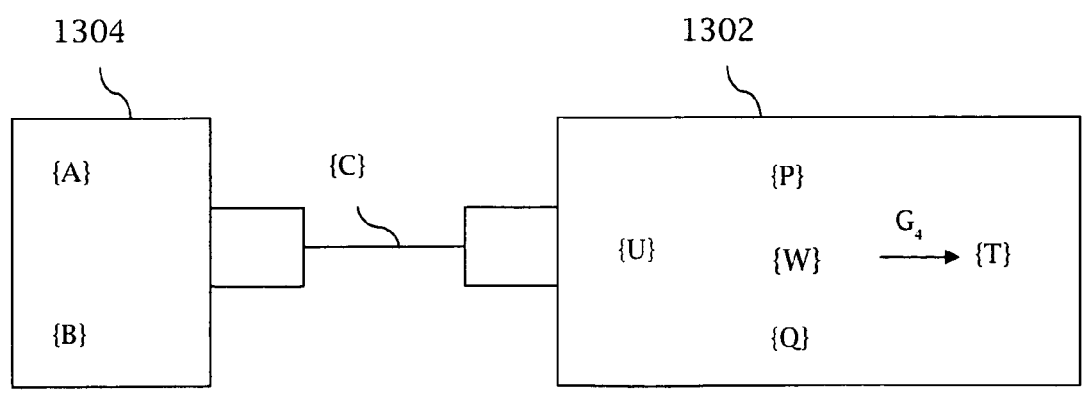
FIG. 13c depicts a display apparatus loading the coordinates {P} and {Q} of an anaglyph into the primary colors {T} of the display apparatus.

FIG. 13a-c depicts a method for transferring stereoscopic image data time sequentially to the display apparatus. The display apparatus 1302 may be connected to a storage apparatus 1304 by a communication port $\{C\}$. The initial full-color stereoscopic image or an anaglyph image may be received by the display apparatus through the connector $\{C\}$. FIG. 13a depicts the first image in coordinates $\{A\}$ being transferred to the buffer $\{U\}$ of the display apparatus from the storage apparatus during a first duration of time $t_1$. FIG. 13a depicts the coordinates of the first image $\{A\}$ being transformed into the anaglyphs coordinates $\{P\}$ using a transformation $G_1$ during the time interval $t_1$. FIG. 12b depicts the second image in coordinates $\{B\}$ being transferred to the buffer $\{V\}$ of the display apparatus during a second duration of time $t_2$. FIG. 12b depicts the coordinates of the second image $\{B\}$ being transformed into the anaglyphs coordinates $\{Q\}$ using a transformation $G_2$ during time interval $t_2$. FIG. 12c depicts the anaglyph coordinates $\{P\}$ and $\{Q\}$ being transformed into the display primary colors $\{T_1, \ldots, T_s\}$ in a third duration of time $t_3$.

Compressing Four-Color Anaglyphs into Three Channels

In some cases it may be desirable to transfer anaglyph images to a display apparatus through a single communication port at the frequency f of updating the primary colors of a display apparatus. If the communication port C has channels e channels $\{C_1, \ldots, C_e\}$ and the anaglyph has e=m+n primary color coordinates $\{P_1, \ldots, P_m\}\{Q_1, \ldots, Q_n\}$, then the anaglyph may be received by the display apparatus through communication port $\{C\}$ at a frequency f and transformed into the primary colors $\{T_1, \ldots, T_t\}$ of the display apparatus at frequency f. However, if the number e of channels in the communication port $\{C\}$ is less than the number m+n of anaglyph coordinates, then the anaglyph coordinates may be compressed into e coordinates $\{E_1, \ldots, E_e\}$ using a transformation $G_3$ of the present invention before being received by the display apparatus. The display apparatus may include a transformation $G_3^{-1}$ of the present invention which may transform the coordinates $\{E_1, \ldots, E_e\}$ into the primary coordinates $\{P_1, \ldots, P_m\}\{Q_1, \ldots, Q_n\}$.

Figure 14A:
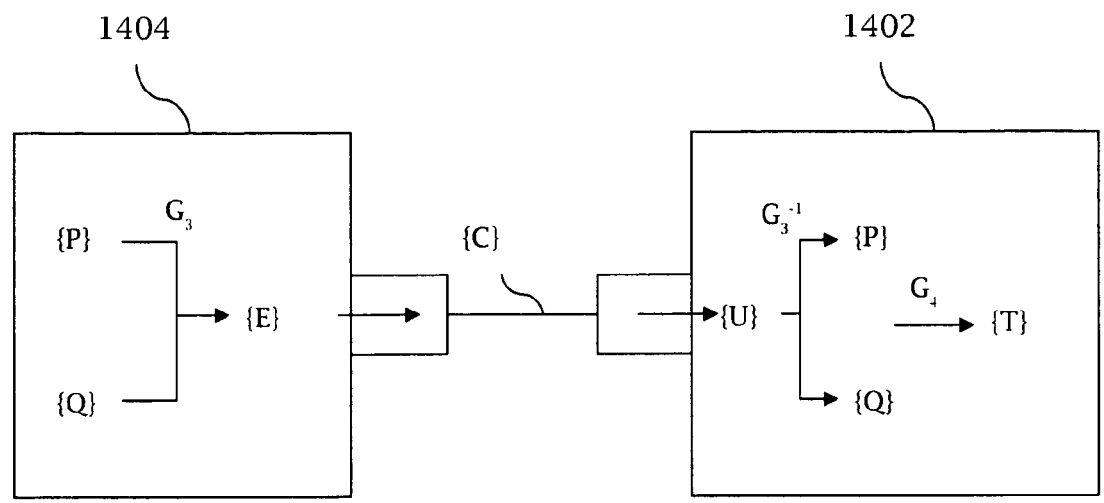
FIG. 14a depicts a display apparatus receiving a stereoscopic image in coordinates {E} into a buffer {U} from an external source through one communication port {C} and transforming the coordinates {E} into anaglyph coordinates {P} and {Q}; and loading coordinates {P} and {Q} in the primary colors {T}.

Another embodiment of the present invention provides methods to compress the coordinates $\{P_1, P_2, P_3, Q_1\}$ of a four-color anaglyph into three coordinates $\{E_1, E_2, E_3\}$ using a transformation $G_3$. The three channels may be received by a display apparatus through a three channel communication port $\{C\}$. The display apparatus may comprise a transformation $G_3^{-1}$ for uncompressing the three color channels $\{E_1, E_2, E_3\}$ into the four color coordinates $\{P_1, P_2, P_3, Q_1\}$. FIG. 14a depicts a display apparatus 1402 receiving from an external source 1404 an anaglyph compressed into coordinates $\{E\}$ through communication port $\{C\}$. The external source may include a transformation $G_3$ which may be used to transform the anaglyph coordinates $\{P\}$ and $\{Q\}$ into coordinates $\{E\}$. The display apparatus may include a transformation $G_3^{-1}$ which may be used to transform the coordinates $\{E\}$ anaglyph into coordinates $\{P\}$ and $\{Q\}$.

Figure 14B:
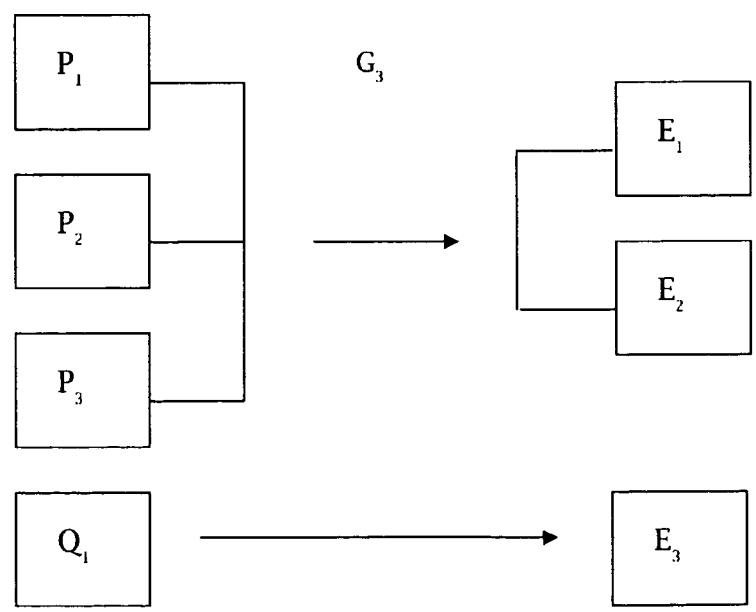
FIG. 14b depicts a method of compressing coordinates {P₁, P₂, P₃} and {Q₁} into three channel coordinates {E₁, E₂, E₃}.

The transformation $G_3$ may transform the anaglyph coordinates $\{P_1, \ldots, P_m\}$ of the first image into the coordinates $\{E_1, E_2\}$ and transform the anaglyph coordinate $\{Q_1\}$ into the coordinate $\{E_3\}$. FIG. 14b depicts the transformation $G_3$ transforming coordinates $\{P_1, P_2, P_3\}$ into the coordinates $\{E_1, E_2\}$ and transforming the coordinate $\{Q_1\}$ into coordinate $\{E_3\}$.

Another embodiment of the present invention provides a method to compress the coordinates $\{P_1, P_2, P_3\}$ into the coordinates $\{E_1, E_2\}$. The coordinates $\{E_1\}$ may contain the brightness $Y_1$ of the first image while the coordinates $\{E_2\}$ may contain compressed chromaticity coordinates $C_1$ and $C_2$ of the first image. The two chromaticity coordinates may be $C_1=x$ and $C_2=y$ where x and y are the chromaticity coordinates of the CIE xyY color space. Alternatively, the two chromaticity coordinates may be $C_1=R-G$ and $C_2=B-G$. Then during decompression, G may be determined from the constraint that the brightness $Y_1$ which may be represented in the coordinates $\{E_1\}$ may be a function of the red R, green G, and blue B color coordinates.

Figure 15A:
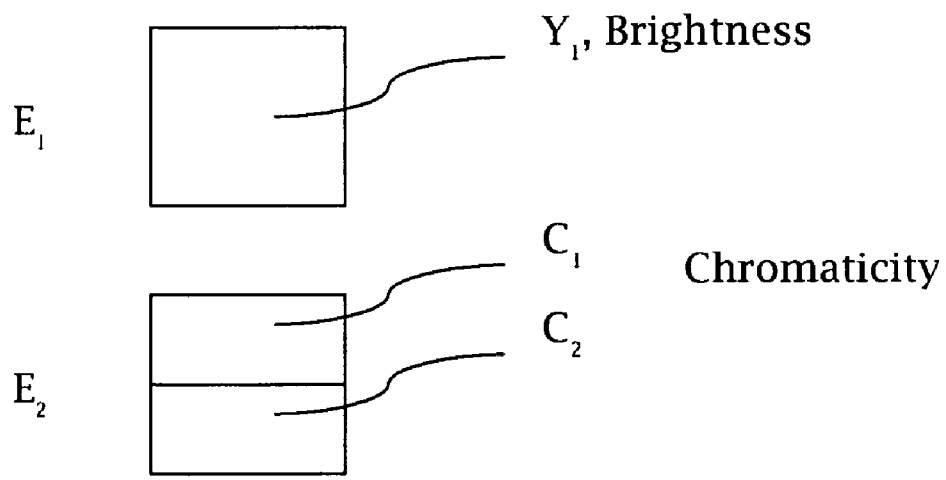
FIG. 15a depicts a method of compressing coordinates {P₁, P₂, P₃} into two channel coordinates {E₁,E₂} using chromaticity coordinates.
Figure 15B:
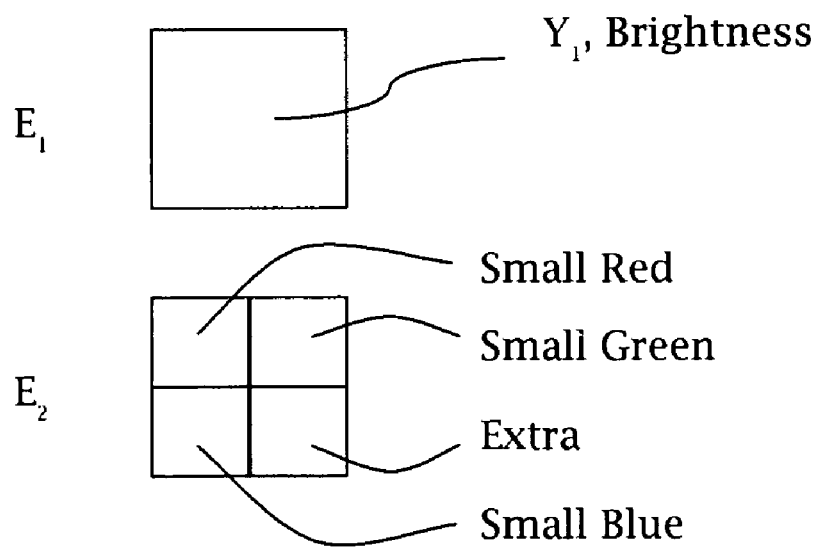
FIG. 15b depicts a method of compressing coordinates {P₁, P₂, P₃} into two channel coordinates {E₁,E₂} using reduced resolution red, green, and blue coordinates.

The chromaticity coordinates $C_1$ and $C_2$ may be compressed in one channel by encoding the color at reduced spatial resolution. If the vertical resolution is reduced by a factor of two, the coordinate images $\{C_1\}$ and $\{C_2\}$ may be arranged in the coordinate image $\{E_2\}$ one over the other. If the horizontal resolution is reduced by a factor of two, the coordinate images $\{C_1\}$ and $\{C_2\}$ may be arranged in the coordinate image $\{E_2\}$ one beside the other. The display apparatus may provide a transformation $G_3^{-1}$ which transforms the chromaticity images in one channel into full resolution chromaticity images. FIG. 15b depicts the brightness coordinates $Y_1$ of the first image in the channel $E_1$ and the chromaticity coordinates $C_1$ and $C_2$ with reduced vertical resolution in the channel $E_2$ placed one over the other. Alternately the chromaticity coordinates may be interlaced in the $E_2$ channel.

Another embodiment of the present invention provides methods to transfer the color information of the first image in one channel at half resolution in both the vertical and horizontal directions. This allows for four reduced resolution versions of the image to be packed into one channel. For example, reduced resolution red, green and blue images may be transferred in channel $E_2$ while the brightness of the same image may be transferred at full resolution in channel $E_1$. The display apparatus may provide a transformation $G_3^{-1}$ which transforms the reduced resolution color images to full resolution. The brightness $Y_c$ of the up-scaled images may be computed and compared with the brightness values $Y_1$ in the channel $E_1$. Then the color images may be modified to reduce the error between the calculated $Y_c$ and transferred $Y_1$ brightness values. FIG. 15b depicts the brightness $Y_1$ of the first image in channel $E_1$ and the reduced resolution color images Small Red, Small Green, and Small Blue in channel $E_2$. FIG. 15b also depicts an extra (Extra) quadrant of the channel $E_2$. The extra channel may contain additional information such as a fourth primary color coordinates or information helpful in decompressing the image color.

The compression formats of the present invention may be relatively simple in order that a display apparatus may decompress the formats with subroutines that may be similar to subroutines that the display apparatus may to use for displaying non-stereoscopic images.

Three-channel format $\{E_1, E_2, E_3\}$ of a stereo image of the present invention may be convenient for distribution and storage of full-color stereoscopic images. Many image compression methods exist in the prior art for three or more channel data such as JPEG, PNG, MPEG and many others. These compression methods may be used with the three channel format of the present invention to conveniently storage and distribute stereo images.

As noted above, the present invention is applicable to primary colors, color transformations and special filters and is believed to be particularly useful for displaying and viewing anaglyphs with wide color gamuts without retinal rivalry. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

Display Types

In order to display and view the general anaglyphs of the present invention, it is beneficial for the spectra of the primary colors $\{P_1, \ldots, P_m\}$ of the first image to not substantially overlap the primary colors $\{Q_1, \ldots, Q_n\}$ of the second image or for the polarization state $p_1$ of the primary colors $\{P_1, \ldots, P_m\}$ to be orthogonal to the polarization state $p_2$ of the primary colors $\{Q_1, \ldots, Q_n\}$. Then a first $F_1$ viewing filter and a second $F_2$ viewing filter may be used to view the stereoscopic images. The first viewing filter $F_1$ may substantially transmit the primary colors $\{P_1, \ldots, P_m\}$ and block the primary colors $\{Q_1, \ldots, Q_n\}$. The second viewing filter $F_2$ may substantially transmit the primary colors $\{Q_1, \ldots, Q_n\}$ and block the primary colors $\{P_1, \ldots, P_m\}$. If the spectra of the primary colors do not substantially overlap, the viewing filters may be color filters. If the polarization states of the primary colors are opposite, the viewing filters may be polarized filters. Alternatively, the first and second images may be displayed time sequentially and viewed with shutter filters which may alternate between transparent and opaque states in synchronization with the first and second images. Another embodiment of the present invention the first and second images may be displayed on separate surfaces (a case of spatial multiplexing) and a viewing apparatus used to direct the view of each image to first and second eyes of a user respectively. Autostereoscopic display methods are a case of spatial multiplexing which may be used to view anaglyphs of the present invention.

The present invention discloses methods to provide four or more primary colors in various display types in order to display the general anaglyphs of the present invention. Providing four primary colors may be generally easier and cheaper than providing six primary colors required in the prior art to display two full color stereoscopic image pairs. Methods of providing six primary colors usually may be adapted to provide four to six primary colors of the present invention.

Display apparatus which may provide four or more primary colors for displaying anaglyphs of the present invention may include: digital projectors such as DLP, LCD and LCOS projectors, front and rear projectors; analog projectors; CRT's; flat panel LCD displays; plasma displays; flat panel LED displays; printers; autostereoscopic displays or prints; Lippman photographic records and other types.

In some embodiments of the present invention, the primary colors may be spatially multiplexed as in multi-colored pixel array displays that use separate regions of each pixel to generate each primary color. Pixel display apparatus may be either direct view such as flat panel displays or indirect view such as digital projectors. In some embodiments of the present invention, at least some of the primary colors may be time multiplexed in order to time multiplex the left and right images of a stereo pair. Time multiplexing display apparatus may be either direct view such as flat panel LED displays and plasma displays, or indirect view such as digital projectors utilizing a color wheel or alternating light sources. In some embodiments of the present invention, at least some of the primary colors may be layer multiplexed. Layer multiplexing display apparatus may be either direct view such as printed images, multilayer LCD displays or photographic slide film or indirect view such as multilayer LCD projectors and photographic slide film projectors. Some embodiments of the present invention provide four or more primary color images by forming primary images in multiple light paths with multiple panel display devices. The primary images may be combined using dichroic prisms or polarization beam splitters PBS. Display apparatus with multiple light paths may be direct view such as dual flat panel stereoscopic displays or indirect view such as digital projectors, and slide projectors. Some embodiments of the present invention may use several types of multiplexing which may include spatial multiplexing, time multiplexing, layer multiplexing, and multiple light paths in a display apparatus to generate four or more primary colors for displaying anaglyphs of the present invention.

A direct view display apparatus of the present invention which displays the first and second images in orthogonal polarization states may be viewed with polarized viewing filters to obtain a stereoscopic view of the stereoscopic images. An indirect view display apparatus of the present invention which displays the first and second images in orthogonal polarization states may project the image onto a polarization preserving screen and viewed with polarized viewing filters to obtain a stereoscopic view of the stereoscopic images. In direct view display apparatus of the present invention, providing polarization encoding of the first and second images a polarization preserving screen may not be necessary.

Herein some examples of embodiments of the present invention which provide four primary colors for displaying the anaglyphs of the present invention are described.

Four-Color Projectors

Another embodiment of the present invention provides a method of displaying stereoscopic images comprising four primary colors $\{P_1, P_2, P_3, Q\}$ and four display panels. A bundle of generally white light $\{L_W\}$ may be separated into four light bundles $\{L_1, L_2, L_3, L_4\}$ comprising the spectra of primary colors $\{P_1, P_2, P_3, Q\}$ respectively using optical components such as dichroic filters and PBS; or four bundles of light $\{L_1, L_2, L_3, L_4\}$ may be formed using multiple light sources. The light bundles $\{L_1, L_2, L_3, L_4\}$ may be incident on display panels $\{DP_1, DP_2, DP_3, DP_4\}$ respectively. Display panel $\{DP_1, DP_2, DP_3, DP_4\}$ may impart a primary coordinates $\{P_1, P_2, P_3, Q\}$ to light bundles $\{L_1, L_3, L_3, L_4\}$ respectively. The light bundles $\{L_1, L_2, L_3, L_4\}$ may be combined using optical components such as dichroic filters and PBS's into a projectable light bundle $\{L_P\}$. Then the bundle $\{L_P\}$ may be projected through a projection lens. The display panels $\{DP_1, DP_2, DP_3\}$ may impart the color coordinates $\{P_1, P_2, P_3\}$ of a first image into light bundles $\{L_1, L_3, L_3\}$ respectively. The display panel $\{DP_4\}$ may impart the coordinates $\{Q\}$ of a second image into light bundle $\{L_4\}$. $P_1$ may be a red primary color. $P_2$ may be a green primary color. $P_3$ may be a blue primary color. Q may be a red, yellow, green, cyan, blue, or desaturated primary color comprising components $\{Q_1, \ldots, Q_n\}$. A set of polarization filters, polarization rotators, or color selective polarization filters CSPF may be used to set the polarization state $p_2$ of the primary color $\{Q\}$ orthogonal to the polarization state $p_1$ of the primary colors $\{P_1, P_2, P_3\}$. If the polarization states of primary colors $\{P_1, P_2, P_3\}$ are orthogonal to the polarization state of primary color $\{Q\}$, the spectra of the primary color $\{Q\}$ may overlap the spectra of the primary colors $\{P_1, P_2, P_3\}$. Then the primary color $\{Q\}$ may preferably be red, orange, yellow, cyan or white. Color filters such as dichroic filters, CSPF's and dye filters may be used to control the spectra of the primary colors so that the spectra of the primary colors $\{P_1, P_2, P_3\}$ may substantially not overlap the spectra of the primary color $\{Q\}$. Then the primary color $\{Q\}$ may preferably be far-red, yellow, cyan, or white.

In another embodiment of the present invention utilizes a first cube PBS and second cube PBS to direct four light bundles $\{L_{11}, L_{12}, L_{13}, L_{14}\}$ onto four LCOS display panels—one bundle onto each panel. The first cube PBS has a first and a second LCOS display panel positioned parallel to second and third sides of the first cube PBS respectively. The second cube PBS has a third and fourth LCOS display panel positioned parallel to second and third sides of the second cube PBS respectively. The first PBS separates light entering a first side into first and second primary color light bundles and directs the light bundles onto first and second LCOS panels. The first and second LCOS panels impart first and second primary color images to the first and second light bundles respectively and reflect the first and second light bundles toward the first PBS. The first PBS combines the first and second light bundles and directs them out of a fourth side of the first PBS. The second PBS separates light entering a first side into first and second primary color light bundles and directs the light bundles onto third and fourth LCOS panels. The third and fourth LCOS panels impart third and fourth primary color images to the first and second light bundles respectively and reflect the third and fourth light bundles toward the second PBS. The second PBS combines the third and fourth light bundles and directs them out of a fourth side of the second PBS.

Figure 16:
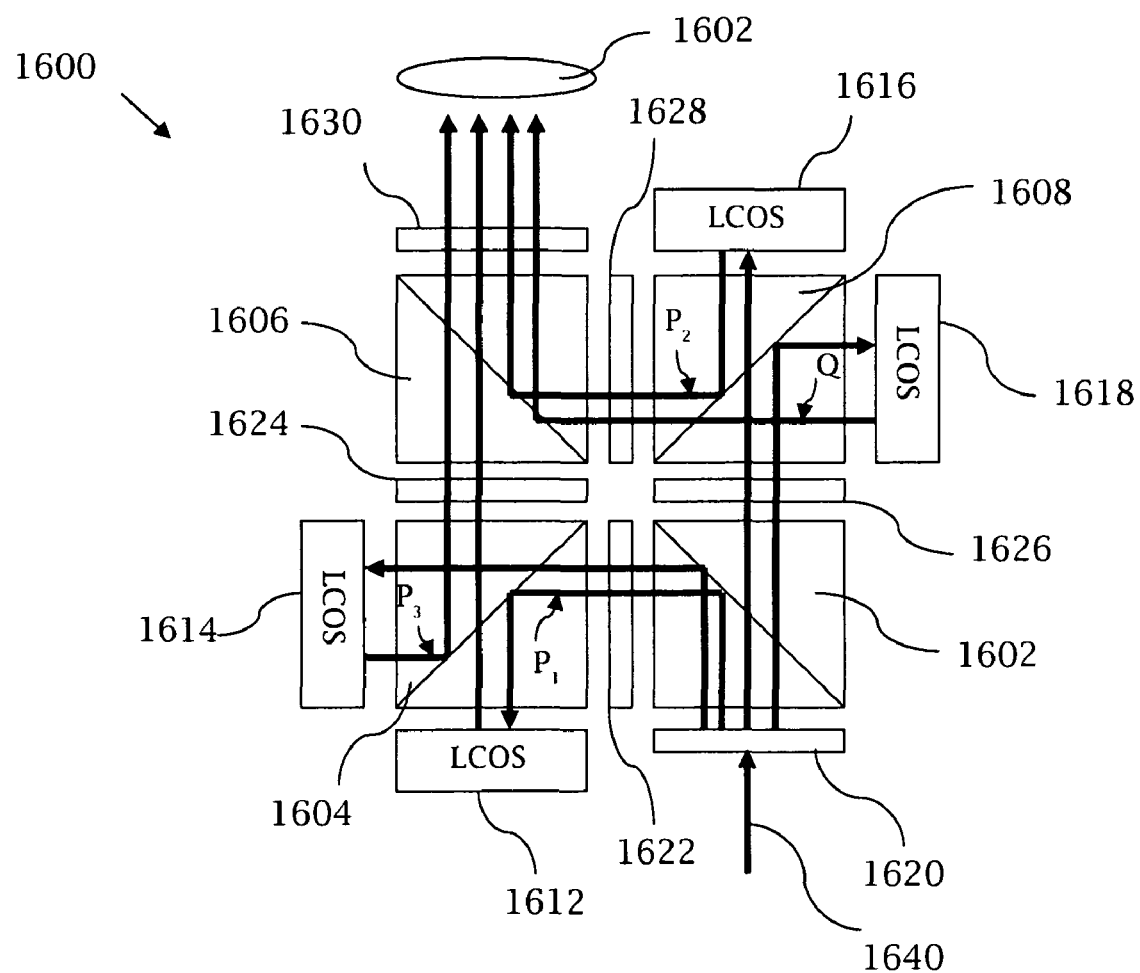
FIG. 16 depicts a four LCOS display panel assembly for projecting four primary color {P₁, P₂, P₃, Q} images.

FIG. 16 depicts an optical assembly 1600 which may be part of a display apparatus of the present invention comprises four liquid crystal on Silicon (LCOS) display panels and four polarization beam splitters (PBS). The configuration is similar to the QuadColor™ architecture from Colorlink. There are many variations of this general architecture which will be obvious to those skilled in the art. The optimal pairing of primary colors may depend on the choice of the wavelengths of the primary color $\{Q\}$. In FIG. 16, polarized light 1640 comprising the spectra of the primary colors $\{P_1, P_2, P_3, Q\}$ passes through a CSPF 1620. CSPF 1620 switches the polarization state of the spectra of two primary colors $\{P_2, Q\}$. The spectra of the primary colors $\{P_1, P_2, P_3, Q\}$ enters a first PBS 1602. PBS 1602 divides the primary colors into two light bundles. The spectra of primary colors $\{P_2, Q\}$ pass through the first PBS 1602 and pass through a second CSPF 1626. CSPF 1626 switches the polarization state of the spectra of the primary color $\{Q\}$. The spectra of primary colors $\{P_2, Q\}$ enters a second PBS 1608 which separates the primary colors into a first and second light bundles comprising primary colors $\{P_2, Q\}$ respectively. The spectra of primary color $\{Q\}$ passes through the PBS 1608 and may be incident on a first LCOS panel 1616 and may be reflected back toward PBS 1608. The first panel 1616 imparts a primary image to the spectra of primary color $\{Q\}$. The spectra of primary color $\{P_2\}$ may be reflected by PBS 1608 and may be incident on a second LCOS panel 1618 and may be reflected back toward PBS 1608. The second panel 1618 imparts a primary image to the spectra of primary color $\{P_2\}$. The second PBS 1608 combines the light bundles of the primary colors $\{P_2, Q\}$ and directs them out of PBS 1608.

The spectra of primary colors $\{P_1, P_3\}$ may be reflected by the first PBS 1602 and pass through a third CSPF 1622. CSPF 1622 switches the polarization state of the spectra of the primary color $\{P_3\}$. The spectra of primary colors $\{P_1, P_3\}$ enters a third PBS 1604 which separates the primary colors into a third and fourth light bundles comprising primary colors $\{P_1, P_3\}$ respectively. The spectra of primary color $\{P_3\}$ passes through the PBS 1604 and may be incident on a third LCOS panel 1614 and may be reflected back toward PBS 1604. The third panel 1614 imparts a primary image to the spectra of primary color $\{P_3\}$. The spectra of primary color $\{P_1\}$ may be reflected by PBS 1604 and may be incident on a fourth LCOS panel 1612 and may be reflected back toward PBS 1604. The second panel 1612 imparts a primary image to the spectra of primary color $\{P_1\}$. The third PBS 1604 combines the light bundles of the primary colors $\{P_1, P_3\}$ and directs them out of PBS 1604.

The spectra of primary colors $\{P_2, Q\}$ passes through a fourth CSPF 1628. The CSPF 1628 switches the polarization state of the spectra of primary color $\{Q\}$. The spectra of primary colors $\{P_2, Q\}$ may be reflected by a fourth PBS 1606. The spectra of primary colors $\{P_1, P_3\}$ passes through a fifth CSPF 1624. The CSPF 1624 switches the polarization state of the spectra of primary color $\{P_3\}$. The spectra of primary colors $\{P_1, P_3\}$ pass through a fourth PBS 1606. PBS 1606 combines the spectra of the primary colors $\{P_2, Q\}$ and the spectra of the primary colors $\{P_1, P_3\}$. The spectra of primary colors $\{P_1, P_2, P_3, Q\}$ pass through a projection lens 1602. The spectra of the primary colors $\{P_1, P_2, P_3, Q\}$ may pass through a fifth CSPF 1630. CSPF 1630 may switch the polarization state of the primary colors $\{P_1, P_2\}$ or $\{P_2, Q\}$ to obtain one polarization state $p_1$ for all primary colors $\{P_1, P_2, P_3, Q\}$. Or CSPF 1630 may switch the polarization state of the primary color $\{P_2\}$ to obtain a first polarization state $p_1$ for all primary colors $\{P_1, P_2, P_3\}$ and a second polarization state $p_2$ for primary color $\{Q\}$. The present embodiment may include additional optical components that condition the spectra of the primary colors and the paths of the primary colors.

Another embodiment of the present invention provides a method of displaying stereoscopic images comprising four primary colors $\{P_1, P_2, P_3, Q\}$ and three display panels. A bundle of generally white light $\{L_W\}$ may be separated into four light bundles $\{L_1, L_2, L_3, L_4\}$ comprising the spectra of primary colors $\{P_1, P_2, P_3, Q\}$ respectively using optical components such as dichroic filters, PBS, and color wheels; or four bundles of light $\{L_1, L_2, L_3, L_4\}$ may be formed using multiple light sources such as LED lamps. A color wheel may generally be used to create time sequential bundles of light. The light bundles $\{L_1, L_2, L_3\}$ may be incident on a display panels $\{DP_1, DP_2, DP_3\}$. The light bundle $\{L_4\}$ may be incident on a display panel $\{DP_j\}$. Display panels $\{DP_1, DP_2, DP_3\}$ may impart primary coordinates $\{P_1, P_2, P_3, Q\}$ to light bundles $\{L_1, L_3, L_3, L_4\}$. The light bundles $\{L_1, L_2, L_3, L_4\}$ may be combined using optical components such as dichroic filters and PBS's into a projectable light bundle $\{L_P\}$. Then the light bundle $\{L_P\}$ may be projected through a projection lens. The display panel $\{DP_1\}$ may impart the primary color coordinates $\{P_1\}$ to the light bundle $\{L_1\}$. The display panel $\{DP_2\}$ may impart the primary color coordinates $\{P_2\}$ to the light bundle $\{L_2\}$. The display panel $\{DP_3\}$ may impart the primary color coordinates $\{P_3\}$ to the light bundle $\{L_3\}$. At least one display panel $\{DP_j\}$ from the set of display panels $\{DP_1, DP_2, DP_3\}$ may impart primary color coordinates $\{Q\}$ to the light bundle $\{L_4\}$. The light bundles $\{L_j, L_4\}$ may be time sequentially incident on the display panel $\{DP_j\}$. The display panel $\{DP_j\}$ may time sequentially impart the coordinates $\{P_j\}$ to the light bundle $\{L_j\}$ and impart the coordinates $\{Q\}$ to the light bundle $\{L_4\}$. $P_1$ may be a red primary color. $P_2$ may be a green primary color. $P_3$ may be a blue primary color. Q may be a red, yellow, green, cyan, blue, or desaturated primary color comprising components $\{Q_1, \ldots, Q_n\}$. A set of polarization filters, polarization rotators, or CSPF may be used to set the polarization state $p_2$ of the primary color $\{Q\}$ orthogonal to the polarization state $p_1$ of the primary colors $\{P_1, P_2, P_3\}$. If the polarization states of primary colors $\{P_1, P_2, P_3\}$ are orthogonal to the polarization state of primary color $\{Q\}$, the spectra of the primary color $\{Q\}$ may overlap the spectra of the primary colors $\{P_1, P_2, P_3\}$. Then the primary color $\{Q\}$ may preferably be red, orange, yellow, cyan or white. Color filters such as dichroic filters, CSPF's and dye filters may be used to control the spectra of the primary colors so that the spectra of the primary colors $\{P_1, P_2, P_3\}$ may substantially not overlap the spectra of the primary color $\{Q\}$. Then the primary color $\{Q\}$ may preferably be far-red, yellow, cyan, or white.

In another embodiment of the present invention, the primary color $\{Q\}$ may comprise more than one spectral component $\{Q_1, Q_2\}$, then the light bundle $\{L_4\}$ may comprise two light bundles $\{L_{q1}, L_{q2}\}$. The light bundles $\{L_{q1}, L_{q2}\}$ may be time sequentially incident on two display panels $\{DP_j, DP_k\}$ with light bundles $\{L_j, L_k\}$ respectively. The display panels $\{DP_j, PD_k\}$ may time sequentially impart the coordinates $\{Q_1, Q_2\}$ to the light bundles $\{L_{q1}, L_{q2}\}$.

Another embodiment of the present invention comprises a dichroic X-cube and three display panels $\{DP_1, DP_2, DP_3\}$. The dichroic X-cube may accept light bundles on three sides and reflect them using an 'X' configuration of dichroic prisms as a combined light bundle $\{L_P\}$ through a fourth side. The display panels may be LCOS, LCD, or digital micro mirror displays DMD. Light bundles $\{L_1, L_2, L_3\}$ comprising the spectra of primary colors $\{P_1, P_2, P_3\}$ may be incident of the display panels $\{DP_1, DP_2, PD_3\}$ respectively. Light bundle $\{L_{q1}\}$ comprising the spectra of a component $\{Q_1\}$ of primary color $\{Q\}$ may be incident on display panel $\{DP_j\}$. The light bundles $\{L_j, L_{q1}\}$ may be combined time-sequentially by a dichroic mirror or dichroic prism. Light bundle $\{L_{q2}\}$ comprising the spectra of a component $\{Q_2\}$ of primary color $\{Q\}$ may be incident on display panel $\{DP_k\}$. The light bundles $\{L_k, L_{q2}\}$ may be combined time-sequentially by a dichroic mirror or dichroic prism. The display panel $\{DP_1\}$ may impart coordinates $\{P_1\}$ of the first image to the light bundle $\{L_1\}$. The display panel $\{DP_2\}$ may impart coordinates $\{P_2\}$ of the first image to the light bundle $\{L_2\}$. The display panel $\{DP_3\}$ may impart coordinates $\{P_3\}$ of the first image to the light bundle $\{L_3\}$. The display panel $\{DP_j\}$ may time sequentially impart coordinates $\{Q\}$ of the second image to the light bundle $\{L_j\}$ time and impart coordinates $\{P_j\}$ of the first image to the light bundle $\{L_j\}$. The display panel $\{DP_k\}$ may time sequentially impart coordinates $\{Q\}$ of the second image to the light bundle $\{L_{q2}\}$ and impart coordinates $\{P_k\}$ of the first image to the light bundle $\{L_k\}$.

Figure 17:
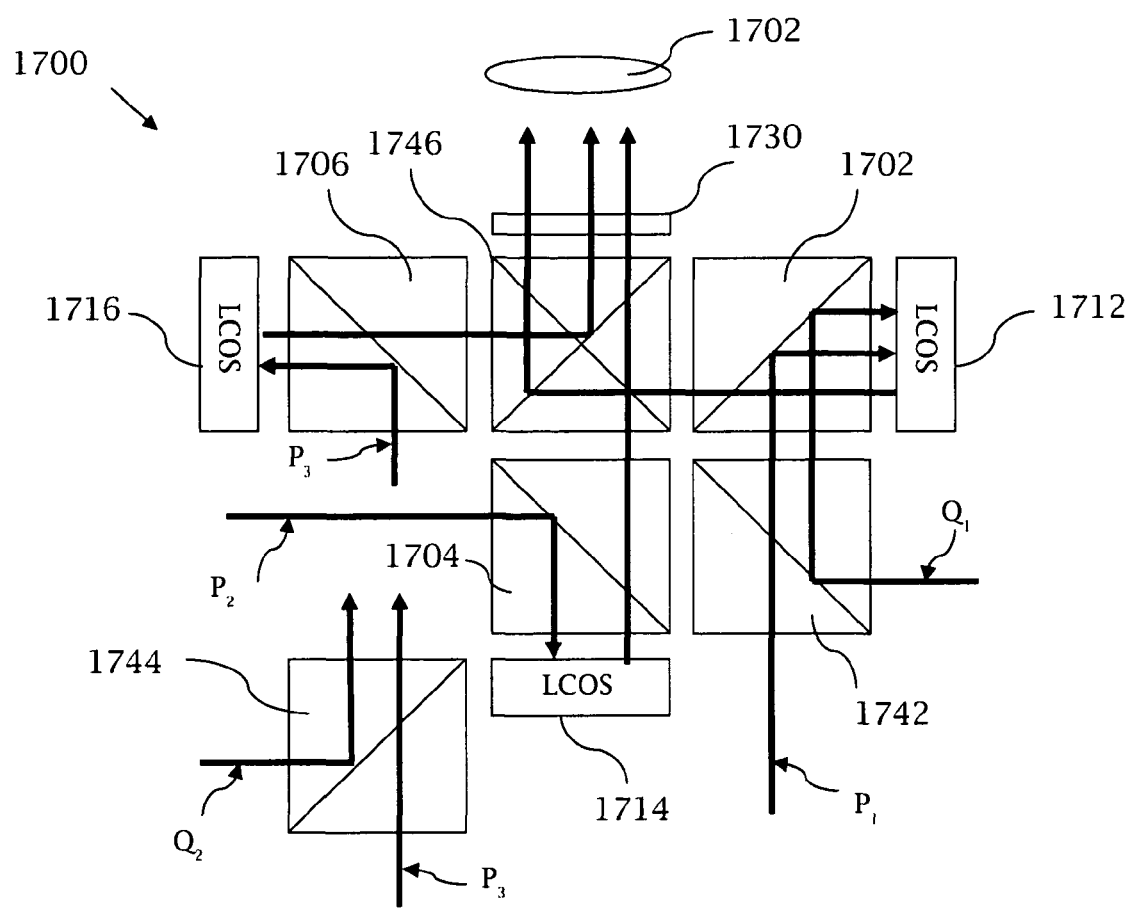
FIG. 17 depicts three LCOS display panel assembly for projecting four primary color {P₁, P₂, P₃, Q} images.

FIG. 17 depicts an optical assembly 1700 which may be part of a display apparatus of the present invention comprising three LCOS display panels, three PBS's, a dichroic X-cube, and a dichroic beamsplitter. There are many variations of this general architecture which will be obvious to those skilled in the art. In FIG. 17, light bundles $\{L_1, L_2, L_3, L_{q1}\}$ comprising the spectra of four primary colors $\{P_1, P_2, P_3, Q_1\}$ enter the assembly at four locations. The spectra of the primary color $\{P_1\}$ enters a first dichroic prism 1742 and may be reflected toward a first PBS 1702. The first PBS 1702 reflects a polarized spectra of primary color $\{P_1\}$ toward a first LCOS display panel 1712. The first display panel 1712 imparts primary coordinates $\{P_1\}$ to the spectra of primary color $\{P_1\}$ and reflects the spectra of primary color $\{P_1\}$ back into the first PBS 1702. The spectra of primary color $\{P_1\}$ passes through the first PBS 1702 and enters a dichroic X-cube 1746. The spectra of primary color $\{P_1\}$ may be reflected by dichroic X-cube 1746 toward the projection lens 1702. The spectra of the primary color $\{Q_1\}$ enters the first dichroic prism 1742 and may be reflected toward the first PBS

1702. The first PBS 1702 reflects a polarized spectra of primary color $\{Q_1\}$ toward the the first LCOS display panel 1712. The first display panel 1712 imparts primary coordinates $\{Q\}$ to the spectra of primary color $\{Q_1\}$ and reflects the spectra of primary color $\{Q_1\}$ back into the first PBS 1702. The spectra of primary color $\{Q_1\}$ passes through the first PBS 1702 and enters the dichroic X-cube 1746. The spectra of primary color $\{Q_1\}$ may be reflected by dichroic X-cube 1746 toward the projection lens 1702. The spectra of the primary color $\{P_2\}$ enters a second PBS 1704. The second PBS 1704 reflects a polarized spectra of primary color $\{P_2\}$ toward a second LCOS display panel 1714. The second display panel 1714 imparts primary coordinates $\{P_2\}$ to the spectra of primary color $\{P_2\}$ and reflects the spectra of primary color $\{P_2\}$ back into the second PBS 1704. The spectra of primary color $\{P_2\}$ passes through the second PBS 1704 and enters the dichroic X-cube 1746. The spectra of primary color $\{P_2\}$ passes through dichroic X-cube 1746 toward the projection lens 1702. The spectra of the primary color $\{P_3\}$ enters a third PBS 1706. The third PBS 1706 reflects a polarized spectra of primary color $\{P_3\}$ toward a third LCOS display panel 1716. The third display panel 1716 imparts primary coordinates $\{P_3\}$ to the spectra of primary color $\{P_3\}$ and reflects the spectra of primary color $\{P_3\}$ back into the third PBS 1706. The spectra of primary color $\{P_3\}$ passes through the third PBS 1706 and enters the dichroic X-cube 1746. The spectra of primary color $\{P_3\}$ may be reflected by dichroic X-cube 1746 toward the projection lens 1702. The projection lens projects the spectra of the primary colors $\{P_1, P_2, P_3, Q_1\}$. The source of the light bundles comprising the spectra often primary colors $\{P_1, P_2, P_3, Q_1\}$ may be a single lamp for which the spectra of the primary colors may be separated by additional optical components such as dichroic filters, PBS and color wheels. Or the source may comprise multiple lamps such as red, green, and blue LED's and a $Q_1$ LED. The light comprising spectra of the primary color $\{P_1\}$ and light comprising the primary color $\{Q_1\}$ enter dichroic prism 1742 time sequentially. The first display panel 1712 imparts the coordinates $\{P_1,Q_1\}$ to the spectra of primary colors $\{P_1,Q_1\}$ time sequentially. Optionally, a CSPF 1730 may set the polarization state $p_2$ of the primary color $\{Q_1\}$ orthogonal to the polarization state $p_1$ of the primary colors $\{P_1, P_2, P_3\}$. The present embodiment may include additional optical components that condition the primary color spectra and paths. In another embodiment, the third display panel may time sequentially impart the coordinates $\{Q\}$ to a spectra of a primary color $\{Q_2\}$. The spectra of primary colors $\{P_3\}$ and $\{Q_2\}$ may enter a second dichroic prism 1744. The spectra of the primary color $\{Q_2\}$ may be reflected by the second dichroic prism 1744 toward the third PBS 1706. The spectra of the primary color $\{P_3\}$ may pass through the second dichroic prism 1744 toward the third PBS 1706. The spectra of primary colors $\{Q_1,Q_2\}$ may form a single desaturated primary color $\{Q\}$.

Another embodiment of the present invention provides a method of displaying stereoscopic images comprising four primary colors $\{P_1, P_2, P_3, Q\}$ and two display panels. A bundle of generally white light $\{L_W\}$ may be separated into four light bundles $\{L_1, L_2, L_3, L_4\}$ comprising the spectra of primary colors $\{P_1, P_2, P_3, Q\}$ respectively using optical components such as dichroic filters, PBS, and color wheels; or four bundles of light $\{L_1, L_2, L_3, L_4\}$ may be formed using multiple light sources such as LED lamps. A color wheel may generally be used to create time sequential bundles of light. The light bundles $\{L_1,L_4\}$ may be time sequentially incident on a display panels $\{DP_1\}$. The light bundles $\{L_2,L_3\}$ may be time sequentially incident on a display panels $\{DP_2\}$. Display panels $\{DP_1,DP_2\}$ may impart primary coordinates $\{P_1, P_2, P_3, Q\}$ to light bundles $\{L_1, L_3, L_3, L_4\}$. The light bundles $\{L_1, L_2, L_3, L_4\}$ may be combined using optical components such as dichroic filters and PBS's into a projectable light bundle $\{L_P\}$. Then the light bundle $\{L_P\}$ may be projected through a projection lens. The display panel $\{DP_1\}$ may impart the primary color coordinates $\{P_1\}$ to the light bundle $\{L_1\}$ time sequentially. The display panel $\{DP_1\}$ may impart the primary color coordinates $\{Q\}$ to the light bundle $\{L_4\}$ time sequentially. The display panel $\{DP_2\}$ may impart the primary color coordinates $\{P_2\}$ to the light bundle $\{L_2\}$ time sequentially. The display panel $\{DP_2\}$ may impart the primary color coordinates $\{P_3\}$ to the light bundle $\{L_3\}$ time sequentially. $P_1$ may be a red primary color. $P_2$ may be a green primary color. $P_3$ may be a blue primary color. Q may be a red, yellow, green, cyan, blue, or desaturated primary color comprising components $\{Q_1, \ldots Q_n\}$. A set of polarization filters, polarization rotators, or CSPF may be used to set the polarization state $p_2$ of the primary color $\{Q\}$ orthogonal to the polarization state $p_1$ of the primary colors $\{P_1, P_2, P_3\}$. If the polarization states of primary colors $\{P_1, P_2, P_3\}$ are orthogonal to the polarization state of primary color $\{Q\}$, the spectra of the primary color $\{Q\}$ may overlap the spectra of the primary colors $\{P_1, P_2, P_3\}$. Then the primary color $\{Q\}$ may preferably be red, orange, yellow, cyan or white. Color filters such as dichroic filters, CSPF's and dye filters may be used to control the spectra of the primary colors so that the spectra of the primary colors $\{P_1, P_2, P_3\}$ may substantially not overlap the spectra of the primary color $\{Q\}$. Then the primary color $\{Q\}$ may preferably be far-red, yellow, cyan, or white.

Another embodiment of the present invention provides a method of displaying stereoscopic images comprising four primary colors $\{P_1, P_2, P_3, Q\}$ and a display panel. A bundle of generally white light $\{L_W\}$ may be separated into four light bundles $\{L_1, L_2, L_3, L_4\}$ comprising the spectra of primary colors $\{P_1, P_2, P_3, Q\}$ respectively using optical components such as dichroic filters, PBS, and color wheels; or four bundles of light $\{L_1, L_2, L_3, L_4\}$ may be formed using multiple light sources such as LED lamps. A color wheel may generally be used to create time sequential bundles of light. The light bundles $\{L_1, L_2, L_3, L_4\}$ may be time sequentially incident on a display panels $\{DP_1\}$. Display panel $\{DP_1\}$ may impart primary coordinates $\{P_1, P_2, P_3, Q\}$ to light bundles $\{L_1, L_3, L_3, L_4\}$. The light bundles $\{L_1, L_2, L_3, L_4\}$ may be combined using optical components such as dichroic filters and PBS's into a projectable light bundle $\{L_P\}$. Then the light bundle $\{L_P\}$ may be projected through a projection lens. The display panel $\{DP_1\}$ may impart the primary color coordinates $\{P_1\}$ to the light bundle $\{L_1\}$ time sequentially. The display panel $\{DP_1\}$ may impart the primary color coordinates $\{P_2\}$ to the light bundle $\{L_2\}$ time sequentially. The display panel $\{DP_1\}$ may impart the primary color coordinates $\{P_3\}$ to the light bundle $\{L_3\}$ time sequentially. The display panel $\{DP_1\}$ may impart the primary color coordinates $\{Q\}$ to the light bundle $\{L_4\}$ time sequentially. $P_1$ may be a red primary color. $P_2$ may be a green primary color. $P_3$ may be a blue primary color. Q may be a red, yellow, green, cyan, blue, or desaturated primary color comprising components $\{Q_1, \ldots Q_n\}$. A set of polarization filters, polarization rotators, or CSPF may be used to set the polarization state $p_2$ of the primary color $\{Q\}$ orthogonal to the polarization state $p_1$ of the primary colors $\{P_1, P_2, P_3\}$. If the polarization states of primary colors $\{P_1, P_2, P_3\}$ are orthogonal to the polarization state of primary color $\{Q\}$, the spectra of the primary color $\{Q\}$ may overlap the spectra of the primary colors $\{P_1, P_2, P_3\}$. Then the primary color $\{Q\}$ may preferably be red, orange, yellow, cyan or white. Color filters such as dichroic filters, CSPF's and dye filters may be used to control the spectra of the primary colors so that the spectra of the primary colors $\{P_1, P_2, P_3\}$ may substantially not overlap the spectra of the primary color $\{Q\}$. Then the primary color $\{Q\}$ may preferably be far-red, yellow, cyan, or white. The display panel may be a LCD, digital micro mirror device DMD, or LCOS display panel or other display panel.

Figure 18A:
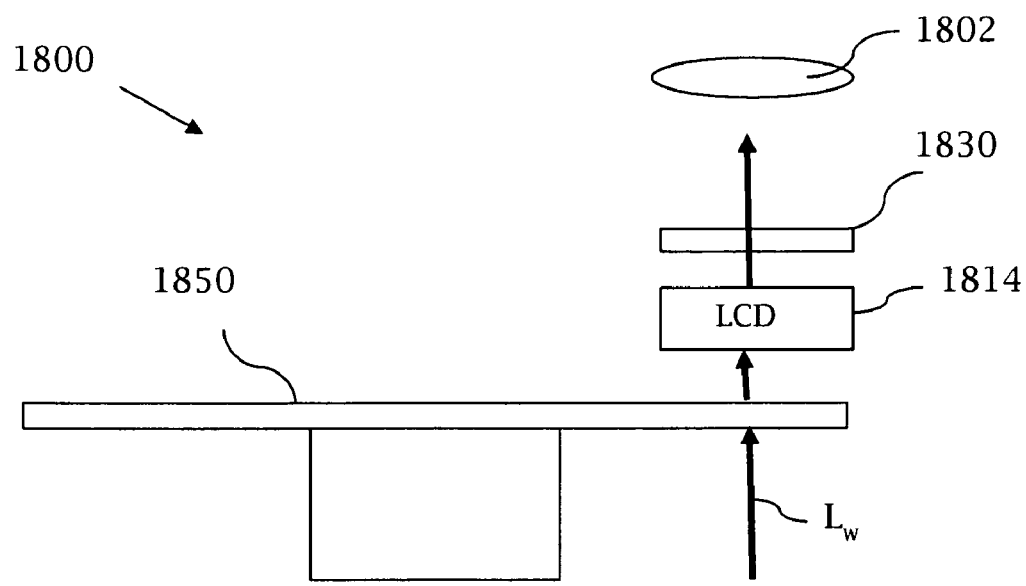
FIG. 18a depicts a LCD display panel assembly for projecting four primary color {P₁, P₂, P₃, Q} images.
Figure 18B:
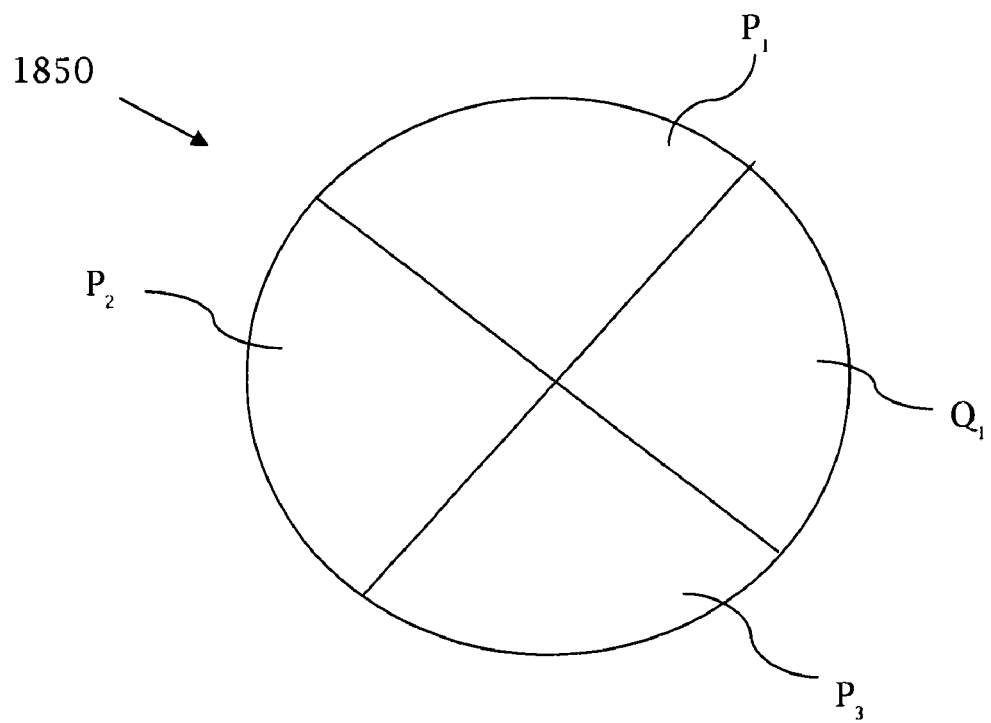
FIG. 18b depicts a color wheel with a pattern of color filters.

FIG. 18a depicts an optical assembly 1800 which may be part of a display apparatus of the present invention comprising a LCD display panel 1814, a light source not shown, a color wheel 1850, and a projection lens 1802. The light source may provide a generally white light $L_W$ comprising the spectra of the primary colors $\{P_1, P_2, P_3, Q\}$. The light $L_W$ passes through the color wheel 1850 and may be incident on the display panel 1814. The color wheel 1850 alternately passes the primary colors $\{P_1, P_2, P_3, Q\}$ in synchronization with the display panel 1814 imparting primary coordinates $\{P_1, P_2, P_3, Q\}$ to the primary colors $\{P_1, P_2, P_3, Q\}$. The primary colors $\{P_1, P_2, P_3, Q\}$ may be projected time sequentially through the projection lens. Optionally, a CSPF 1830 may set the polarization state $p_2$ of the primary color Q orthogonal to the polarization state $p_1$ of the primary colors $\{P_1, P_2, P_3\}$. The present embodiment may include additional optical components that condition the primary color spectra and paths. FIG. 18b depicts the color wheel 1850. The color wheel alternately positions filters which pass primary colors $\{P_1, P_2, P_3, Q_1\}$ it the path of a light $L_W$.

Figure 19:
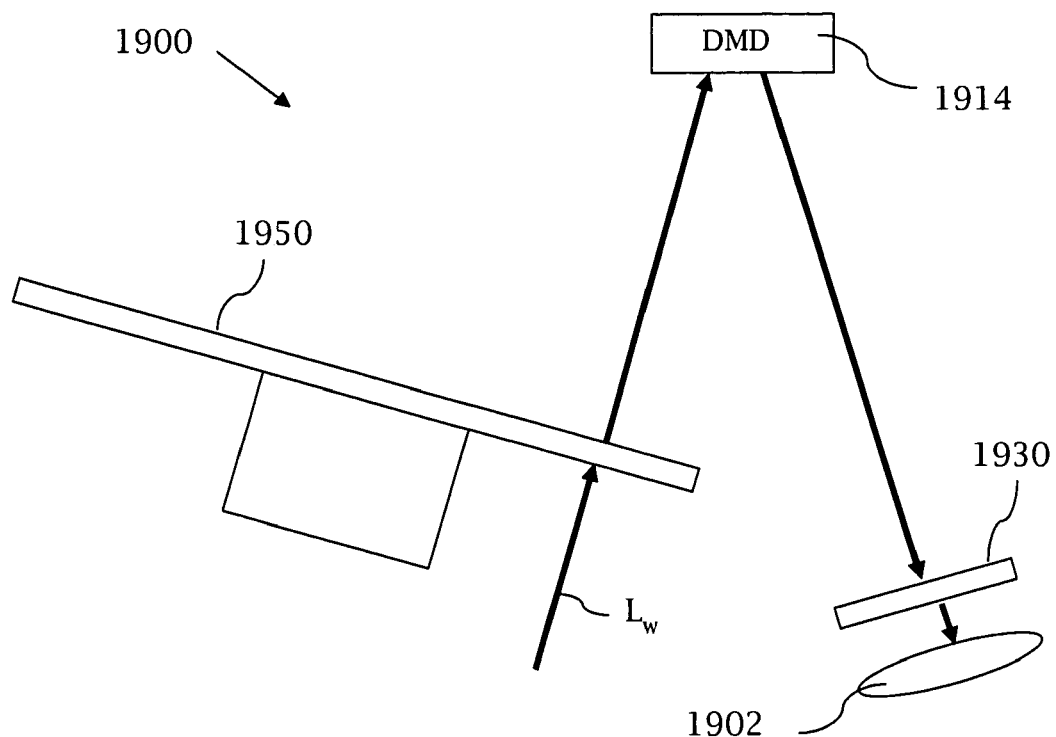
FIG. 19 depicts a DMD display panel assembly for projecting four primary color {P₁, P₂, P₃, Q} images.

FIG. 19 depicts an optical assembly 1900 which may be part of a display apparatus of the present invention comprising a DMD display panel 1914. In this embodiment, light may be reflected by the display panel 1814 through the projection lens 1930. The light incident on the display panel 1814 comprises time sequential spectra of the primary colors $\{P_1, P_2, P_3, Q\}$. The primary colors may be alternated time sequentially using a color wheel 1950. Optionally, polarization filter and a CSPF 1930 may set the polarization state $p_2$ of the primary color Q orthogonal to the polarization state $p_1$ of the primary colors $\{P_1, P_2, P_3\}$. The present embodiment may include additional optical components that condition the primary color spectra and paths.

Figure 20:
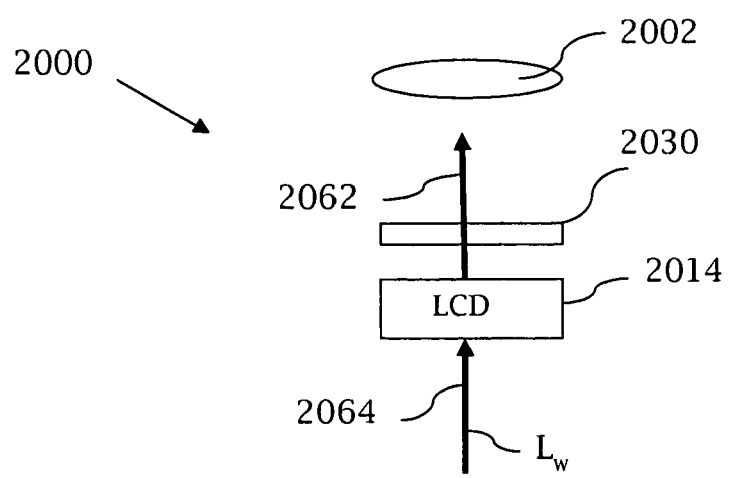
FIG. 20 depicts a LCD display panel assembly for projecting four primary color {P₁, P₂, P₃, Q} images.
Figure 21:
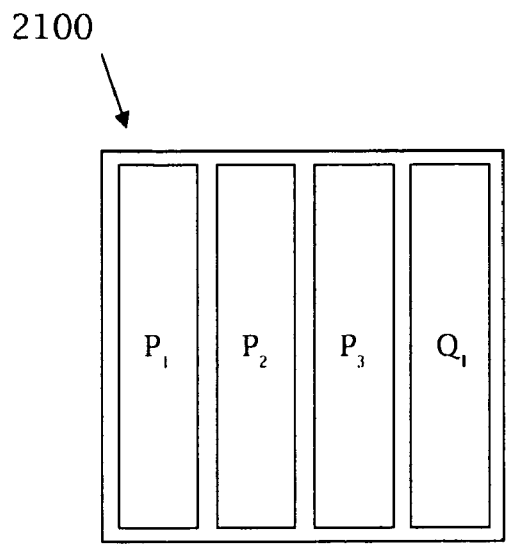
FIG. 21 depicts a pixel pattern providing four primary colors {P₁, P₂, P₃, Q}.
Figure 22:
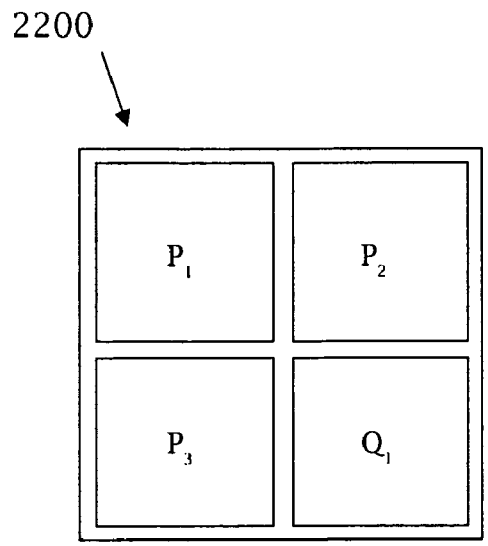
FIG. 22 depicts a pixel pattern providing four primary colors {P₁, P₂, P₃, Q}.

FIG. 20 depicts an optical assembly which may be part of a display apparatus of the present invention comprising a light source and a multicolor panel display such as a four-color LCD display panel 2014. The LCD display panel 2014 may form light bundles $\{L_1, L_2, L_3, L_4\}$ comprising the spectra of the primary colors $\{P_1, P_2, P_3, Q\}$ respectively in a spatially multiplexed pixel pattern as shown in FIGS. 21 and 22. A spatially patterned color filter may pass the primary colors $\{P_1, P_2, P_3, Q\}$ through specific regions of the LCD display panel 2014 creating the pixel pattern of light bundles $\{L_1, L_2, L_3, L_4\}$. The display panel 2014 may modulate the light bundles $\{L_1, L_2, L_3, L_4\}$ imparting the primary color coordinates $\{P_1, P_2, P_3, Q\}$ to the light bundles $\{L_1, L_2, L_3, L_4\}$ respectively. Herein light bundles $\{L_x\}$ comprising the spectra of primary color $X_j$ is sometimes called the primary color $\{X_j\}$. The primary coordinates $\{X_j\}$ may refer to the numerical values representing the level of primary color $\{X_j\}$. Generally white light $L_W$ 2064 comprising the spectra of the primary colors $\{P_1, P_2, P_3, Q\}$ may be incident on the display panel 2014. Spatially multiplexed primary colors 2062 modulated by the display panel 2014 form a projectable bundle of light $L_P$ 2062. The light $L_P$ 2062 may be projected by the projection lens 2002. Optionally, a CSPF 2030 may set the polarization state $p_2$ of the primary color Q orthogonal to the polarization state $p_1$ of the primary colors $\{P_1, P_2, P_3\}$. The present embodiment may include additional optical components that condition the primary color spectra and paths.

Four-Color Flat Panel Displays

Direct view display devices may comprise display panels with spatially multiplexed primary colors where the primary colors are separated into regions of a surface called pixels. The surface is populated with a two-dimensional array of pixels whose primary color elements may be modulated to display a color image. Traditional display panels provide three primary colors red, green and blue. Some display panels provide red, green. blue, and white primary colors where the white primary color generally may comprise the spectra of the red, green and blue primary colors. Herein direct view displays are sometimes called flat panel displays although some direct view displays may be CRT's and rear projection displays. Direct view displays may include liquid crystal displays LCD, plasma display panels PDP, organic electroluminescent display ELD, light emitting diode LED displays, field emission display FED, and light emitting polymer LEP displays. LCD display panels generally provide polarized primary colors with identical polarization states. PDP and LED display panels generally provide non-polarized primary colors.

One embodiment of the present invention comprises a flat panel display providing an array of pixels with four sub-pixel elements $\{x_1, x_2, x_3, x_4\}$ having either rectangular areas or square areas. The elements $\{x_1, x_2, x_3, x_4\}$ may provide primary colors $\{P_1, P_2, P_3, Q_1\}$ capable of displaying images represented in primary color coordinates $\{P_1, P_2, P_3, Q_1\}$ where the spectra of the primary color $\{Q_1\}$ may substantially not overlap the spectra of the primary colors $\{P_1, P_2, P_3\}$. The primary colors $\{P_1, P_2, P_3\}$ may be use to display a first image. The primary colors $\{Q_1\}$ may be used to display a second image. An LCD display panel of the present invention may comprise a patterned color filter which determine the spectra of the primary colors $\{P_1, P_2, P_3, Q_1\}$. A PDP display panel of the present invention may comprise a set of phosphors $\{s1, s2, s3, s4\}$ which determine the spectra of the primary colors $\{P_1, P_2, P_3, Q_1\}$. A LED display panel of the present invention may comprise four types of LED's emitting four color spectra. The primary color $P_1$ may be red. The primary color $P_2$ may be green. The primary color $P_3$ may be green. The primary color $Q_1$ may comprise spectral components: far-red (greater than about 640 nm), orange (about 590 nm-615 nm), yellow (about 570-590 nm), cyan (about 480-500 nm), or blue (about 460-480 nm) components. The primary color $\{Q_1\}$ may comprise one or more spectral components.

FIG. 21 depicts a first pixel pattern 2100 providing four primary colors $\{P_1, P_2, P_3, Q_1\}$ in four rectangular areas which fit inside a square pixel. FIG. 22 depicts a second pixel pattern 2200 providing four primary colors $\{P_1, P_2, P_3, Q_1\}$ in four square areas which fit inside a square pixel. These pixel patterns may be manufactured by well known to those skilled in the art.

One embodiment of the present invention comprises a flat panel display providing an array of pixels with four sub-pixel elements $\{x_1, x_2, x_3, x_4\}$ having either rectangular areas or square areas. The elements $\{x_1, x_2, x_3, x_4\}$ may provide primary colors $\{P_1, P_2, P_3, Q_1\}$ capable of displaying images represented in primary color coordinates $\{P_1, P_2, P_3, Q_1\}$ where the polarization state $p_2$ of the primary color $\{Q_1\}$ may be orthogonal to the polarization state of the primary colors $\{P_1, P_2, P_3\})$. The spectra of the primary color $\{Q_1\}$ may overlap the spectra of the primary colors $\{P_1, P_2, P_3\}$. The primary colors $\{P_1, P_2, P_3\}$ may be used to display a first image. The primary colors $\{Q_1\}$ may be used to display a second image. An LCD, PDP, or LED display panel of the present invention may comprise a patterned polarization rotator layer which switches the polarization state of the primary color $\{Q_1\}$ to state $p_2$. An LCD, PDP, or LED display panel of the present invention may comprise a CSPF layer which switches the polarization state of the primary color $\{Q_1\}$ to $p_2$. An LCD, PDP or LED display panel of the present invention may comprise a polarized filter to polarize the primary colors $\{P_1, P_2, P_3, Q_1\}$.

Figure 24:
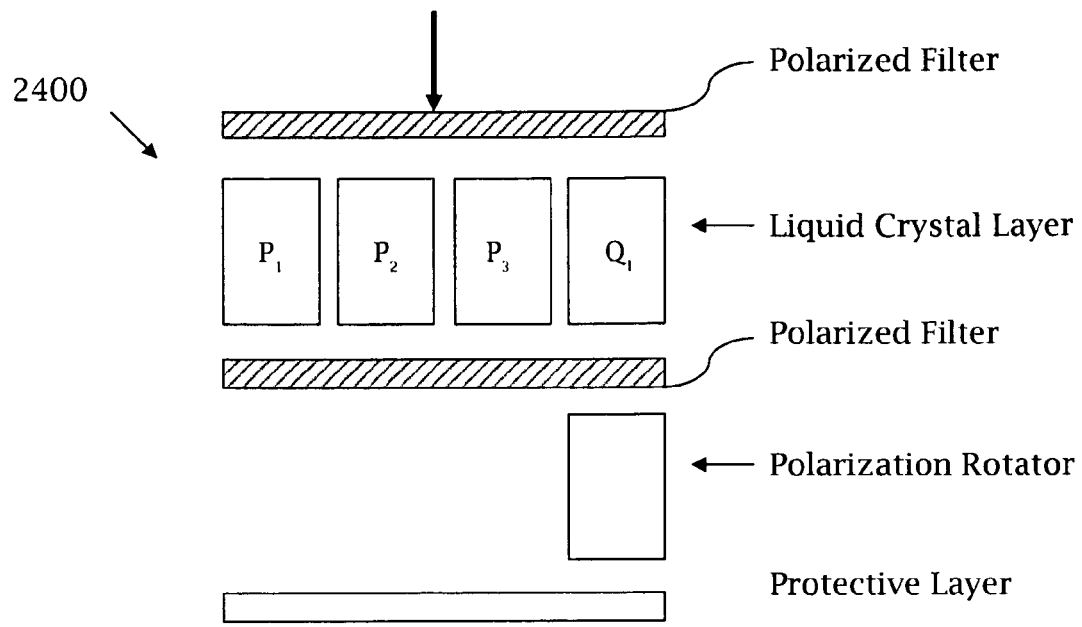
FIG. 24 depicts a LCD display panel with a patterned polarization rotator layer.

FIG. 24 depicts a LCD display panel of the present invention. The display comprises subpixels elements $\{x_1, x_2, x_3, x_4\}$. The spectra of the primary colors $\{P_1, P_2, P_3, Q_1\}$ may be determined by a patterned color filter not shown. Generally white light $L_W$ comprising the spectra of the primary colors $\{P_1, P_2, P_3, Q_1\}$ enters from the back side of the display panel and travels through a first polarized filter. The polarized light travels through a liquid crystal layer may comprise liquid crystal cells that may rotate the polarized light by selectable amounts. The polarization rotated light is filtered by a second polarization filter which modulates the intensity of transmitted light with polarization state $p_1$. The patterned color filter transmits the spectra of the primary colors. A patterned polarization rotator may switch the polarization state of the light transmitted through the element $x_4$ to the state $p_2$ whereby the polarization state $p_1$ of the primary colors $\{P_1, P_2, P_3\}$ may be orthogonal to the polarization state $p_2$ of the primary color $\{Q_1\}$. The polarization rotator may comprise birefringent material forming a ½ wave plate.

Figure 25:
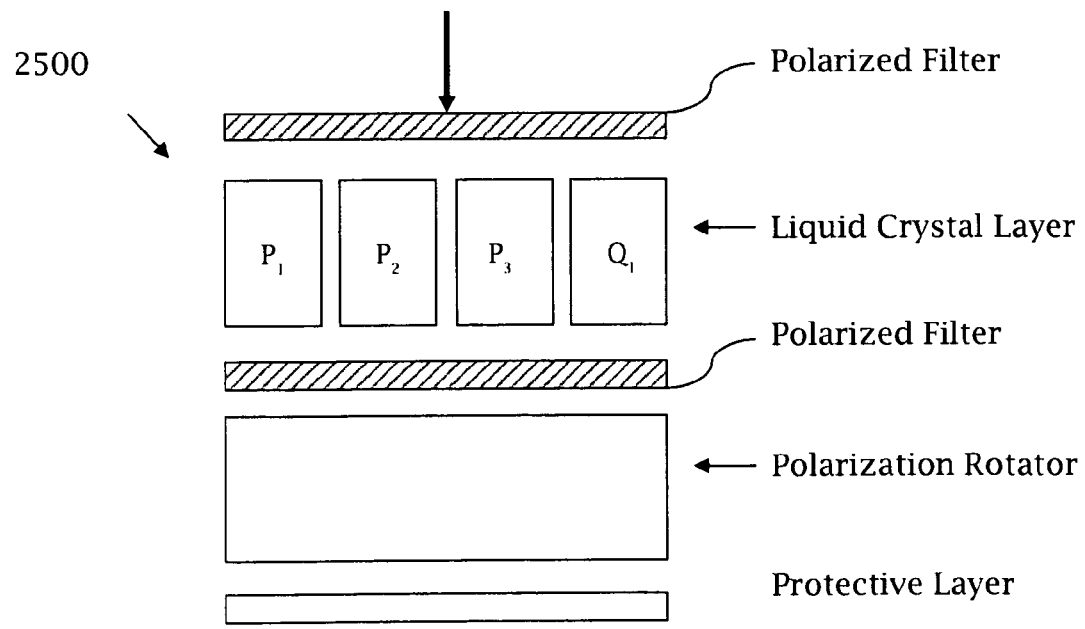
FIG. 25 depicts a LCD display panel with a CSPF polarization rotator layer.

FIG. 25 depicts a LCD display panel of the present invention. The display comprises subpixels elements $\{x_1, x_2, x_3, x_4\}$. The spectra of the primary colors $\{P_1, P_2, P_3, Q_1\}$ may be determined by a patterned color filter not shown. Generally white light $L_W$ comprising the spectra of the primary colors $\{P_1, P_2, P_3, Q_1\}$ enters from the back side of the display panel and travels through a first polarized filter. The polarized light travels through a liquid crystal layer may comprise liquid crystal cells that may rotate the polarized light by selectable amounts. The polarization rotated light is filtered by a second polarization filter which modulates the intensity of transmitted light with polarization state $p_1$. The patterned color filter transmits the spectra of the primary colors. A polarization rotator may switch the polarization state of the light transmitted through the element $x_4$ to the state $p_2$ whereby the polarization state $p_1$ of the primary colors $\{P_1, P_2, P_3\}$ may be orthogonal to the polarization state $p_2$ of the primary color $\{Q_1\}$. The polarization rotator may comprise a CSPF.

Another embodiment of the present invention comprises an LCD display panel containing multi-colored pixels and a time multiplexed light source. The display panel may comprise an array of pixels with three sub-pixel regions $\{x_1, x_2, x_3\}$ providing primary colors $\{P_1, P_2, P_3\}$ respectively while at least one region $\{x_i\}$ may provide primary color $\{Q_1\}$ where the spectra of the primary colors $\{P_1, P_2, P_3\}$ may substantially not overlap the spectra of the primary color $\{Q_1\}$. The display panel may have an alternating backlight which allows the region $\{x_i\}$ to provide primary colors $\{P_i\}$ and $\{Q_1\}$ time sequentially. The backlight may comprise a first light source providing the spectra of primary color $\{P_i\}$ and lacking the spectra of primary color $\{Q_1\}$; and a second light source providing the spectra of primary color $\{Q_1\}$ and lacking the spectra of primary color $\{P_i\}$. The backlight may be switched rapidly between the first and second light sources providing the primary colors $\{P_i\}$ and $\{Q_1\}$ time sequentially. During a first interval of time $t_1$ the first light source may provide the spectra of primary color $\{Pi\}$ and the region $\{x_i\}$ may be used to display the coordinate $\{P_i\}$ of a first image. During a second interval of time $t_2$ the second light source may provide the spectra of primary color $\{Q_1\}$ and the region $\{x_i\}$ may be used to display the coordinate $\{Q_1\}$ of a second image. The remaining coordinates of $\{P_1, P_2, P_3\}$ of the first image may be displayed using the remaining regions of $\{x_1, x_2, x_3\}$ using either the first, second or a third light source.

Figure 23:
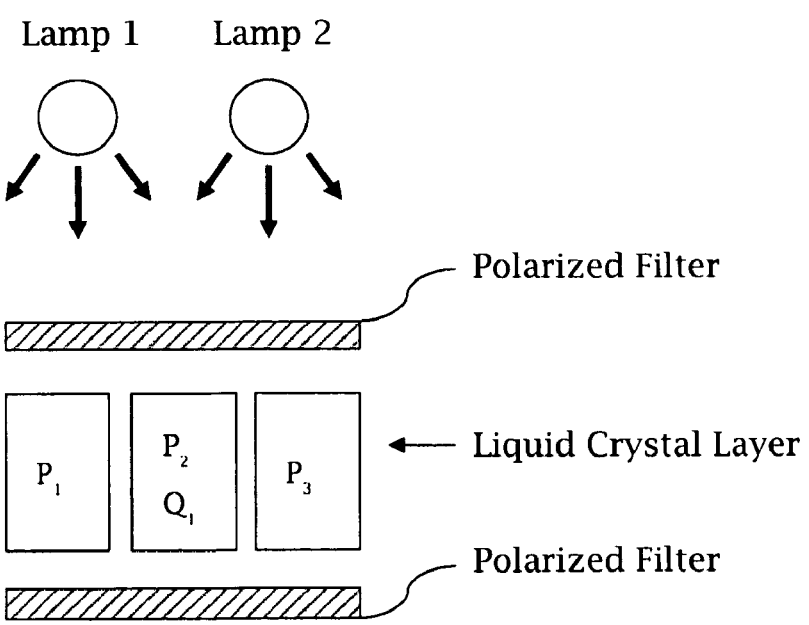
FIG. 23 depicts a LCD display panel with a time sequential backlight.

FIG. 23 depicts an LCD panel with two sources which may be LED light sources. The primary colors $\{P_1, P_2, P_3\}$ may be red, green, and blue respectively. The primary color $\{Q_1\}$ may be yellow.

Another embodiment of the present comprises an LCD display panel comprising an array of pixels with three sub-pixel regions $\{x_1, x_2, x_3\}$ and a backlight with two types of backlighting which may be provided with two light sources. A first type of backlighting may provide the spectra of primary colors $\{P_1, P_2, P_3\}$ for displaying non-stereoscopic images. A second type of backlighting may provide the spectra of primary colors $\{P_1, P_2, Q_1\}$ for displaying stereoscopic images. as three-color anaglyphs. The first type of backlighting may be provided by a first light source. The second type of backlighting may be provided by the second light source or the first and second light sources. The spectra of the primary color $\{Q_1\}$ may be preferable for displaying a second image of a stereoscopic pair of images while the spectra of the primary color $\{P_3\}$ may be preferable for displaying a full-color non-stereoscopic image. In one embodiment, the primary color $\{P_3\}$ may be a blue primary color and the primary color $\{Q_1\}$ may be a cyan primary color.

More Projectors

Another embodiment of the present invention utilizes two conventional projectors to display the stereoscopic images as anaglyphs. External filters may be used to modify the primary colors of the projectors so that a first projector provides primary colors $\{P_1, P_2, P_3\}$ and a second projector provides primary colors $\{Q_1\}$ where the spectra of the primary colors $\{P_1, P_2, P_3\}$ may substantially not overlap the spectra of the primary color $\{Q_1\}$. The first projector may display a first image in primary colors $\{P_1, P_2, P_3\}$. The second projector may display a second image in primary color $\{Q_1\}$. The first and second images may be transformed into primary color coordinates $\{P_1, P_2, P_3, Q_1\}$ by an external device such as a computer.

Figure 26:
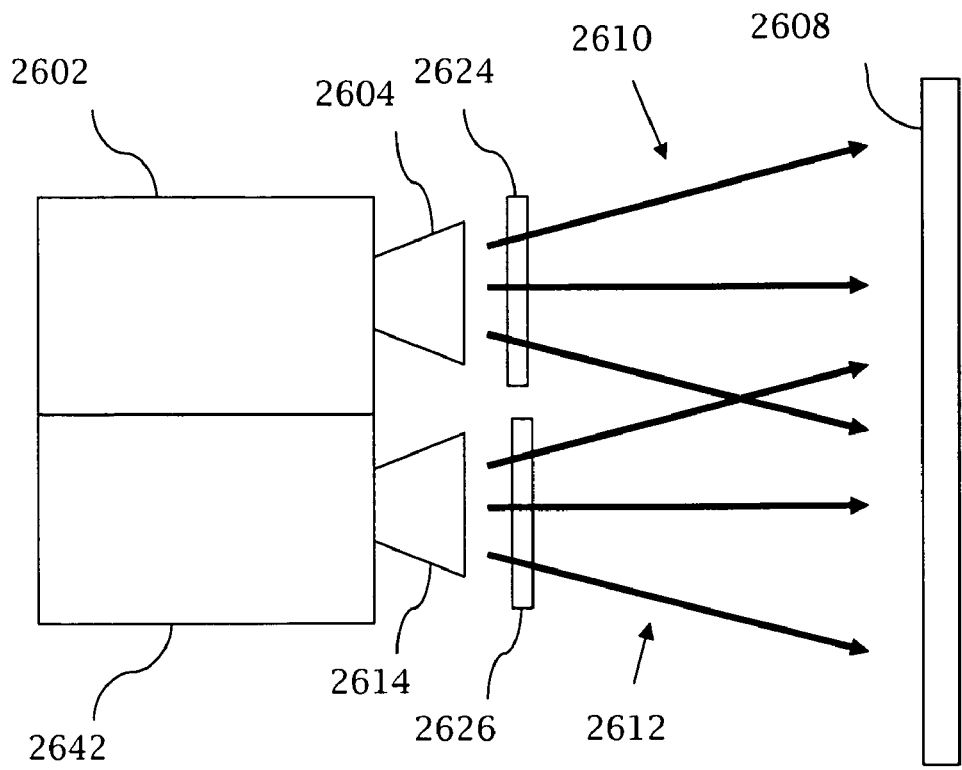
FIG. 26 depicts two projectors with two external filters.

FIG. 26 depicts a first projector 2642 and a second projector 2602 positioned near to the first projector 2642. A first filter $F_1$ 2626 is positioned between a projection lens 2614 of the first projector 2642 and a viewing screen 2608. A second filter $F_2$ 2624 is positioned between a projection lens 2604 of the second projector 2602 and a viewing screen 2608. The first projector may project a first image 2612 through the filter 2626 in primary colors $\{P_1, P_2, P_3\}$. The filter 2626 may remove light comprising the spectra of primary color $\{Q_1\}$ from the spectra of the primary colors $\{P_1, P_2, P_3\}$. The second projector may project a grayscale second image 2610 through the filter 2624 in primary colors $\{P_1, P_2, P_3\}$. The filter 2624 may transmit light comprising the spectra of primary color $\{Q_1\}$. Then the first image may be viewed with a third color filter $F_3$ and the second image may be viewed through a fourth color filter $F_4$. The transmission spectra of the third filter $F_3$ may be similar to the transmission spectra of the first filter $F_1$. The transmission spectra of the fourth filter $F_4$ may be similar to the transmission spectra of the second filter $F_2$.

Another embodiment of the present invention comprises a projector with an internal filter $F_2$ which may transmit primary color $\{Q_1\}$ and block primary colors $\{P_1, P_2, P_3\}$. The filter $F_2$ may be movable whereby filter $F_2$ may be positioned in the projection path or out of the projection path. If the filter $F_2$ is in the projection path, the projector may project the primary colors $\{Q_1\}$. If the filter $F_2$ is out of the projection path, the projector may project the primary colors $\{P_1, P_2,$ $P_3$}. The projector may comprise an internal filter $F_1$ which may transmit primary colors {$P_1, P_2, P_3$} and block primary colors {$Q_1$}. The filter $F_1$ may be movable whereby filter $F_1$ may be positioned in the projection path or out of the projection path. If the filter $F_1$ is in the projection path, the projector may project the primary colors {$P_1, P_2, P_3$} whose spectra may not substantially overlap the spectra of primary color {$Q_1$}. If the filter $F_1$ is out of the projection path, the projector may project the primary colors {$P_1, P_2, P_3$} whose spectra may overlap the spectra of primary color {$Q_1$}. Two projectors of the present embodiment may be used to provide primary colors {$P_1, P_2, P_3$} for displaying a first image and primary colors {$Q_1$} for displaying a second image where the spectra of the first and second images may substantially not overlap. One projector of the present embodiment may be used to display non-stereoscopic images. The first and second images may be displayed with balanced brightness contrast for like subject matter.

Figure 27:
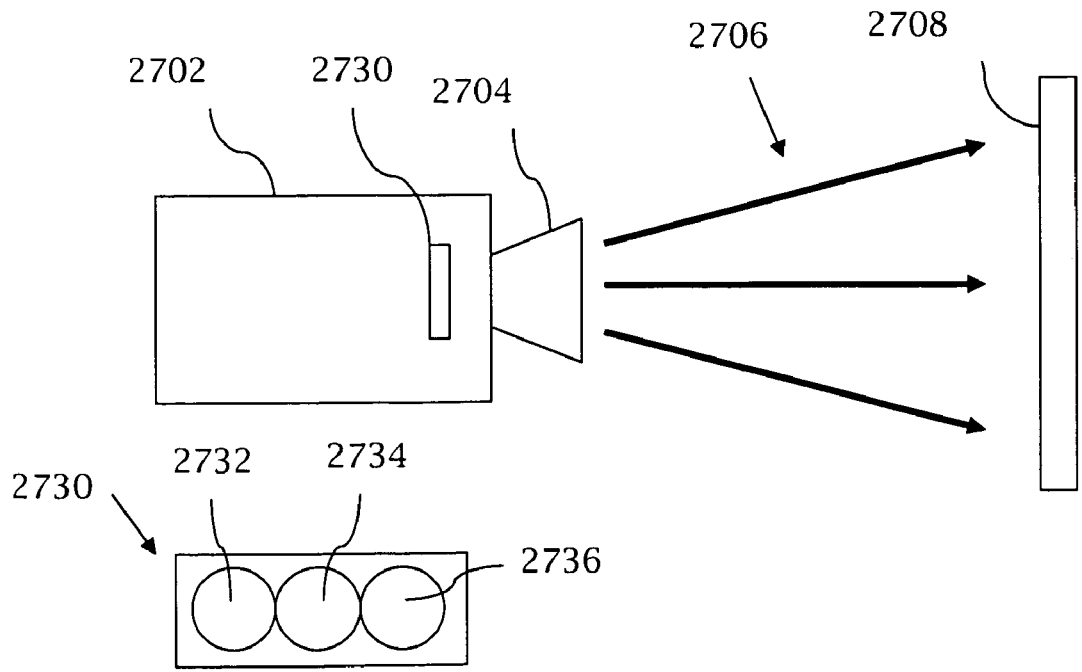
FIG. 27 depicts a projector with a movable internal filter.
Figure 28A:
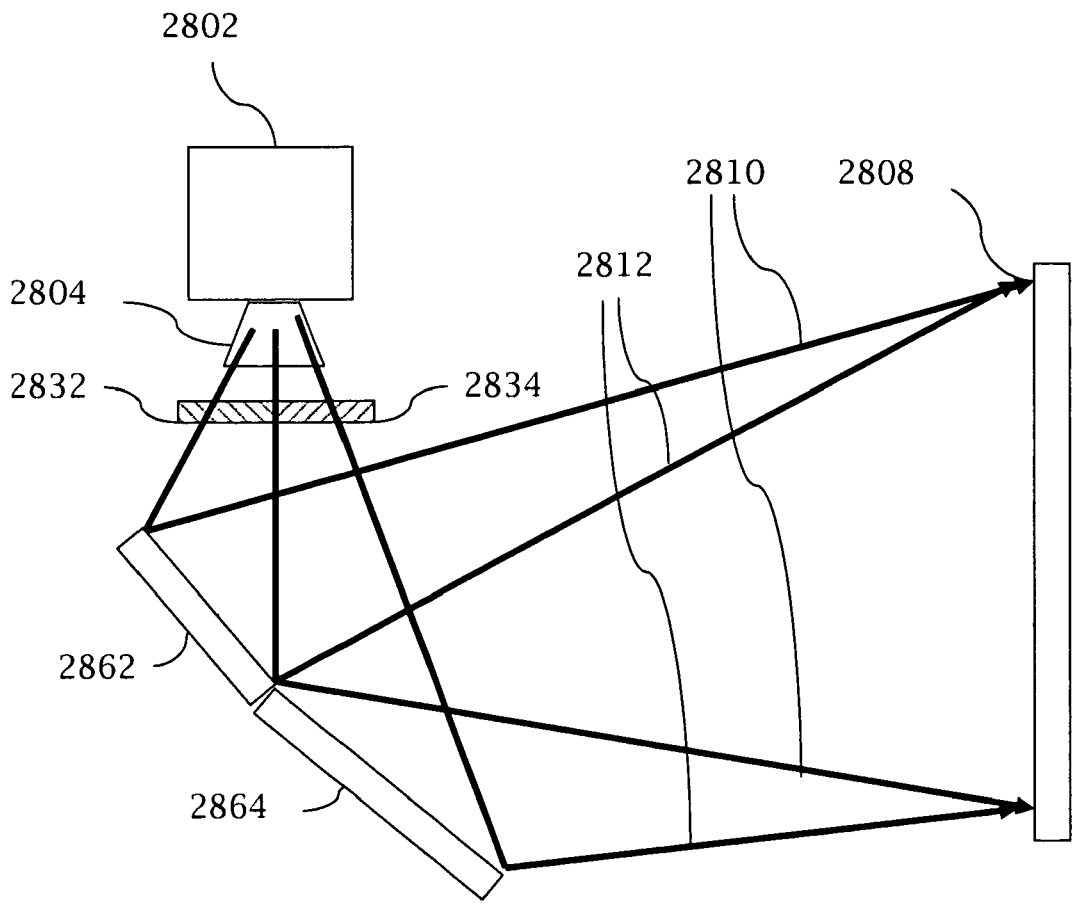
FIG. 28a depicts a projector projecting a stereoscopic image through an optical device.
Figure 28B:
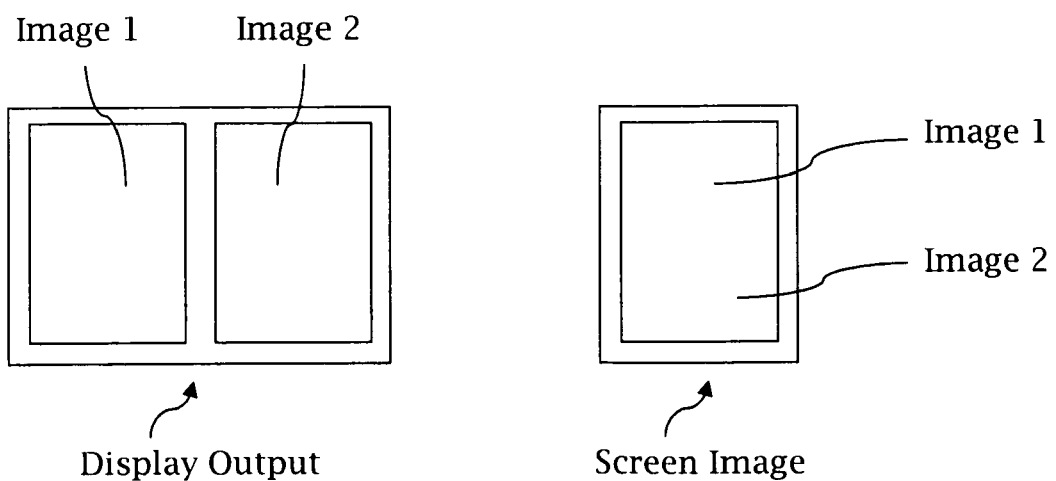
FIG. 28b depicts a stereoscopic image from a projector and on a screen.
Figure 29A:
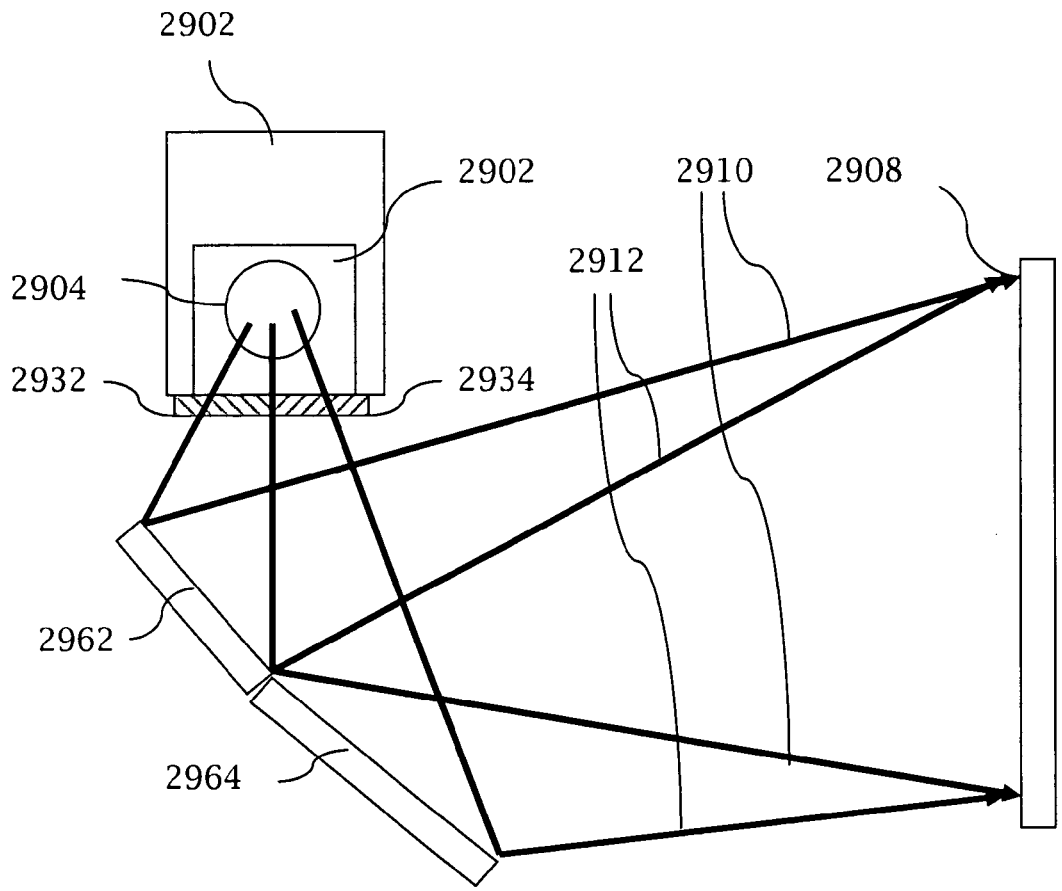
FIG. 29a depicts a projector projecting a stereoscopic image through an optical device.
Figure 29B:
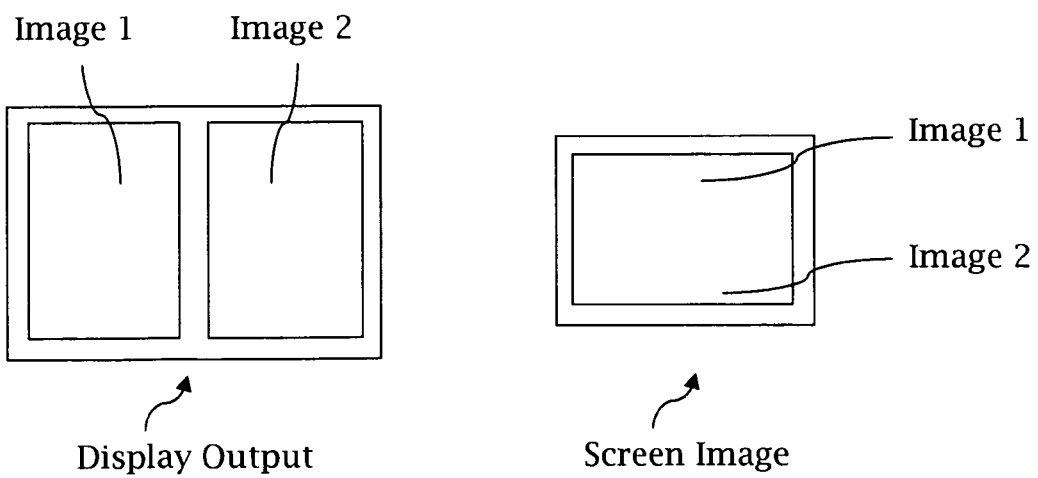
FIG. 29b depicts a stereoscopic image from a projector and on a screen.

FIG. 27 depicts a projector 2702 with an adjustable internal filter 2730. The filter may be positioned near to the projection lens 2704. The projected primary colors 2706 onto viewing screen 2708 may be changed by moving the adjustable filter 2730. Adjustable filter 2730 may comprise a first filter $F_1$ 2732, and a second filter $F_2$ 2734, and a third filter 2736. The third filter may be a transparent media such as air.

Another embodiment of the present invention comprises a projector with a movable filter $F_3$. In one position, the filter may provide primary colors {$P_1, P_m$} or {$P_1, P_{m+1}$} for displaying non-stereoscopic images. In a second position, the filter may provide primary colors {$P_1, \ldots, P_m, Q_1$} for displaying stereoscopic images. A first image may be displayed in primary colors {$P_1, \ldots, P_m$} while a second image may be displayed in primary color {$Q_1$}. The first and second images may be displayed with balanced brightness contrast for like subject matter.

Another embodiment of the present invention comprises a conventional three projector and an external optical device which splits the projected image in half into a first image and a second image. The external optical device modifies the spectra and direction of projected light such that the first image may be projected in primary colors {$P_1, \ldots, P_m$} and the second image may be projected in primary color {$Q_1$} where the first and second images may be superimposed on a surface. The first image may be projected on a first half the display output image while the second image is projected on a second half of the display output image. The second image brightness coordinate {$Y_Q$} may be projected in primary colors {$T_1, \ldots, T_t$} in the projector. Two examples of the optical device are shown in FIGS. 30a and 31a.

Figure 30:
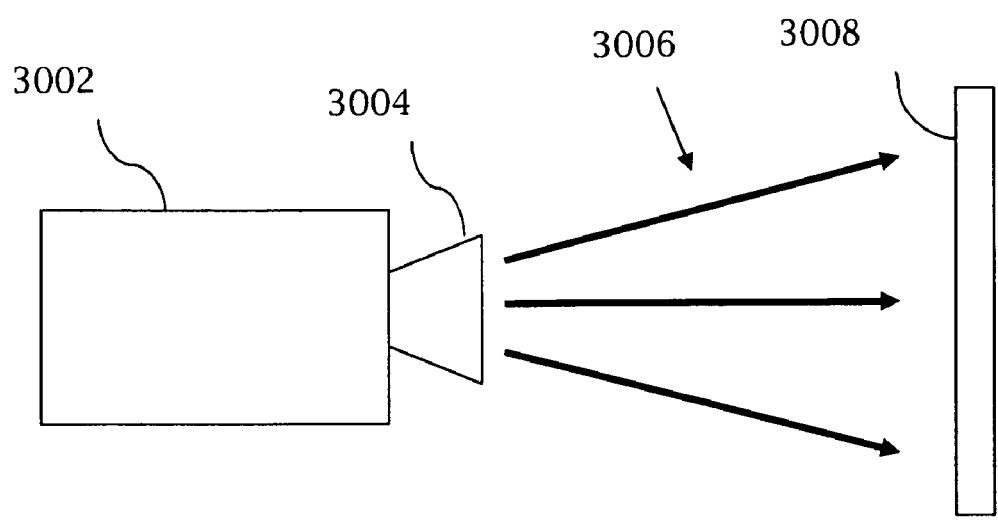

FIG. 30b depicts the display output divided into first and second images. The first image may be projected on the left side of the display output and the second image may be projected on the right side of the display output. The screen image depicts the first and second images superimposed. The screen image may have a portrait format.

FIG. 30a depicts a projector 3002 projecting a stereoscopic image through projection lens 3004 and through the optical device. The optical device comprises a first filter 3032, a second filter 3034, a first mirror 3062, and a second mirror 3064. The first filter 3032 may substantially transmit primary colors {$P_1, \ldots, P_m$} and block primary color {$Q_1$}. The second filter 3034 may substantially transmit primary color {$Q_1$} and block primary colors {$P_1, \ldots, P_m$}. The projector may project the first and second images onto the first filter 3032 and second filter 3034 respectively. The first image may pass through the first filter 3032 and may be modified by the first filter 3032 by removing the spectra of primary color {$Q_1$}. The first image may then be reflected by the first mirror 3062 onto a screen 3008. The second image may pass through the second filter 3034 and may be modified by the second filter 3034 by removing the spectra of primary colors {$P_1, \ldots, P_m$}. The second image may then be reflected by the second mirror 3064 onto the screen 3008. The first mirror 3062 and second mirror 3064 may have a slightly different orientations so that the first and second images may be superimposed by the reflection off the mirrors.

Figure 31:
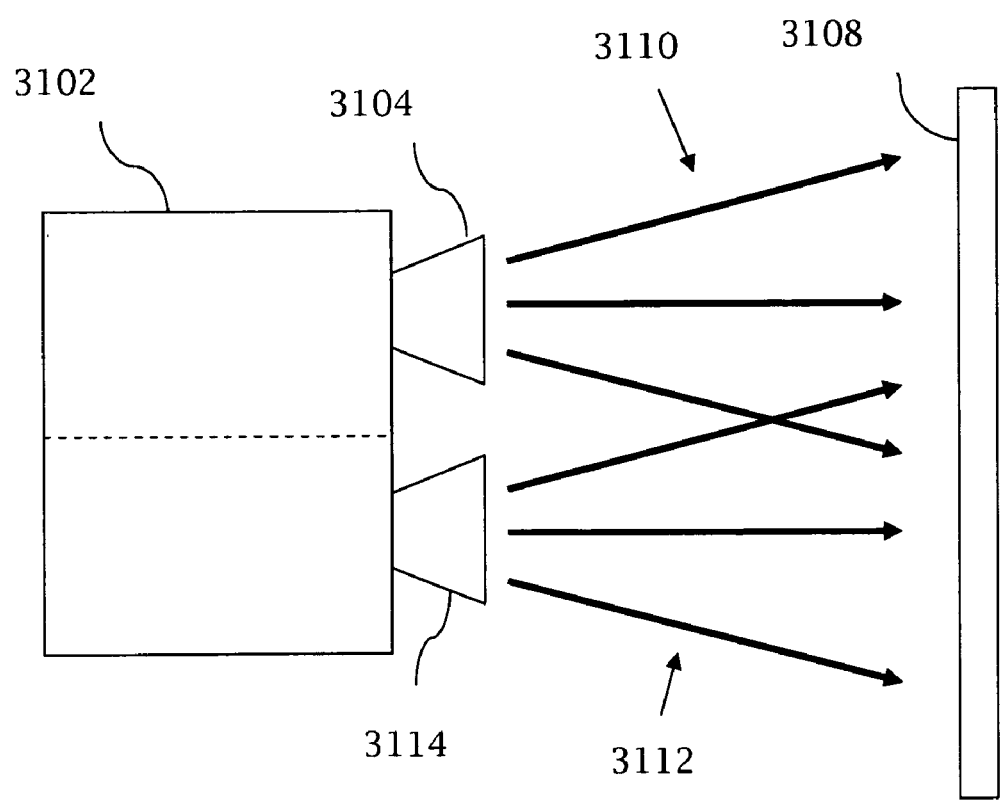

FIG. 31b depicts the display output divided into first and second images. The first image may be projected on the left side of the display output and the second image may be projected on the right side of the display output. The screen image depicts the first and second images superimposed. The screen image may have a landscape format.

FIG. 31a depicts a projector 3102 projecting a stereoscopic image through projection lens 3104 and through the optical device. The optical device comprises a third mirror 3102, a first filter 3132, a second filter 3134, a first mirror 3162, and a second mirror 3164. The projector may project the first and second images onto the third mirror 3102. The third mirror 3102 may reflect the image by 90 degrees onto the first and second filters respectively. The first filter 3132 may substantially transmit primary colors {$P_1, \ldots, P_m$} and block primary color {$Q_1$}. The second filter 3134 may substantially transmit primary color {$Q_1$} and block primary colors {$P_1, \ldots, P_m$}. The first image may pass through the first filter 3132 and may be modified by the first filter 3132 by removing the spectra of primary color {$Q_1$}. The first image may then be reflected by the first mirror 3062 onto a screen 3108. The second image may pass through the second filter 3134 and may be modified by the second filter 3134 by removing the spectra of primary colors {$P_1, \ldots, P_m$}. The second image may then be reflected by the second mirror 3164 onto the screen 3108. The first mirror 3162 and second mirror 3164 may have a slightly different orientations so that the first and second images may be superimposed by the reflection off the mirrors Stereoscopic Camera Stereoscopic camera designs are common in the prior art. These stereoscopic cameras often lack a simple inexpensive method to preview the stereoscopic content comparable to the function of a viewfinder for non-stereoscopic content. There is a need for a stereoscopic viewfinder which may be comparable in size, form, and function to non-stereoscopic viewfinders. Some embodiments of the present invention comprise a stereoscopic viewfinder which provides four primary colors for displaying stereoscopic images.

Another embodiment of the present invention provides a method to photographically capture and display stereoscopic content. The method may comprise a camera apparatus to photographically capture stereoscopic content and a display apparatus to display stereoscopic content. The camera apparatus may capture stereoscopic content by any method of the prior art. For example the apparatus may comprise a first objective lens optically cooperative with a first image sensor and a second objective lens optically cooperative with a second image sensor. The first and second lenses may be positioned apart by the distance of the stereo base. A stereo base is the distance between the first and second objective lenses in a stereoscopic camera. The optical axes of the first and second lenses may be generally directed toward the common subject. The axes may be generally parallel or the axes may intersect at a small angle at a distance from the lenses in a direction toward the common subject. The angle between the axes may be adjustable. The distance between the first and second lenses may be adjustable The first and second sensor images may be periodically sampled and processed for display on the display apparatus.

The display apparatus may provide four primary colors $\{P_1, P_2, P_3, Q_1\}$ where the first images from the first sensor may be displayed using the primary colors $\{P_1, P_2, P_3\}$ and the second images from the second sensor may be displayed using the primary color $\{Q_1\}$. The primary colors $\{P_1, P_2, P_3\}$ may include red, green, and blue primary colors which allow the first images to be displayed in full color. The primary colors $\{Q_1\}$ may be a red, yellow, green, cyan, blue or white primary color. The spectra of the primary colors $\{P_1, P_2, P_3\}$ may substantially not overlap the spectra of the primary color $\{Q_1\}$. Then the stereoscopic images may be viewed through first $F_1$ and second $F_2$ viewing filters. Alternatively, the polarization state $p_1$ of the primary colors $\{P_1, P_2, P_3\}$ may be orthogonal to the polarization state $p_2$ of the primary color $\{Q_1\}$. Then the stereoscopic images may be viewed through polarized filters $F_1$ and $F_2$. The first filter $F_1$ may substantially transmit the primary colors $\{P_1, P_2, P_3\}$ of the first image and block the primary color $\{Q_1\}$ of the second image. The second filter $F_2$ may substantially transmit the primary color $\{Q_1\}$ of the second image and block the primary colors $\{P_1, P_2, P_3\}$ of the first image. The display apparatus may comprise a polarization filter to polarize the primary colors $\{P_1, P_2, P_3, Q_1\}$. The display apparatus may comprise a CSPF to rotate the polarization state of the primary color $\{Q_1\}$ to the state $p_2$.

This embodiment may include a storage apparatus to storage stereoscopic content, a transformation $G_1$ of the first images into the primary colors $\{P_1, P_2, P_3\}$, a transformation $G_2$ of the second images into the primary color $\{Q_1\}$ whereby the brightness contrast of the first and second images may be balanced while displayed in the primary colors $\{P_1, P_2, P_3, Q_1\}$. This embodiment may further comprise a second sensor which primarily senses the brightness of the second image and a first sensor which primarily senses the primary color values of the first image. This embodiment may also include a communication port which allows live images to be transferred to an external display apparatus.

I claim:

1. A method for displaying stereoscopic images, comprising the steps of:
   providing a display panel $PD_1$ comprising an array of pixels, wherein said pixels comprise at least three sub-pixel elements $x_{1j}, \ldots, x_{mj}$, wherein j is an array index, wherein said elements $x_{ij}, \ldots, x_{mj}$ provide primary colors $P_{1j}, P_{2j}, P_{3j}, Q_j$, providing a stereoscopic image comprising:
   a first image; and a second image;
   said first image represented during use by primary color coordinates $P_{1j}, P_{2j}, P_{3j}$;
   said second image represented during use by primary color coordinates $Q_j$;
   rendering coordinates $P_{1j}, P_{2j}, P_{3j}$ in said primary colors $P_{1j}, P_{2j}, P_{3j}$; and rendering coordinates $Q_j$ in said primary color $Q_j$ for stereoscopic display.

2. The method of claim 1, further comprising the steps of:
   a first light source providing first incident light on said elements $x_{1j}, x_{2j}, x_{3j}$, said elements $x_{1j}, x_{2j}, x_{3j}$ configured to transmit first portions of said first incident light, said first portions of said first incident light comprising primary colors $P_{1j}, P_{2j}, P_{3j}$ respectively;
   a second light source providing second incident light on at least one of said elements $x_{1j}, x_{2j}, x_{3j}$;
   at least one of said elements $x_{1j}, x_{2j}, x_{3j}$ configured to transmit said second portions of said second incident light, said second portions of said second incident light comprising primary color $Q_j$;
   said first light source and said second light source time sequentially providing said primary color $P_{1j}$ and said primary color $Q_j$; and
   time sequentially rendering said first image in said primary colors $P_{1j}, P_{2j}, P_{3j}$ and rendering said second image in said primary color $Q_j$.

3. The method of claim 1, wherein said sub-pixel elements comprise four sub-pixel elements $x_{1j}, x_{2j}, x_{3j}, x_{4j}$, said elements $x_{1j}, x_{2j}, x_{3j}, x_{4j}$ providing said primary colors $P_{1j}, P_{2j}, P_{3j}, Q_j$ respectively.

4. The method of claim 3, further comprising the steps of:
   providing light incident on said display panel $DP_1$; and
   four elements $x_{1j}, x_{2j}, x_{3j}, x_{4j}$ of said sub-pixel elements transmitting said primary colors $P_{1j}, P_{2j}, P_{3j}, Q_j$, respectively.

5. The method of claim 4, further comprising the steps of:
   providing a projection lens, said projection lens transmitting said primary colors $P_{1j}, P_{2j}, P_{3j}, Q_j$.

6. The method of claim 3, wherein said sub-pixel elements $x_{1j}, x_{2j}, x_{3j}, x_{4j}$ comprise light emitting elements.

7. The method of claim 1, further comprising the step of:
   providing a polarization state $p_1$ of said primary colors $P_{1j}, P_{2j}, P_{3j}$ orthogonal to a polarization state $p_2$ of said primary color $Q_j$.

8. The method of claim 1, wherein spectral luminance of each said primary colors $P_{1j}, P_{2j}, P_{3j}$ overlapping spectral luminance of said primary color $Q_j$ by less than twenty percent.

9. The method of claim 1, wherein said primary color $Q_j$ comprises yellow wavelengths of light.

10. The method of claim 1, further comprising the steps of:
    providing a first viewing filter $F_1$, said first viewing filter substantially transmitting said primary colors $P_{1j}, P_{2j}, P_{3j}$ and substantially blocking said primary color $Q_j$; and
    providing a second viewing filter $F_2$, said first filter substantially transmitting said primary color $Q_j$ and substantially blocking said primary colors $P_{1j}, P_{2j}, P_{3j}$.

11. The method of claim 1, further comprising the steps of:
    transforming coordinates $A_{1j}, \ldots, A_{sj}$ into said primary color coordinates $P_{1j}, P_{2j}, P_{3j}$, said first image represented by s coordinates $A_{1j}, \ldots, A_{sj}$; and
    transforming coordinates $B_{1j}, \ldots, B_{sj}$ into said primary color coordinates $Q_j$, said second image represented by s coordinates $B_{1j}, \ldots, B_{sj}$, wherein s is at least three.

12. The method of claim 1, further comprising the step of:
    configuring a first brightness contrast of said first image rendered in said primary colors $P_{1j}, P_{2j}, P_{3j}$ proportional to a second brightness contrast of said second image rendered in said primary color $Q_j$ for like subject matter in said first image and said second image.

13. An apparatus for displaying stereoscopic images, comprising:
    a display panel $PD_1$ comprising an array of pixels, wherein said pixels comprise at least three sub-pixel elements $x_{1j}, \ldots, x_{mj}$, wherein j is an array index;
    said elements $x_{1j}, \ldots, x_{mj}$ configured to provide primary colors $P_{1j}, P_{2j}, P_{3j}, Q_j$; and
    said apparatus configured to: receiving a stereoscopic image comprising: a first image; and a second image;
    said first image represented during use by primary color coordinates $P_{1j}, P_{2j}, P_{3j}$;
    said second image represented during use by primary color coordinates $Q_j$;
    render coordinates $P_{1j}, P_{2j}, P_{3j}$ in the primary colors $P_{1j}, P_{2j}, P_{3j}$; and render coordinates $Q_j$ rendered in the primary color $Q_j$ for stereoscopic display.

14. The apparatus of claim 13, further comprising:
a first light source configured to provide first incident light on said elements $x_{1j}$, $x_{2j}$, $x_{3j}$, said elements $x_{1j}$, $x_{2j}$, $x_{3j}$ configured to transmit first portions of the first incident light, the first portions of the first incident light comprising the primary colors $P_{1j}$, $P_{2j}$, $P_{3j}$, respectively;
a second light source configured to provide second incident light on at least one of said elements $x_{1j}$, $x_{2j}$, $x_{3j}$;
at least one of said elements $x_{1j}$, $x_{2j}$, $x_{3j}$ configured to transmit second portions of the second incident light, the second portions of the second incident light comprising the primary color $Q_j$;
said first light source and said second light source configured to time sequentially provide the primary color $P_{1j}$ and the primary color $Q_j$; and
said apparatus configured to:
render said first image in the primary colors $P_{1j}$, $P_{2j}$, $P_{3j}$; and
render said second image in the primary color $Q_j$.

15. The apparatus of claim 13, wherein said sub-pixel elements comprise four sub-pixel elements $x_{1j}$, $x_{2j}$, $x_{3j}$, $x_{4j}$, said elements $x_{1j}$, $x_{2j}$, $x_{3j}$, $x_{4j}$ configured to provide the primary colors $P_{1j}$, $P_{2j}$, $P_{3j}$, $Q_j$, respectively.

16. The apparatus of claim 15, wherein said sub-pixel elements $x_{1j}$, $x_{2j}$, $x_{3j}$, $x_{4j}$ comprise light emitting elements.

17. The apparatus of claim 15, wherein said sub-pixel elements comprise four sub-pixel elements $x_{1j}$, $x_{2j}$, $x_{3j}$, $x_{4j}$, said elements $x_{1j}$, $x_{2j}$, $x_{3j}$, $x_{4j}$ configured to transmit light comprising the primary colors $P_{1j}$, $P_{2j}$, $P_{3j}$, $Q_j$, respectively.

18. The apparatus of claim 17, further comprising:
a projection lens, said projection lens configured to transmit the primary colors $P_{1j}$, $P_{2j}$, $P_{3j}$, $Q_j$.

19. The apparatus of claim 13, further comprising:
a polarization state $p_1$ of the primary colors $P_{1j}$, $P_{2j}$, $P_{3j}$ configured orthogonal to a polarization state $p_2$ of the primary color $Q_j$.

20. The apparatus of claim 13, further comprising:
spectral luminance of each of the primary colors $P_{1j}$, $P_{2j}$, $P_{3j}$ configured to overlap a spectral luminance of the primary color $Q_j$ by less than twenty percent.

21. The apparatus of claim 13, wherein said primary color $Q_j$ comprises yellow wavelengths of light.

22. The apparatus of claim 13, further comprising:
a first viewing filter $F_1$ configured to substantially transmit the primary colors $P_{1j}$, $P_{2j}$, $P_{3j}$ and to substantially block the primary color $Q_j$; and
a second viewing filter $F_2$ configured to substantially transmit the primary color $Q_j$ and to substantially block primary the colors $P_{1j}$, $P_{2j}$, $P_{3j}$.

23. The apparatus of claim 13, said apparatus further configured to:
transform s coordinates $A_{1j}, \ldots, A_{sj}$ into the primary color coordinates $P_{1j}$, $P_{2j}$, $P_{3j}$, the first image represented by the coordinates $A_{1j}, \ldots, A_{sj}$; and
transform s coordinates $B_{1j}, \ldots, B_{sj}$ into the primary color coordinates $Q_j$, the second image represented by the coordinates $B_{1j}, \ldots, B_{sj}$, wherein s is at least three.

24. The apparatus of claim 13, further comprising:
a first brightness contrast of the first image rendered in the primary colors $P_{1j}$, $P_{2j}$, $P_{3j}$, and
a second brightness contrast of the second image rendered in the primary color $Q_j$, said first brightness contrast configured proportional to said second brightness contrast for like subject matter in the first image and the second image.

* * * * *